US012804313B2

(12) United States Patent
Kako et al.

(10) Patent No.: US 12,804,313 B2
(45) Date of Patent: Nov. 17, 2026

(54) ACOUSTIC SIGNAL OUTPUT DEVICE

(71) Applicants: NTT, Inc., Tokyo (JP); NTT SONORITY, INC., Tokyo (JP)

(72) Inventors: Tatsuya Kako, Tokyo (JP); Hironobu Chiba, Tokyo (JP); Jun Iwase, Tokyo (JP); Hiroaki Sato, Tokyo (JP); Kazunori Kobayashi, Tokyo (JP)

(73) Assignees: NTT, Inc., Tokyo (JP); NTT SONORITY, INC., Tokyo (JP)

( * ) Notice: Subject to any disclaimer, the term of this patent is extended or adjusted under 35 U.S.C. 154(b) by 142 days.

(21) Appl. No.: 18/873,418

(22) PCT Filed: May 29, 2023

(86) PCT No.: PCT/JP2023/019888
§ 371 (c)(1),
(2) Date: Dec. 10, 2024

(87) PCT Pub. No.: WO2023/243379
PCT Pub. Date: Dec. 21, 2023

(65) Prior Publication Data
US 2025/0168557 A1 May 22, 2025

(30) Foreign Application Priority Data
Jun. 14, 2022 (JP) ................................ 2022-095622

(51) Int. Cl.
*H04R 1/34* (2006.01)
*H04R 1/10* (2006.01)

(52) U.S. Cl.
CPC ........... *H04R 1/347* (2013.01); *H04R 1/1008* (2013.01)

(58) Field of Classification Search
CPC .............................. H04R 1/347; H04R 1/1008
See application file for complete search history.

(56) References Cited

U.S. PATENT DOCUMENTS

2017/0201822 A1* 7/2017 Shetye .................. H04R 1/347
2018/0167710 A1* 6/2018 Silver .................. H04R 1/1008
2021/0067858 A1* 3/2021 Struzik ................ H04R 1/1008

FOREIGN PATENT DOCUMENTS

CN 113905304 A 1/2022

OTHER PUBLICATIONS

BOSE (2021) "What Are Open-Ear Headphones?" Bose Corporation, the Internet [on-line] website: https://www.bose.com/en_us/better_with_bose/open-ear-headphones.html.

* cited by examiner

*Primary Examiner* — Olisa Anwah

(57) ABSTRACT

There is provided an acoustic signal output device that does not completely block the ear canal and is capable of suppressing sound leakage into the surroundings. There is provided an acoustic signal output device 10 including a structure portion provided with one or more sound holes 121*a* to emit an acoustic signal AC1 to outside and one or more sound holes 123*a* to emit an acoustic signal AC2 to the outside. The sound holes 121*a* are each positioned at an eccentric location offset in the B1-direction from a central axis of the structure portion. A sound pressure level of the acoustic signal AC2 that is emitted from the sound holes 123*a* into a first space is lower than a sound pressure level of the acoustic signal AC2 that is emitted from the sound holes 123*a* into a second space. Here, the first space is a space positioned on the B1-direction side relative to the sound holes 121*a*, the second space is a space positioned on the B2-direction side relative to the sound holes 121*a*, and the B2 direction contains an opposite direction component of the B1 direction.

7 Claims, 40 Drawing Sheets

ACOUSTIC SIGNAL OUTPUT DEVICE

CROSS-REFERENCE TO RELATED APPLICATIONS

This application is a U.S. 371 Application of International Patent Application No. PCT/JP2023/019888, filed on 29 May 2023, which application claims priority to and the benefit of JP Application No. 2022-095622, filed on 14 Jun. 2022, the disclosures of which are hereby incorporated herein by reference in their entireties.

TECHNICAL FIELD

The present invention relates to acoustic signal output devices, and more particularly to acoustic signal output devices that do not completely block the ear canal.

BACKGROUND ART

Increasing burden on the ears due to wearing of earphones and headphones is becoming a concern in recent years. Known devices that alleviate burden on the ears include open-ear type (open-type) earphones and headphones, which do not block the ear canal.

PRIOR ART LITERATURE

Non-Patent Literature

Non-Patent Literature 1: "WHAT ARE OPEN-EAR HEADPHONES?", [online], Bose Corporation, [searched on May 16, 2022], Internet <https://www.bose.com/en_us/better_with_bose/open-ear-headphones.html>

SUMMARY OF THE INVENTION

Problems to be Solved by the Invention

However, open-ear type earphones and headphones have an issue of significant sound leakage into the surroundings. This issue is not limited to open-ear type earphones and headphones but is a common problem with acoustic signal output devices that do not completely block the ear canal.

The present invention has been made in light of the issue and an object thereof is to provide acoustic signal output devices that do not completely block the ear canal and are capable of suppressing sound leakage into the surroundings.

Means to Solve the Problems

To solve the above-described problem, the present invention provides an acoustic signal output device including a structure portion provided with one or more first sound holes to emit a first acoustic signal to outside and one or more second sound holes to emit a second acoustic signal to the outside. The first sound holes are each positioned at an eccentric location offset in a first direction from a central axis of the structure portion. A sound pressure level of the second acoustic signal that is emitted from the second sound holes into a first space is lower than a sound pressure level of the second acoustic signal that is emitted from the second sound holes into a second space. Here, the first space is a space positioned on a first direction side relative to the first sound holes, the second space is a space positioned on a second direction side relative to the first sound holes, and the second direction contains an opposite direction component of the first direction. Further, the acoustic signal output device is designed such that: in a case where the first acoustic signal is emitted from the first sound holes and the second acoustic signal is emitted from the second sound holes, an attenuation factor of the first acoustic signal at a second point with respect to a first point is equal to or lower than a predefined value that is smaller than an attenuation factor associated with air conduction of an acoustic signal at the second point with respect to the first point, wherein the first point is a predefined point that is reached by the first acoustic signal, and the second point is farther from the acoustic signal output device than the first point is; or that an amount of attenuation of the first acoustic signal at the second point with respect to the first point is equal to or higher than a predefined value that is greater than an amount of attenuation associated with air conduction of an acoustic signal at the second point with respect to the first point.

Effects of the Invention

The acoustic signal output device thus can suppress sound leakage into the surroundings without completely blocking the ear canal.

BRIEF DESCRIPTION OF THE DRAWINGS

FIG. 16 is a diagram for illustrating a configuration of the acoustic signal output device according to the embodiment provided on the temples of a pair of glasses.

DETAILED DESCRIPTION OF THE EMBODIMENTS

Embodiments of the present invention are now described with reference to the drawings.

First Embodiment

An acoustic signal output device 10 in the present embodiment is a sound hearing device that can be worn on a user's ears without completely blocking the user's ear canal (for example, an open ear type (open-type) earphone or headphone). As shown in FIGS. 1, 2A, 2B, 3A, and 3B, the acoustic signal output device 10 in the present embodiment includes a driver unit 11 that converts an output signal (an electric signal representing an acoustic signal) output by a reproduction device into the acoustic signal and outputs it, a housing 12 (a structure portion) accommodating the driver unit 11 inside, and a support portion 13 (the structure portion) to be positioned on the auricle of the user when attached.

<Driver Unit 11>

Figure 2A:
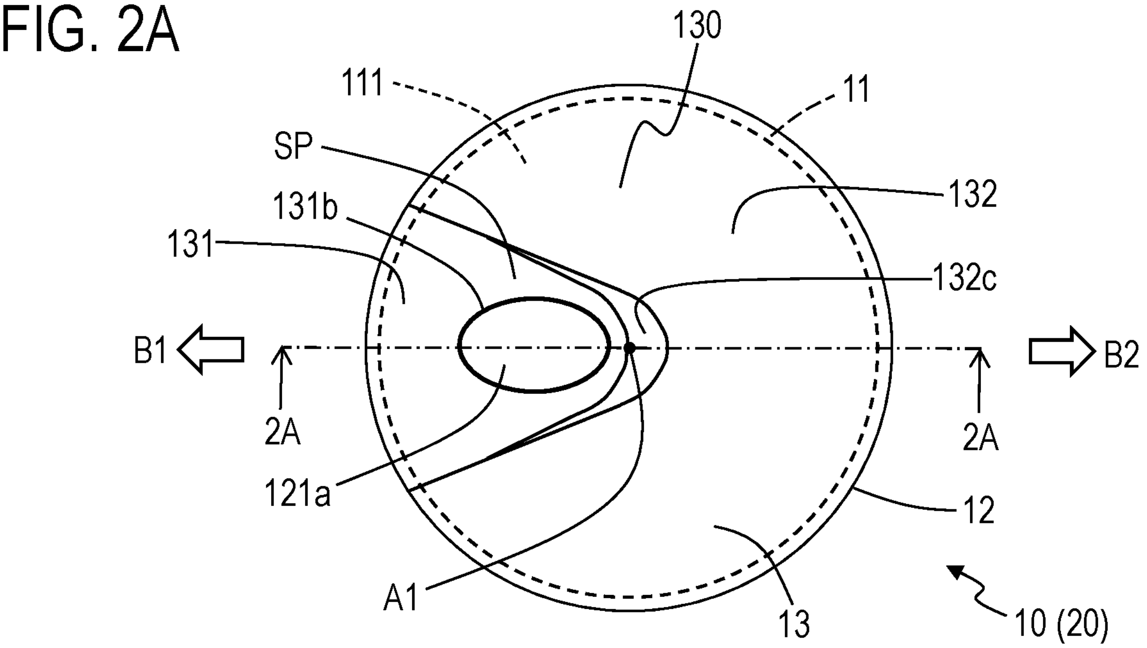
FIG. 2A is a transparent plan view illustrating a configuration of the acoustic signal output device according to the embodiment.
Figure 2B:
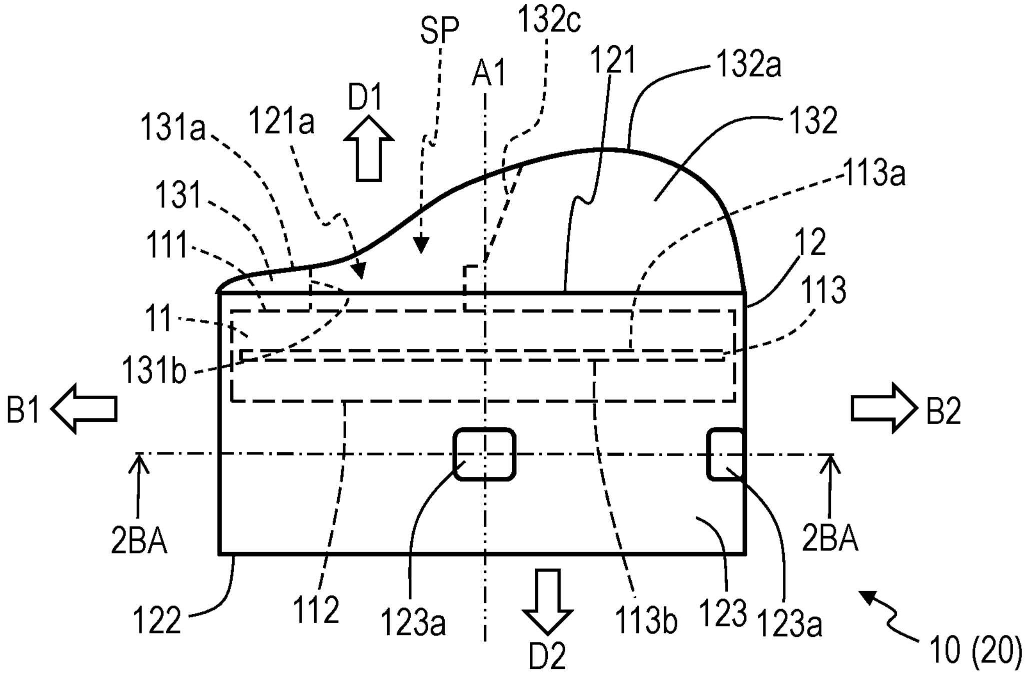
FIG. 2B is a transparent front view illustrating a configuration of the acoustic signal output device according to the embodiment.

The driver unit (loudspeaker driver unit) 11 is a device that emits an acoustic signal AC1 (a first acoustic signal) which is based on the output signal input thereto to one side (D1-direction side) (emits sound) and emits an acoustic signal AC2 (a second acoustic signal), which is an opposite phase signal (phase-inverted signal) of the acoustic signal AC1 or an approximate signal of the opposite phase signal, to the other side (D2-direction side) (a device with loudspeaker functions). That is, the acoustic signal that is emitted from the driver unit 11 to the one side (D1-direction side) will be called the acoustic signal AC1 (the first acoustic signal) and the acoustic signal that is emitted from the driver unit 11 to the other side (D2-direction side) will be called the acoustic signal AC2 (the second acoustic signal). The acoustic signal AC1 is a signal for the user to hear sound, while the acoustic signal AC2 is a signal for suppressing sound leakage to the surroundings. For example, the driver unit 11 includes a diaphragm 113 that emits the acoustic signal AC1 from one surface 113*a* to the D1-direction side by vibration and emits the acoustic signal AC2 from the other surface 113*b* to the D2-direction side by the vibration (FIG. 2B). The driver unit 11 in this example emits the acoustic signal AC1 to the D1-direction side from a surface 111 on one side and emits the acoustic signal AC2, which is the opposite phase signal of the acoustic signal AC1 or an approximate signal of the opposite phase signal, to the D2-direction side from a surface 112 on the other side through the vibration of the diaphragm 113 based on the output signal input to the driver unit 11. That is, the acoustic signal AC2 is collaterally emitted with the emission of the acoustic signal AC1. The D2 direction (the other side) can be the opposite direction of the D1 direction (one side), for example, but the D2 direction does not have to be strictly the opposite direction of the D1 direction; the D2 direction may be any direction that is different from the D1 direction. The relationship between the one side (D1 direction) and the other side (D2 direction) depends on the type or the shape of the driver unit 11. Depending on the type or the shape of the driver unit 11, the acoustic signal AC2 can be strictly the opposite phase signal of the acoustic signal AC1 or the acoustic signal AC2 can be an approximate signal of the opposite phase signal of the acoustic signal AC1. For example, an approximate signal of the opposite phase signal of the acoustic signal AC1 may be (1) a signal that is produced by shifting the phase of the opposite phase signal of the acoustic signal AC1, (2) a signal that is produced by changing (amplifying or attenuating) the amplitude of the opposite phase signal of the acoustic signal AC1, or (3) a signal that is produced by shifting the phase of the opposite phase signal of the acoustic signal AC1 and further changing its amplitude. The phase difference between the opposite phase signal of the acoustic signal AC1 and an approximate signal thereof is preferably equal to or less than $\delta_1$ (rad). Examples of $\delta_1$ include $\pi/36$, $\pi/12$, $\pi/6$, and $\pi/3$. The ratio of the amplitude of an approximate signal of the opposite phase signal of the acoustic signal AC1 to the amplitude of the opposite phase signal is preferably equal to or less than $\delta_2$. Examples of $\delta_2$ include 0.1, 0.5, 1.0, and 2.0. For example, the amplitude of a sum signal that is obtained by the addition of the acoustic signal AC1 and the acoustic signal AC2 emitted from the driver unit 11 should be smaller than the amplitude of the acoustic signal AC1. For example, assume that the sinusoidal wave of each frequency contained in the acoustic signal AC1 emitted from the driver unit 11 is Ae jot and the 20) sinusoidal wave of each frequency contained in the acoustic signal AC2 emitted from the driver unit 11 is $\delta_2 Ae\hat{}j(-\omega t+\delta_1)$. Here, t represents time, $\omega$ represents the angular frequency, A (A>0) represents the amplitude, j represents the imaginary unit, and e represents Napier's constant. In addition, $\delta_1$ represents the phase difference (rad) between the opposite phase signal of the acoustic signal AC1 and the acoustic signal AC2, and $\delta_2$ ($\delta_2>0$) represents the amplitude ratio between the opposite phase signal of the acoustic signal AC1 and the acoustic signal AC2. The sum signal obtained by the addition of the two signals is: $(Ae\hat{}j\delta t)+\{\delta_2 Ae\hat{}j(-wt+\delta_1)\}=(1-\delta_2 e\hat{}j\delta_1)Ae\hat{}j\omega t$.

The absolute value of the amplitude of the sum signal is $|(1-\delta_2 e\hat{}j\delta_1)A|$, so $|(1-\delta_2 e\hat{}j\delta_1)|<1$ is required in order to make the amplitude of the sum signal smaller than the amplitude of the acoustic signal AC1. That is, the following should be satisfied.

$$\begin{aligned}|1-\delta_2 e^{j\delta_1}| &= \sqrt{(1-\delta_2\cos\delta_1)^2+\delta_2^2\sin^2\delta_1}\\ &= \sqrt{1+\delta_2^2-2\delta_2\cos\delta_1} < 1\end{aligned}$$

That is, the acoustic signal AC2 that is emitted from the driver unit 11 should approximate the opposite phase signal of the acoustic signal AC1 with an accuracy satisfying $0<\delta_2<2\cos\delta_1$. This means that if the acoustic signal AC1 and the acoustic signal AC2 emitted from the driver unit 11 have the same amplitude ($\delta_2=1$), the absolute value of the phase difference $\delta_1$ (rad) between the opposite phase signal of the acoustic signal AC1 and the acoustic signal AC2 should be less than $\pi/3$. It also indicates that if there is no phase difference between the opposite phase signal of the acoustic signal AC1 and the acoustic signal AC2 emitted from the driver unit 11 ($\delta_1=0$), the amplitude ratio $\delta_2$ between the opposite phase signal of the acoustic signal AC1 and the acoustic signal AC2 should be less than 2. Examples of the type of the driver unit 11 can include dynamic type, balanced armature type, a hybrid of dynamic type and balanced armature type, and capacitor type. There is no limitation on the shapes of the driver unit 11 and the diaphragm 113. While in the present embodiment the driver unit 11 is illustrated with a contour of a substantially cylinder having two end faces and the diaphragm 113 is illustrated in a substantially disk shape for the sake of simplicity, these are not limitations on the present invention. For example, the contour of the driver unit 11 may be a rectangular parallelepiped or the like and the diaphragm 113 can be dome- or horn-shaped. Examples of acoustic signals include music, voice, effect sound, environmental sound, and other kinds of sound.

<Housing 12>

Figure 3A:
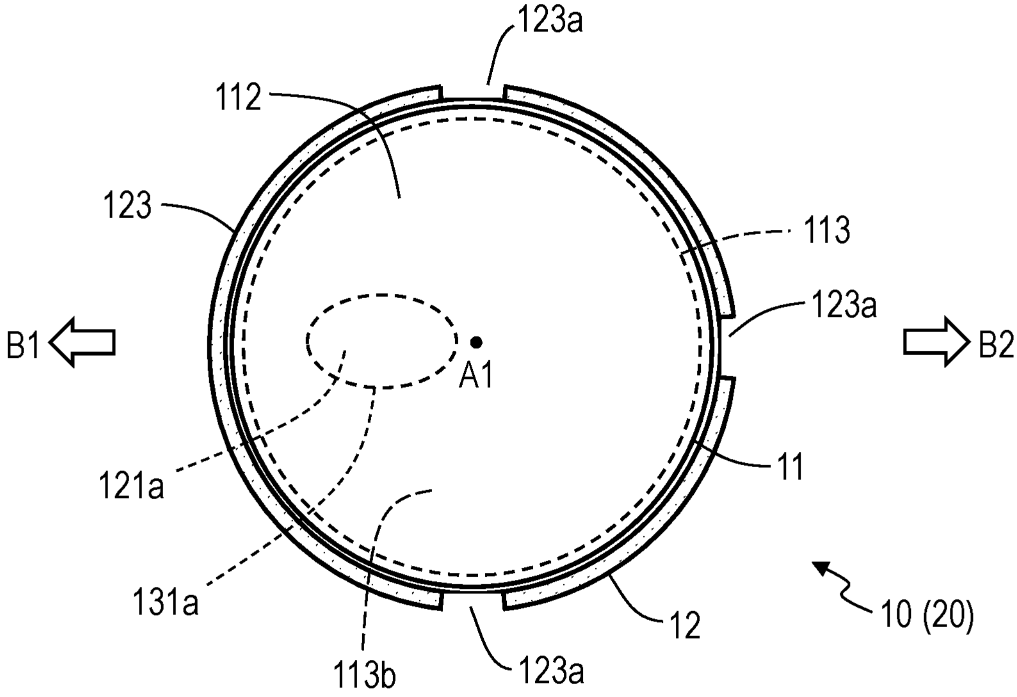
FIG. 3A is an end face view taken at 2BA-2BA in FIG. 2B.
Figure 3B:
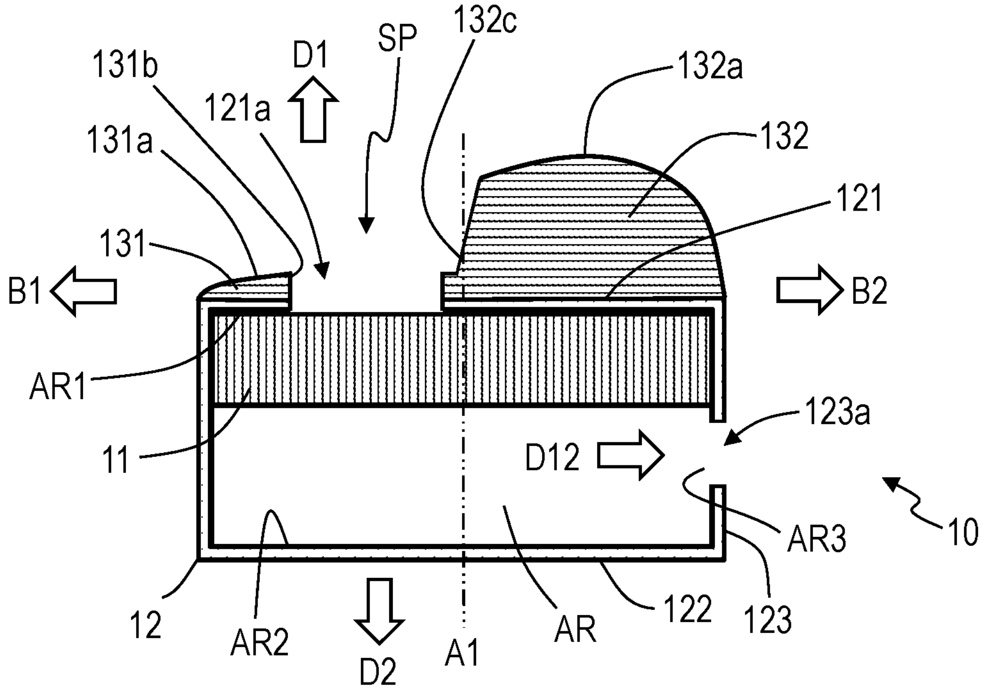
FIG. 3B is an end face view taken at 2A-2A in FIG. 2A.

The housing 12 is a hollow member with wall portions on the outside and accommodates the driver unit 11 inside. For example, the driver unit 11 is fixed at an end on the D1-direction side inside the housing 12. This is not a limitation on the present invention, however. There is no limitation on the shape of on the housing 12, either; for example, the shape of the housing 12 may be rotationally symmetric (line-symmetric) or substantially rotationally symmetrical about an axis A1 extending along the D1 direction. Here, the axis A1 is an axis extending in the D1 direction through a central area of the housing 12. For example, the housing 12 has a wall portion 121 positioned on one side (D1-direction side) of the driver unit 11, a wall portion 122 positioned on the other side (D2-direction side) of the driver unit 11, and a wall portion 123 (a side surface) surrounding the space defined by the wall portion 121 and the wall portion 122 about the axis A1, which passes through the wall portion 121 and the wall portion 122 (FIGS. 2B and 3B). For the sake of simplicity, the present embodiment shows an example where the housing 12 is in a substantially cylindrical shape with two end faces. However, this is an example and is not a limitation on the present invention. For example, the housing 12 may be of a substantially dome shape with wall portions at ends, a hollow, substantially cubic shape, or any other three-dimensional shape. There is no limitation on the material for the housing 12, either. The housing 12 may be formed of a rigid body such as synthetic resin and metal, or may be formed an elastic body such as rubber.

<Sound Holes 121*a*, 123*a*>

The wall portions of the housing 12 are provided with a sound hole 121*a* (a first sound hole) to emit (direct) the acoustic signal AC1 (the first acoustic signal) emitted from the driver unit 11 to the outside, and sound holes 123*a* (second sound holes) to emit (direct) the acoustic signal AC2 (the second acoustic signal) emitted from the driver unit 11 to the outside. The sound hole 121*a* and the sound holes 123*a* can be through-holes formed through the wall portions of the housing 12, for example, although this is not a limitation on the present invention. The sound hole 121*a* and the sound holes 123*a* need not to be through-holes as long as they can emit the acoustic signal AC1 and the acoustic signal AC2 to the outside, respectively.

The sound hole 121*a* (the first sound hole) in the present embodiment is provided in an area AR1 (a first area) in the wall portion 121 positioned on the one side of the driver unit 11 (the D1-direction side, or the side to which the acoustic signal AC1 is emitted) (FIGS. 2B and 3B). The sound hole 121*a* in the present embodiment is positioned at an eccentric location offset in the B1 direction (the first direction) from the axis A1 (the central axis of the structure portion) and is open, facing in the D1 direction. The B1 direction is a specific radial direction about the axis A1. The present embodiment shows an example where the shape of the edge of the opened end of the sound hole 121*a* is oval (the opened end is oval) for the sake of simplicity. However, this does not limit the present invention. For example, the edge of the sound hole 121*a* may be in a different shape, such as a circle, a rectangle, and a triangle. Furthermore, the end of the sound hole 121*a* may be meshed. In other words, the end of the sound hole 121*a* may be formed of multiple holes. The present embodiment also shows an example where one sound hole 121*a* is provided in the area AR1 (the first area) in the wall portion 121 of the housing 12 for the sake of simplicity. However, this does not limit the present invention. For example, two or more sound holes 121*a* may be provided in the area AR1 (the first area) in the wall portion 121 of the housing 12.

The sound holes 123*a* (the second sound holes) in the present embodiment are provided in an area AR3 of the wall portion 123, the area AR3 being adjacent an area AR between the area AR1 in the wall portion 121 of the housing 12 and an area AR2 in the wall portion 122 positioned on the D2-direction side of the driver unit 11 (the other side, or the side to which the acoustic signal AC2 is emitted). That is to say, assuming that D12 direction represents the direction between the D1 direction and the opposite direction of the D1 direction with respect to the center of the housing 12 (FIG. 3B), the sound holes 123*a* (the second sound holes) are provided on the D12-direction side of the housing 12. For example, when the housing 12 has the wall portion 121 positioned on one side (D1-direction side) of the driver unit 11, the wall portion 122 positioned on the other side (D2-direction side) of the driver unit 11, and the wall portion 123 (the side surface) surrounding the space defined between the wall portion 121 and the wall portion 122 about the axis A1 extending along the direction of emission of the acoustic signal AC1 (D1 direction) and through the wall portion 121 and the wall portion 122 (FIGS. 2B and 3B), the sound holes 123*a* (the second sound holes) are provided in the wall portion 123 (the side surface).

Figure 4A:
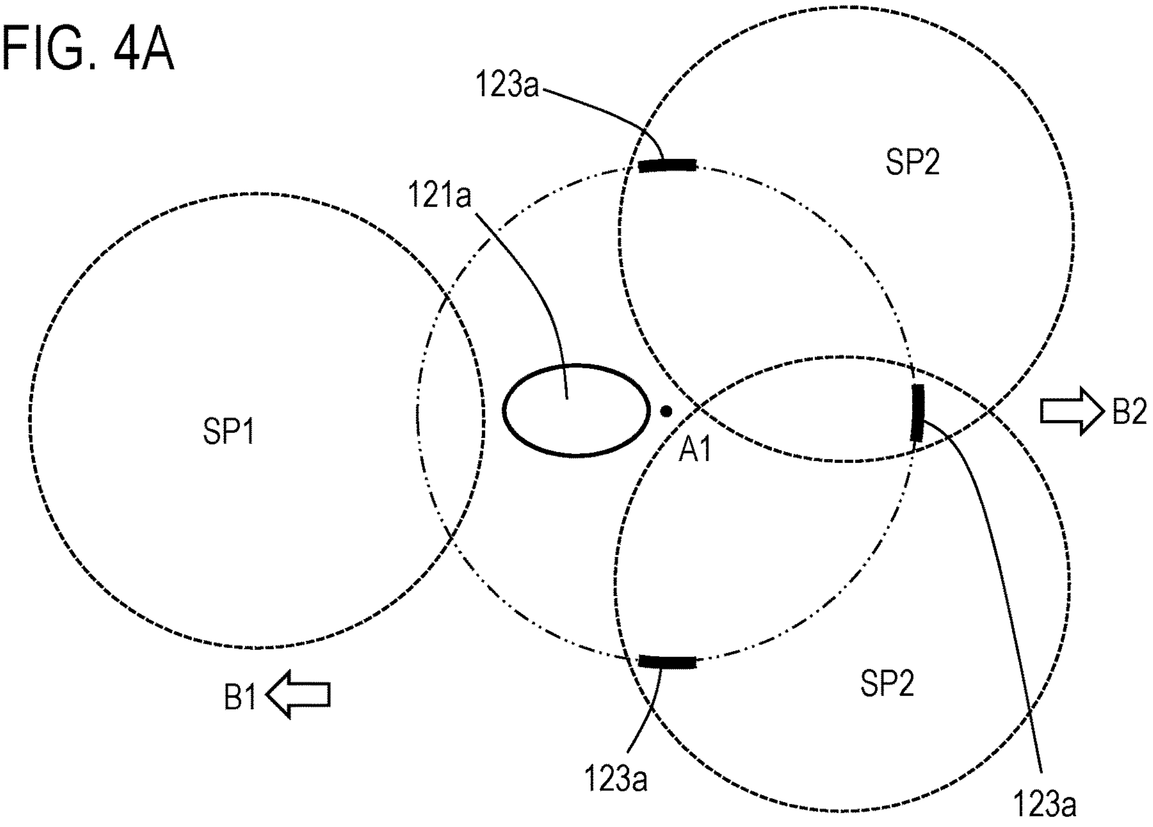
FIGS. 4A and 4B are conceptual views for illustrating arrangement of sound holes.
Figure 4B:
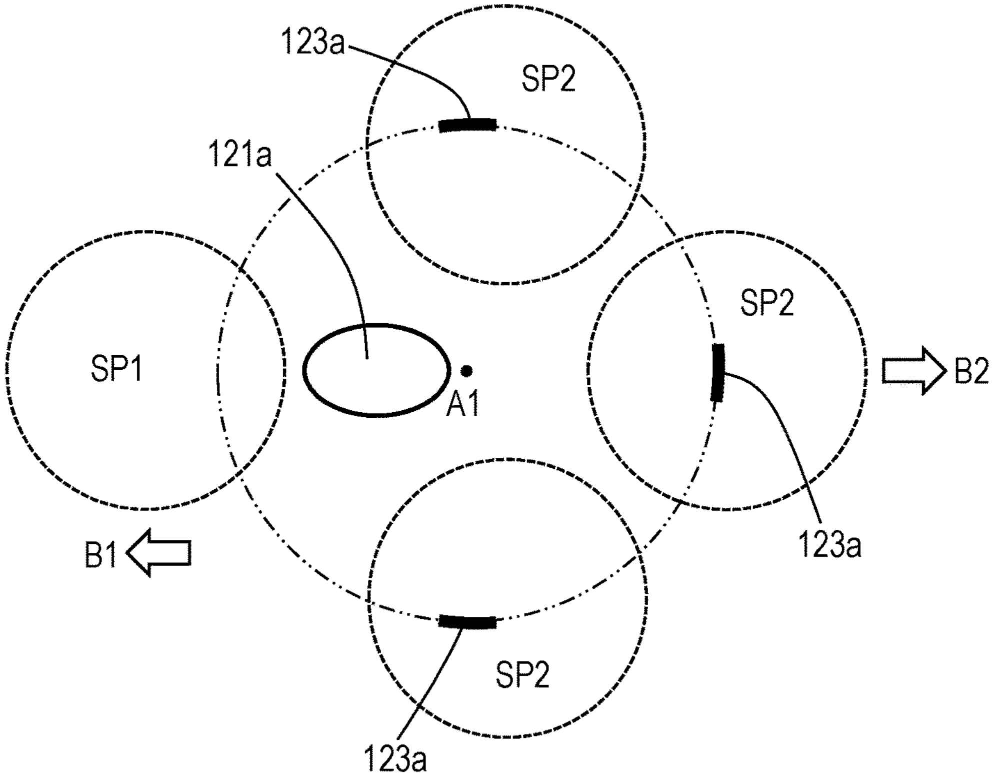

The sound holes 123*a* (the second sound holes) in the present embodiment are positioned offset to the B2-direction (the second direction) side. The B2 direction (the second direction) is a direction that contains the opposite direction component of the B1 direction (the first direction). For example, the sound holes 123*a* (the second sound holes) are not provided on the B1-direction (the first direction) side of the axis A1. As illustrated in FIGS. 4A and 4B, when the sound holes 123*a* (the second sound holes) are positioned in this manner, the total area of the opened ends of the sound holes 123*a* (the second sound holes) that face a space SP1 (a first space) is smaller than the total area of the opened ends of the sound holes 123*a* (the second sound holes) that face a space SP2 (a second space). As a result, a sound pressure level of the acoustic signal AC2 (the second acoustic signal) that is emitted from the sound holes 123*a* (the second sound holes) into the space SP1 (the first space) is lower than the sound pressure level of the acoustic signal AC2 (the second acoustic signal) that is emitted from the sound holes 123*a* (the second sound holes) into the space SP2 (the second space). The space SP1 (the first space) is a space positioned on the B1-direction (the first direction) side relative to the sound hole 121*a* (the first sound hole), and the space SP2 (the second space) is a space positioned on the B2-direction (the second direction) side relative to the sound hole 121*a* (the first sound hole). That is to say, it is preferable to design such that more sound holes 123*a* are provided at locations farther from the position of the sound hole 121*a* on the housing 12 and less sound holes 123*a* are provided at locations closer to the position of the sound hole 121*a* on the housing 12, for example.

Preferably, no sound hole is provided on the wall portion 122 side of the housing 12. This is because if sound holes are provided on the wall portion 122 side of the housing 12, the sound pressure level of the acoustic signal AC2 emitted from the housing 12 would exceed a level necessary for canceling the sound leakage components of the acoustic signal AC1 and the excess would be perceived as sound leakage.

<Support Portion 13>

Figure 1:
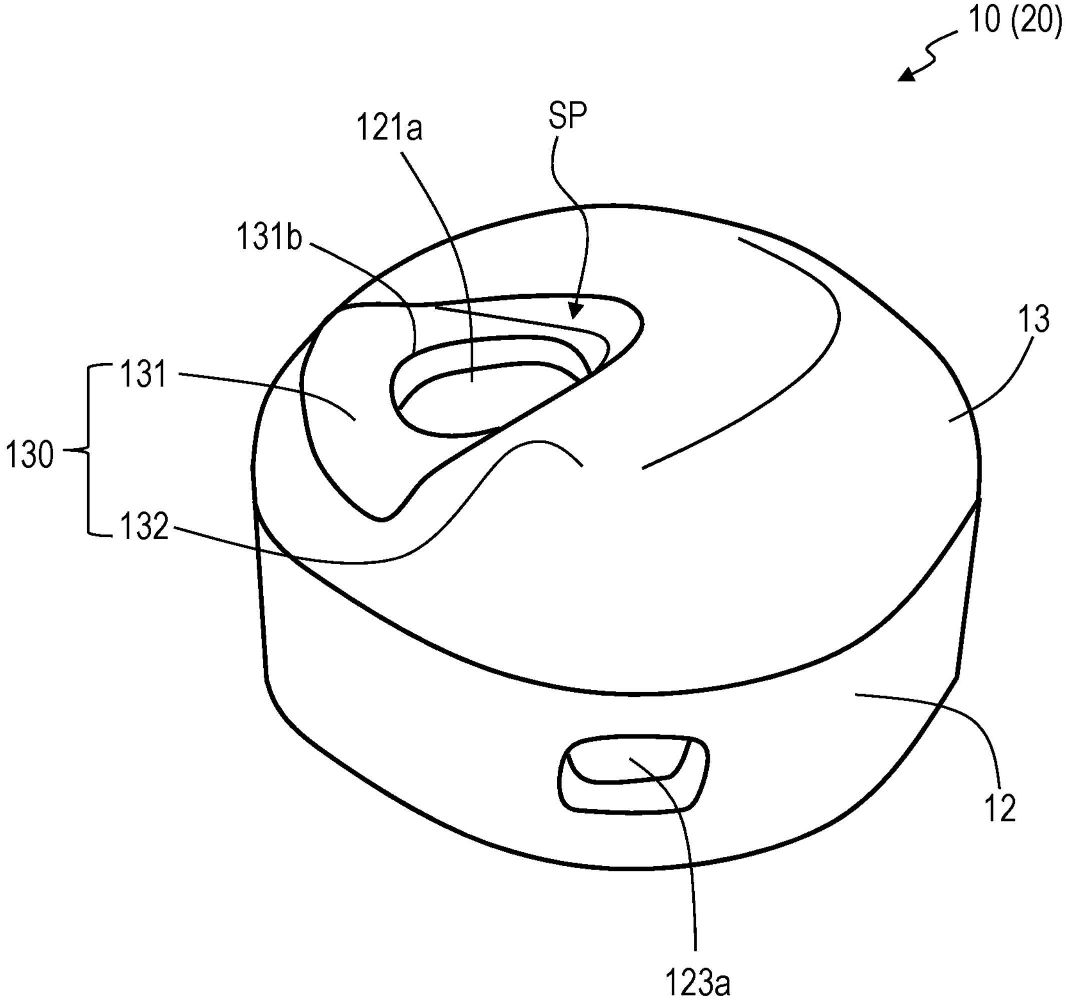
FIG. 1 is a perspective view illustrating a configuration of an acoustic signal output device according to an embodiment.

As illustrated in FIGS. 1, 2B, and 3B, the support portion 13 is a convex portion provided on an external surface of the wall portion 121 of the housing 12 on the D1-direction side. In the support portion 13, an opened end 131*b* of the sound hole 121*a* is provided, such that the acoustic signal AC1 emitted from the sound hole 121*a* is emitted to the outside from the opened end 131*b*. For example, the opened end 131*b* is a through-hole and emits the acoustic signal AC1 emitted from the sound hole 121*a* to the outside.

At least a portion of an outer surface area 130 of the support portion 13 is convex-shaped. The outer surface area 130 is an area on the outer surface side that surrounds the opened end 131*b* of the sound hole 121*a* (the first sound hole) and can be a ring-shaped area located on the outer surface side at the D1-direction side of the support portion 13, for example. The outer surface area 130 includes an area 131 (a first area) and an area 132 (a second area) protruding further than the area 131 (the first area), and is shaped so as to direct the acoustic signal AC1 (the first acoustic signal) emitted from the sound hole 121*a* (the first sound hole) to the area 131 (the first area) side. The area 131 (the first area) in this example is positioned on the B1-direction (the first direction) side of the area 132 (the second area), and the outer surface area 130 directs the acoustic signal AC1 emitted from the sound hole 121*a* toward the B1-direction side. For example, the opened end 131*b* of the sound hole 121*a* (the first sound hole) faces a space SP surrounded by the area 132 (the second area), and the area 131 (the first area) side of the space SP is open outwardly from the outer periphery of the space SP (outwardly on the B1-direction side). That is to say, the area 132 is a convex-shaped area with its surface 132*a* protruding outwardly (in the D1 direction) further than a surface 131*a* of the area 131, and surrounds the area around the opened end 131*b* except for the area 131 (the first area) side (B1-direction side), for example. In other words, the area 131 is recessed more than the area 132, and the area 132 is curved so as to partially surround the opened end 131*b* of the area 131, for example. In short, the area 131 in this example is positioned on the B1-direction (the first direction) side of the opened end 131*b* of the sound hole 121*a*, and the area 132 is an area with a bulge such that it surrounds the radial directions around the opened end 131*b* over 360 degrees except for a partial range on the B1-direction side. For example, the area 132 is mound-shaped with a maximum portion(s) at any one or more points. The surface 132*a* of the area 132 in this example is continuous with the surface 131*a* of the area 131 via an inclined portion 132*c* of the area 132. That is, the inclined portion 132*c* in this example has a shape of a taper extending from the surface 131*a* through to the surface 132*a*. This allows the acoustic signal AC1 emitted from the sound hole 121*a* to be efficiently directed to the side of the user's ear canal, which is positioned on the area 131 side (B1-direction side) when the acoustic signal output device 10 is worn. The opened end 131*b* side of the area 132 may not be tapered, however. The opened ends of the sound holes 123*a* (the second sound holes) face the space outside the space SP surrounded by the area 132 (the second area). More specifically, the opened ends of the sound holes 123*a* (the second sound holes) in the present embodiment face the space outside the space surrounded by the outer surface area 130. In addition to this, the sound holes 123*a* (the second sound holes) are positioned offset to the B2-direction (the second direction) side as mentioned above. Due to these arrangements, the acoustic signal AC2 emitted from the sound holes 123*a* is less likely to reach the user's ear canal side than the acoustic signal AC1 emitted from the sound hole 121*a*.

The shape of the support portion 13 illustrated herein is an example and is not a limitation on the present invention. For example, the surface 131*a* of the area 131 and the surface 132*a* of the area 132 may be convex-shaped, concave-shaped, convex- and concave-shaped, or flat, as long as the surface 132*a* of the area 132 protrudes further in the D1 direction than the surface 131*a* of the area 131. However, the surface 132*a* of the area 132 provides better fit during wearing when it has a curved convex shape. There is also no limitation on the material for the support portion 13. The support portion 13 may be formed of a rigid body such as synthetic resin, or may be formed of an elastic body such as rubber and urethane. However, the area 132 provides better fit during wearing when it is made of an elastic body.

<When being Attached>

Figure 5:
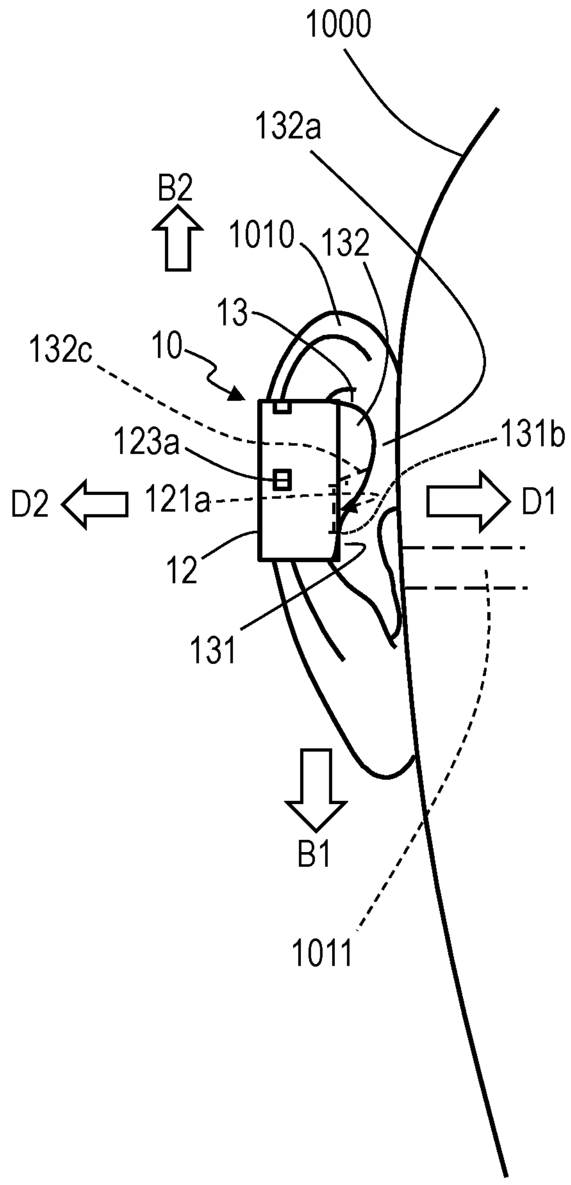
FIG. 5 is a diagram for illustrating how the acoustic signal output device according to the embodiment is used.

Referring to FIG. 5, how the acoustic signal output device 10 is worn is illustrated. The acoustic signal output device 10 in the present embodiment is attached to an auricle 1010 (body) of a user 1000 such that the support portion 13 side faces the auricle 1010 side. With the housing 12 and the support portion 13 (the structure portion) thus attached to the auricle 1010 of the user 1000, the area 132 (the second area) of the support portion 13 is supported in contact with some portion of the auricle 1010 (body), while the area 131 (the first area) of the support portion 13 is positioned on an ear canal 1011 side without causing contact of the opened end 131*b* of the sound hole 121*a* (the first sound hole) and the area 131 (the first area) with at least part of the auricle 1010 (body). For example, when the acoustic signal output device 10 is worn, the area 132 is positioned on the upper side of the auricle 1010 and the surface 132*a* of the area 132 is supported in contact with an upper portion of the auricle 1010 (such as the triangular fossa and the scapha). This can prevent the sound hole 121*a* from making contact with some portion of the auricle 1010 of the user 1000 and being obstructed by it. High stability during wearing is also provided because the area 132 serves as a support in contact with the auricle 1010. With the area 132 of a convex shape in particular, the area 132 will fit into the concave shape of the auricle 1010 to serve as a support, thus increasing the stability during wearing. This effect is higher with the area 132 made of an elastic body than of a rigid body. When the acoustic signal output device 10 is worn, the area 131 is positioned on the lower side relative to the area 132 (on the ear canal 1011 side), for example. As mentioned earlier, the outer surface area 130 of the support portion 13 is shaped so as to direct the acoustic signal AC1 (the first acoustic signal) emitted from the sound hole 121*a* (the first sound hole) to the area 131 (the first area) side (the B1-direction side). Thus, the acoustic signal AC1 emitted from the sound hole 121*a* is directed to the ear canal 1011 side (the lower side of the auricle 1010) and emitted. Since the area 132, supported by the auricle 1010, protrudes further than the area 131, the opened end 131*b* and at least part of the area 131 do not make contact with the auricle 1010. Preferably, the opened end 131*b* and the area 131 make no contact with the auricle 1010. Also, the support portion 13 does not obstruct the ear canal 1011. This allows the acoustic signal AC1 emitted from the sound hole 121*a* to reach the ear canal 1011 efficiently. If the inclined portion 132*c* of the support portion 13 is in a shape of a taper extending from the surface 131*a* through to the surface 132*a* as mentioned above, the acoustic signal AC1 emitted from the sound hole 121*a* reaches the ear canal 1011 even more efficiently. Meanwhile, since the opened end 131*b* of the sound hole 121*a* on the B2-direction side is surrounded by the area 132, the acoustic signal AC1 emitted from the sound hole 121*a* can be kept from leaking to the B2-direction side (sound leakage). That is, when the housing 12 and the support portion 13 (the structure portion) are attached to the auricle 1010 (body), the sound pressure level of the acoustic signal AC1 (the first acoustic signal) that is emitted to the ear canal 1011 side is higher than the sound pressure level of the acoustic signal AC1 (the first acoustic signal) that is emitted in directions other than the ear canal 1011 side.

Figure 6A:
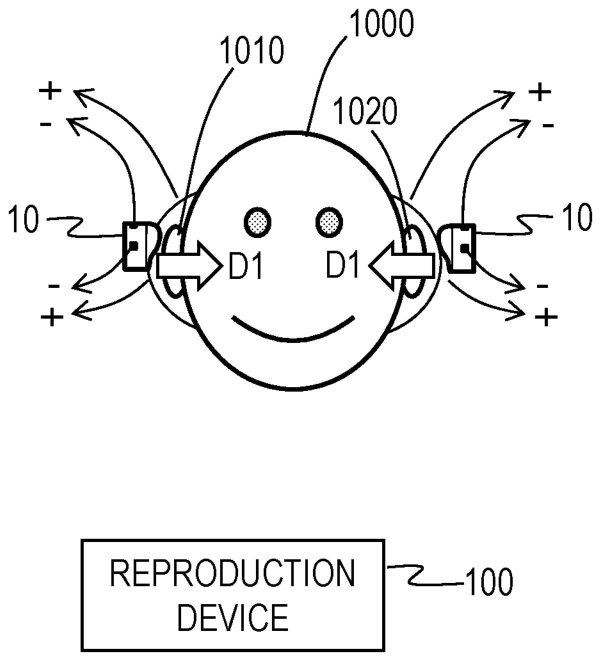
FIG. 6A is a diagram for illustrating how the acoustic signal output device according to the embodiment is used.
Figure 6B:
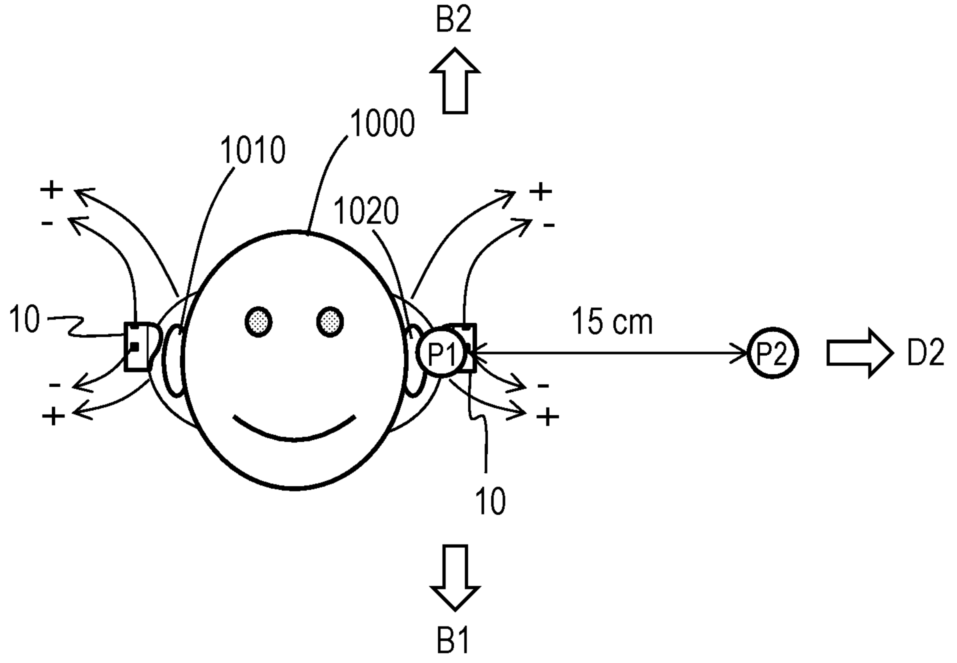
FIG. 6B is a diagram for illustrating observation conditions for acoustic signals emitted from the acoustic signal output device according to the embodiment.

Moreover, the opened ends of the sound holes 123*a* (the second sound holes) in the present embodiment face the space outside the space SP, which is surrounded by the area 132 (the second area). The sound holes 123*a* (the second sound holes) are also positioned offset to the B2-direction (the second direction) side. Due to this arrangement, the acoustic signal AC2 emitted from the sound holes 123*a* is less likely to reach the ear canal 1011 side of the user 1000 than the acoustic signal AC1 emitted from the sound hole 121*a*. In addition, this acoustic signal AC2 has the effect of canceling any acoustic signal AC1 leaking to the outside to suppress sound leakage. Referring to FIGS. 6A and 6B, this will be described. In the example of FIG. 6A, one acoustic signal output device 10 is attached to each of the right ear auricle 1010 and a left ear auricle 1020 of the user 1000. A certain attachment mechanism is used for attachment of the acoustic signal output device 10 to the ears. As mentioned above, the D1-direction side of each acoustic signal output device 10 is oriented to the user 1000 side. An output signal that is output by a reproduction device 100 is input to the driver unit 11 of each acoustic signal output device 10, and the driver unit 11 emits the acoustic signal AC1 to the D1-direction side and the acoustic signal AC2 to the other side. From the sound hole 121*a*, the acoustic signal AC1 is emitted. The emitted acoustic signal AC1 enters the right and left ear canals 1011 to be heard by the user 1000. Meanwhile, from the sound holes 123*a*, the acoustic signal AC2, which is the opposite phase signal of the acoustic signal AC1 or an approximate signal of the opposite phase signal, is emitted. A portion of this acoustic signal AC2 cancels a portion (sound leakage components) of the acoustic signal AC1 emitted from the sound hole 121*a*. That is, by the emission of the acoustic signal AC1 (the first acoustic signal) from the sound hole 121*a* (the first sound hole) and the emission of the acoustic signal AC2 (the second acoustic signal) from the sound holes 123*a* (the second sound holes), an attenuation factor $\eta_{11}$ of the acoustic signal AC1 (the first acoustic signal) at position P2 (a second point) with respect to position P1 (a first point) can be made equal to or less than a predefined value $\eta_{th}$, or an amount of attenuation $\eta_{12}$ of the acoustic signal AC1 (the first acoustic signal) at the position P2 (the second point) with respect to the position P1 (the first point) can be made equal to or more than a predefined value $\omega_{th}$. Here, the position P1 (the first point) is a predefined point that is reached by the acoustic signal AC1 (the first acoustic signal) emitted from the sound hole 121*a* (the first sound hole). Meanwhile, the position P2 (the second point) is a predefined point that is at a greater distance from the acoustic signal output device 10 than the position P1 (the first point) is. The positions P1, P2 may be any points; for example, the positions P1, P2 can be positions in directions other than the B1 direction of the acoustic signal output device 10, such as positions in the B2 direction or the D2 direction of the acoustic signal output device 10. The predefined value $\eta_{th}$ is a value that is smaller (lower) than an attenuation factor $\eta_{21}$ associated with air conduction of an arbitrary or particular acoustic signal (sound) at the position P2 (the second point) with respect to the position P1 (the first point). The predefined value $\omega_{th}$ is a value that is greater than an amount of attenuation $\eta_{22}$ associated with air conduction of an arbitrary or particular acoustic signal (sound) at the position P2 (the second point) with respect to the position P1 (the first point). That is, the acoustic signal output device 10 in the present embodiment is designed such that the attenuation factor $\eta_{11}$ is equal to or less than the predefined value $\eta_{th}$, which is smaller than the attenuation factor $\eta_{21}$, or designed such that an amount of attenuation $\eta_{12}$ is equal to or more than the predefined value $\omega_{th}$, which is greater than the amount of attenuation 122. The acoustic signal AC1 is conducted by air from the position P1 to the position P2 and attenuates due to the air conduction and the acoustic signal AC2. The attenuation factor $\eta_{11}$ is a ratio of a magnitude $AMP_2$(AC1) of the acoustic signal AC1 at the position P2 that has attenuated due to the air conduction and the acoustic signal AC2 to a magnitude $AMP_1$(AC1) of the acoustic signal AC1 at the position P1 ($AMP_2$(AC1)/$AMP_1$(AC1)). The amount of attenuation $\eta_{12}$ is the difference between the magnitude $AMP_1$(AC1) and the magnitude $AMP_2$(AC1) (|$AMP_1$(AC1)−$AMP_2$(AC1)|). By contrast, when the acoustic signal AC2 is not assumed, an arbitrary or particular acoustic signal $AC_{ar}$ that is conducted by air from the position P1 to the position P2 attenuates due to the air conduction, without being affected by the acoustic signal AC2. The attenuation factor $\eta_{21}$ is the ratio of the magnitude $AMP_2(AC_{ar})$ of the acoustic signal $AC_{ar}$ at the position P2 that has attenuated due to the air conduction (attenuated without being affected by the acoustic signal AC2) to the magnitude $AMP_1(AC_{ar})$ of the acoustic signal $AC_{ar}$ at the position P1 ($AMP_2(AC_{ar})/AMP_1(AC_{ar})$). The amount of attenuation $\eta_{22}$ is the difference between the magnitude $AMP_1(AC_{ar})$ and the magnitude $AMP_2(AC_{ar})$ ($|AMP_1(AC_{ar})-AMP_2(AC_{ar})|$). Examples of the magnitude of an acoustic signal include the sound pressure of the acoustic signal and the energy of the acoustic signal. "Sound leakage components" refer to components of the acoustic signal AC1 emitted from the sound hole 121*a* that are likely to reach an area other than the user 1000 wearing the acoustic signal output device 10 (such as a person other than the user 1000 wearing the acoustic signal output device 10), for example. For example, "sound leakage components" refer to those components of the acoustic signal AC1 that propagate in directions other than the D1 direction. For example, a direct wave of the acoustic signal AC1 is primarily emitted from the sound hole 121*a* and a direct wave of the acoustic signal AC2 is primarily emitted from the sound holes 123*a*. A portion (sound leakage components) of the direct wave of the acoustic signal AC1 emitted from the sound hole 121*a* is canceled by interfering with at least a portion of the direct wave of the acoustic signal AC2 emitted from the sound holes 123*a*. However, this is not a limitation on the present invention; this cancelation can occur with waves other than direct waves. Specifically, a sound leakage component which is at least one of a direct wave and a reflected wave of the acoustic signal AC1 emitted from the sound hole 121*a* can be canceled by at least one of a direct wave and a reflected wave of the acoustic signal AC2 emitted from the sound holes 123*a*. This can suppress sound leakage.

Since the sound holes 123*a* (the second sound holes) are positioned offset to the B2-direction (the second direction) side, the acoustic signal AC2 emitted from the sound holes 123*a* is less likely to reach the ear canal 1011 side. Thus, on the ear canal 1011 side, the acoustic signal AC1 is less likely to be canceled by the acoustic signal AC2. That is, because the sound holes 123*a* are apart from the ear canal 1011, the acoustic signal AC2 emitted from the sound holes 123*a* is less likely to cancel the acoustic signal AC1 emitted from the sound hole 121*a* to the ear canal 1011 side. In other words, the acoustic signal AC2 can suppress sound leakage from the acoustic signal AC1 that leaks somewhere other than the ear canal 1011 side, without significantly suppressing the acoustic signal AC1 emitted to the ear canal 1011 side. For example, preferably, when the acoustic signal output device 10 is attached to the auricle 1010, the distance from the ear canal 1011 to the sound hole 121*a* is from 2 cm to 3 cm inclusive and the distance from the sound hole 121*a* to each sound hole 123*a* is 2 cm or more. However, this is not a limitation on the present invention.

<When being Placed>

Figure 7:
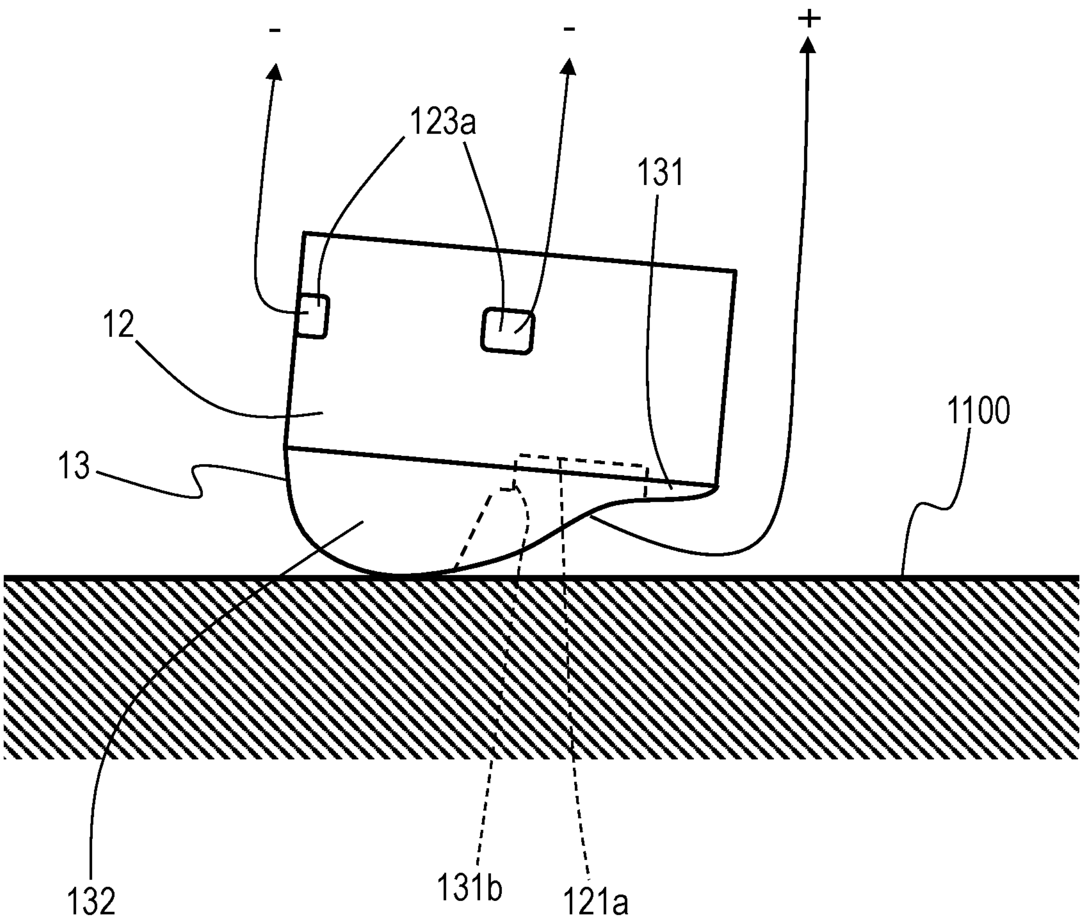
FIG. 7 is a diagram for illustrating the acoustic signal output device according to the embodiment as placed on a plane.

As illustrated in FIG. 7, the acoustic signal output device 10 as placed on a plane 1100 such as on a desk is now described. In FIG. 7, it is placed on the plane 1100 on the support portion 13 side. Even in such a situation, the opened end 131*b* of the sound hole 121*a* and at least part of the area 131 do not make contact with the plane 1100 because the area 132 protrudes further than the area 131. Accordingly, the acoustic signal AC1 emitted from the opened end 131*b* of the sound hole 121*a* and the acoustic signal AC2 emitted from the sound holes 123*a* can cancel each other to suppress sound leakage as mentioned above. That is, in the present embodiment, the position and size of the area 132 and the profile and the angle of the surface 132*a* of the area 132 are defined such that the opened end 131*b* of the sound hole 121*a* and at least part of the area 131 do not make contact with the plane 1100.

Such an effect can also be provided when the acoustic signal output device 10 is placed on the plane 1100 on the housing 12 side. That is, in whichever orientation the acoustic signal output device 10 in the present embodiment is placed on the plane 1100, the acoustic signal AC1 emitted from the opened end 131*b* of the sound hole 121*a* and the acoustic signal AC2 emitted from the sound holes 123*a* can cancel each other to suppress sound leakage as mentioned above.

Modifications of the First Embodiment

Figure 8A:
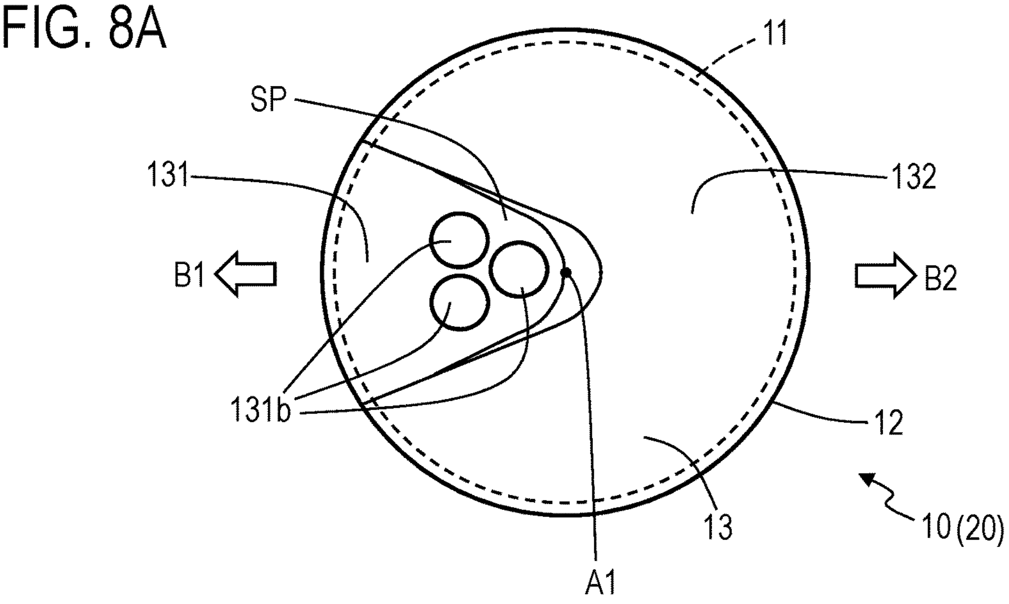
FIG. 8A is a plan view for illustrating the arrangements of sound holes.

The shapes, sizes, and arrangement of the sound hole 121*a* and the sound holes 123*a* are not limited to those illustrated in the first embodiment. For example, the first embodiment showed an example where one sound hole 121*a* is provided in the area AR1 of the housing 12 and the opened end 131*b* of the one sound hole 121*a* is provided in the support portion 13. However, as illustrated in FIG. 8A, multiple sound holes 121*a* may be provided in the area AR1 of the housing 12 and the opened ends 131*b* of the multiple sound holes 121*a* may be provided in the support portion 13. In this case, these multiple sound holes 121*a* and their opened ends 131*b* may be at eccentric locations offset in the B1 direction from the axis A1.

The first embodiment showed an example where the sound holes 123*a* of the same shape and the same size are arranged on the same circumference of the wall portion 123 of the housing 12. However, the sound holes 123*a* can be of any shape and size as long as the opened ends of the sound holes 123*a* face the space outside the space SP surrounded by the area 132 and the sound holes 123*a* are positioned offset to the B2-direction side. Specifically, what is required is that the sound pressure level of the acoustic signal AC2 that is emitted from the sound holes 123*a* into the space SP1 is lower than the sound pressure level of the acoustic signal AC2 that is emitted from the sound holes 123*a* into the space SP2. As mentioned above, the space SP1 is a space positioned on the B1-direction side relative to the sound hole 121*a*, and the space SP2 is a space positioned on the B2-direction side relative to the sound hole 121*a*.

Figure 8B:
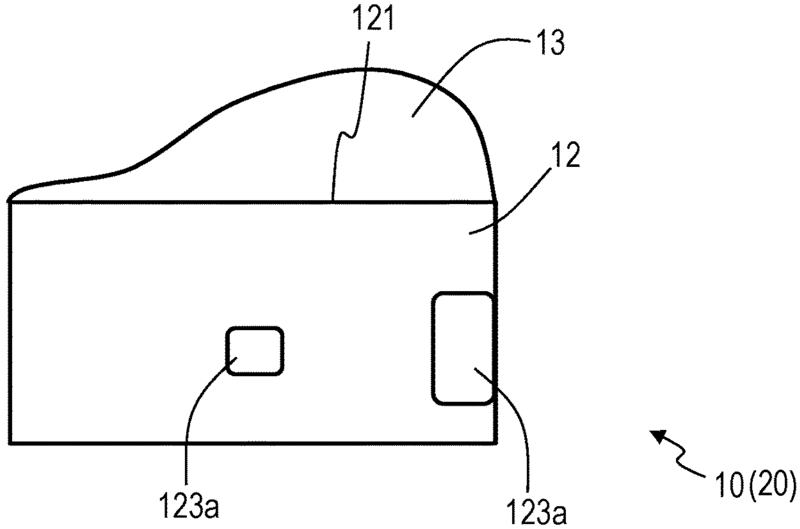
FIGS. 8B and 8C are front views for illustrating the arrangements of sound holes.
Figure 8C:
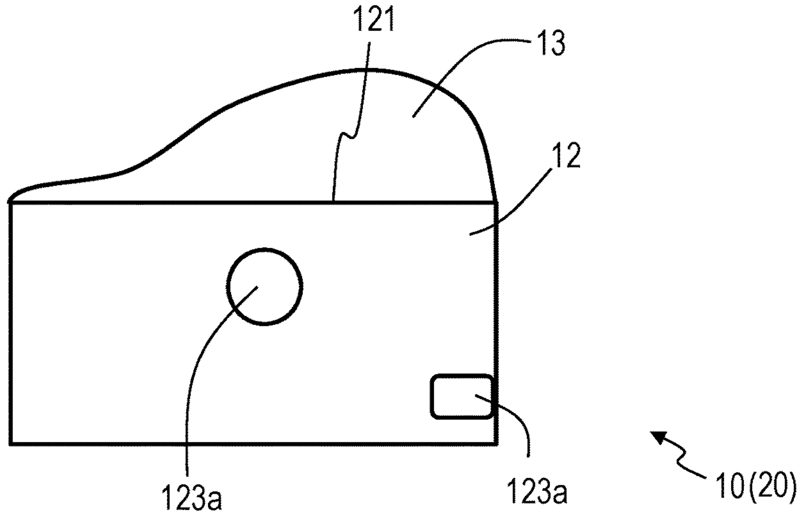

For example, multiple sound holes 123*a* (the second sound holes) of different sizes may be provided as illustrated in FIG. 8B, or multiple sound holes 123*a* (the second sound holes) of different shapes may be provided as illustrated in FIG. 8C, or the multiple sound holes 123*a* may not be arranged on the same circumference.

Figure 9A:
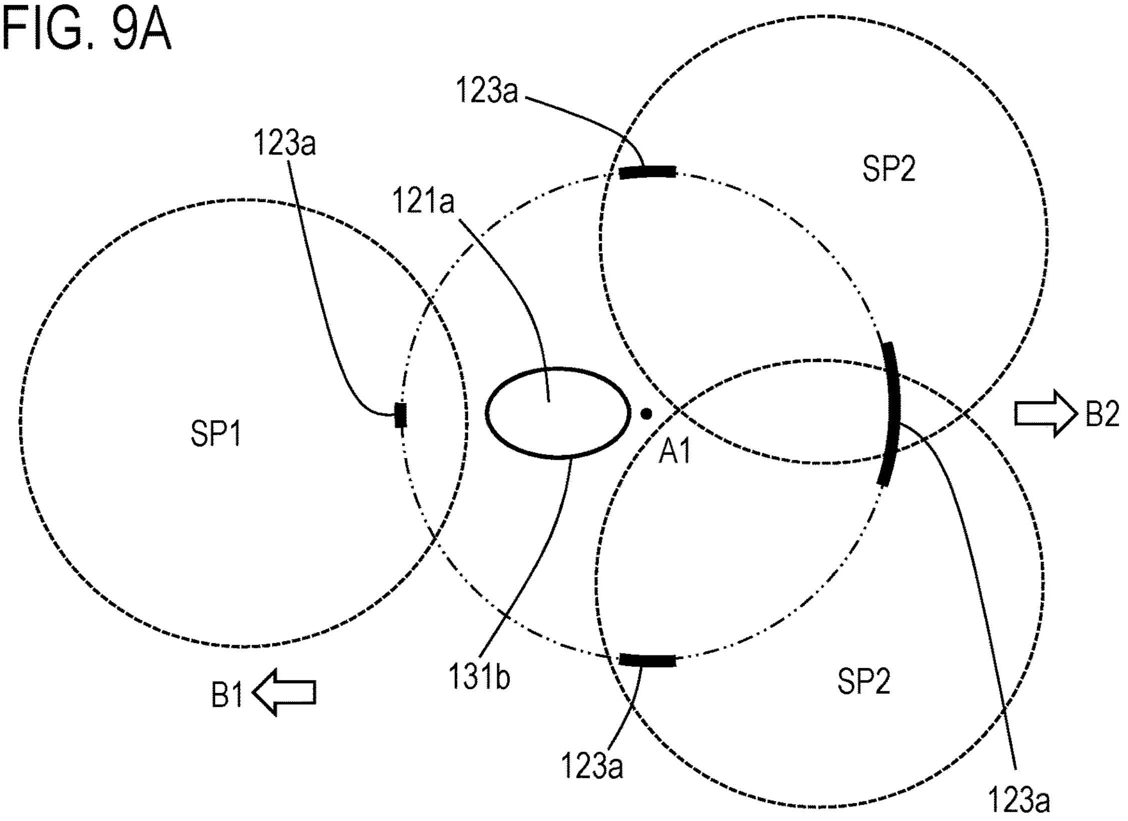
FIGS. 9A and 9B are conceptual views for illustrating the arrangements of sound holes.
Figure 9B:
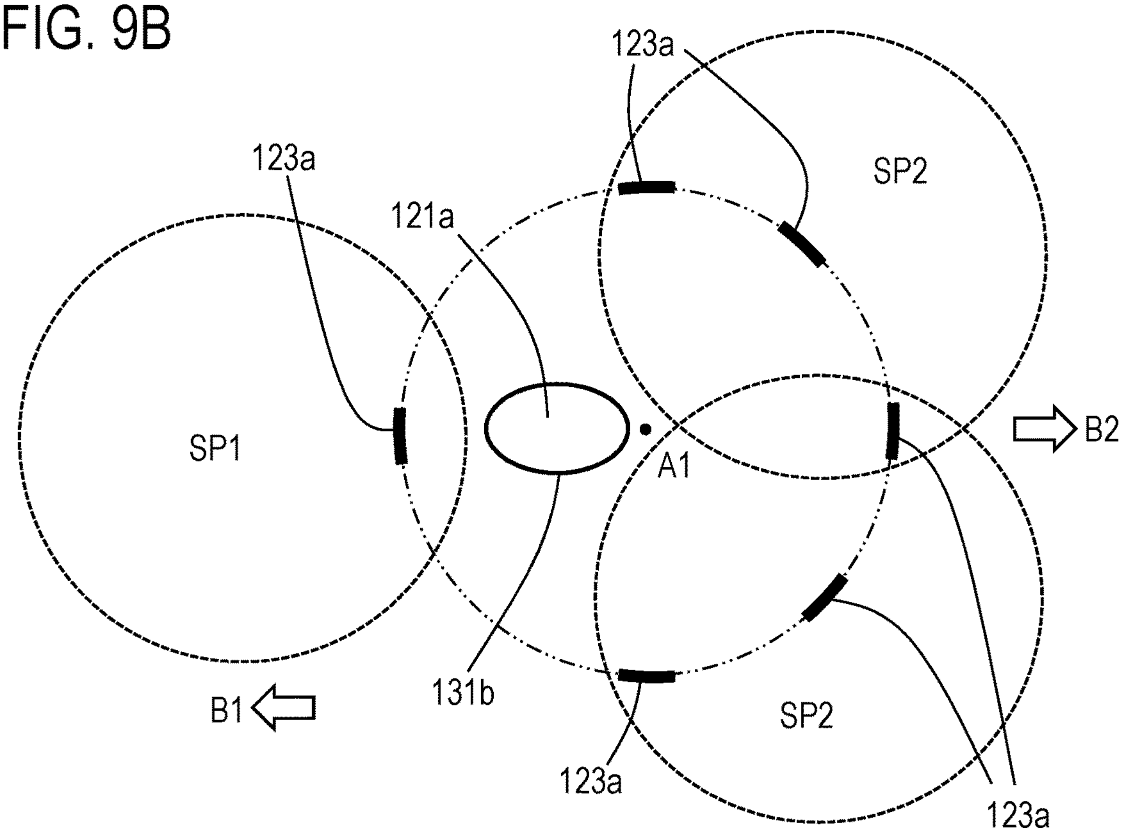

For example, as illustrated in FIGS. 9A and 9B, sound holes 123*a* may also be provided on the B1-direction side of the axis A1. In this case, what is required is also that the opening area of the sound holes 123*a* positioned on the B1-direction side of the axis A1 is smaller than the opening area of the sound holes 123*a* positioned offset to the B2-direction side, or that the opening area per unit area of the sound holes 123*a* positioned on the B1-direction side of the axis A1 (that is, the density of the opening areas) is smaller than the opening area per unit area of the sound holes 123*a* positioned offset to the B2-direction side. This is because with this arrangement, the total area of the opened ends of the sound holes 123*a* that face the space SP1 is smaller than the total area of the opened ends of the sound holes 123*a* that face the space SP2 and the sound pressure level of the acoustic signal AC2 that is emitted from the sound holes 123*a* into the space SP1 is lower than the sound pressure level of the acoustic signal AC2 that is emitted from the sound holes 123*a* into the space SP2. For example, the design may be made such that the opening area of the opened end of a sound hole 123*a* located at a distance of $\alpha_1$ from the opened end 131*b* of the sound hole 121*a* is smaller than the opening area of the opened end of a sound hole 123*a* located at a distance of $\alpha_2$ from the opened end 131*b* of the sound hole 121*a*. Here, $\alpha_1<\alpha_2$. For example, the configuration may be such that the opened end of a sound hole 123*a* located at a smaller distance from the opened end 131*b* of the sound hole 121*a* has a smaller opening area.

Figure 10A:
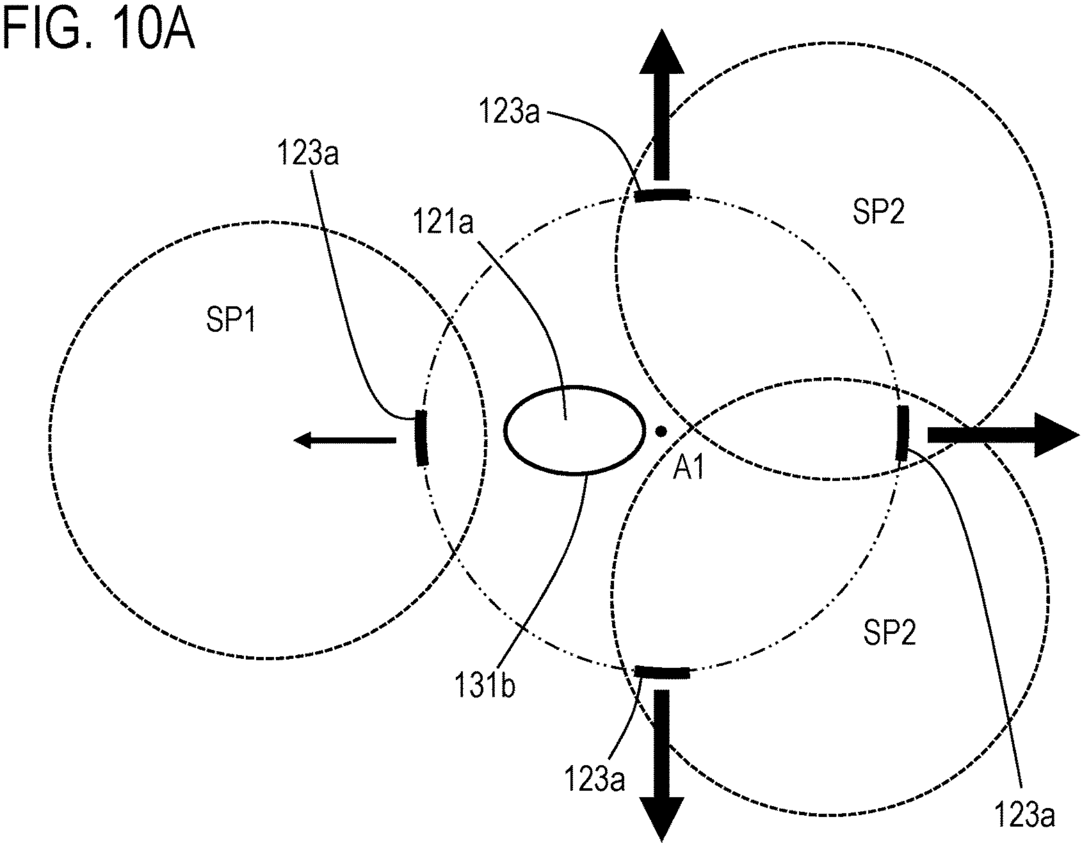
FIGS. 10A and 10B are conceptual views for illustrating the arrangements of sound holes.
Figure 10B:
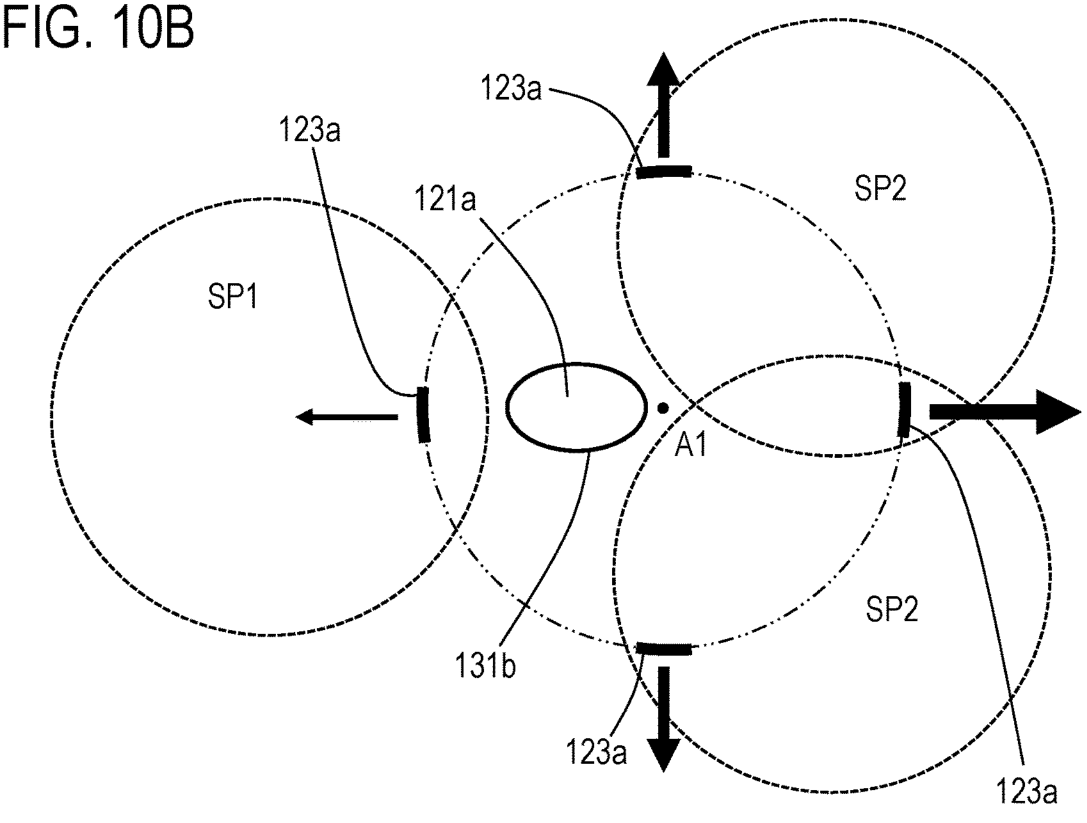

A sound hole 123*a* may even be provided on the B1-direction side of the axis A1 as illustrated in FIGS. 10A and 10B, for example, as long as the sound pressure level of the acoustic signal AC2 that is emitted from it is lower than the sound pressure level of the acoustic signal AC2 that is emitted from a sound hole 123*a* positioned offset to the B2-direction side. For example, the acoustic signal AC2 emitted from the driver unit 11 may have directivity such that the sound pressure level of the acoustic signal AC2 that is emitted from a sound hole 123*a* positioned on the B1-direction side of the axis A1 is lower than the sound pressure level of the acoustic signal AC2 that is emitted from a sound hole 123*a* positioned offset to the B2-direction side. Alternatively, multiple driver units 11 with different output powers may be accommodated inside the housing 12, such that the sound pressure level of the acoustic signal AC2 that is emitted from a sound hole 123*a* positioned on the B1-direction side of the axis A1 is lower than the sound pressure level of the acoustic signal AC2 that is emitted from a sound hole 123*a* positioned offset to the B2-direction side.

Alternatively, a material for attenuating the acoustic signal may be disposed in the opening of the sound hole 123*a* provided on the B1-direction side of the axis A1, or the opening of the sound hole 123*a* provided on the B1-direction side of the axis A1 may be structured as a mesh for attenuating the acoustic signal, for example. In short, what is required is that multiple sound holes 123*a* (the second sound holes) is provided in the housing 12, and that the sound pressure level of the acoustic signal AC2 (the second acoustic signal) that is emitted from the opened ends facing the space SP1 (the first space) among the opened ends of the sound holes 123*a* (the second sound holes) is lower than the sound pressure level of the acoustic signal AC2 (the second acoustic signal) that is emitted from the opened ends facing the space SP2 (the second space) among the opened ends of the sound holes 123*a* (the second sound holes). The design may be made such that the sound pressure level of the acoustic signal AC2 that is emitted from the opened end of a sound hole 123*a* located at a distance of $\alpha_1$ from the opened end 131*b* of the sound hole 121*a* is smaller than the sound pressure level of the acoustic signal AC2 that is emitted from the opened end of a sound hole 123*a* located at a distance of $\alpha_2$ from the opened end 131*b* of the sound hole 121*a*. Here, $\beta_1<\alpha_2$. For example, the design may be made such that a sound hole 123*a* located at a smaller distance from the opened end 131*b* of the sound hole 121*a* emits the acoustic signal AC2 at a lower sound pressure level.

The first embodiment showed an example where multiple sound holes 123*a* are provided in the housing 12; however, a single sound hole 123*a* may be provided in the housing 12. In this case, the opened end of the sound hole 123*a* is preferably spaced from the sound hole 121*a* as much as possible. Preferably, the sound hole 123*a* is provided such that the distance between the opened end of the sound hole 123*a* and the sound hole 121*a* is maximized.

Second Embodiment

A second embodiment is described next. The second embodiment is a further modification of the first embodiment and its modifications. The description below focuses on differences from what was already described, and descriptions on already described matters are simplified.

The acoustic signal output device 10 illustrated in the first embodiment suppresses sound leakage by emitting the acoustic signal AC2 from the sound holes 123*a* to cancel the acoustic signal AC1 emitted from the sound hole 121*a* and leaking to the outside. This is based on the idea that acoustic signal AC2 is ideally is in the opposite phase of the acoustic signal AC1. However, since the propagation path of the acoustic signal AC1 is different from the propagation path of the acoustic signal AC2, a phase difference can occur between the acoustic signal AC1 and the acoustic signal AC2, and the acoustic signal AC2 may not be in the opposite phase of the acoustic signal AC1 at the position where sound leakage should be suppressed. Such an effect increases as the frequencies of the acoustic signals AC1, AC2 are higher; thus, sound leakage is more difficult to suppress as the frequencies are higher. In some cases, the acoustic signal AC2 does not cancel the acoustic signal AC1; on the contrary, the acoustic signal AC2 is also perceived as a sound leakage component. For example, sound leakage from the acoustic signal AC1 can be suppressed by the acoustic signal AC2 when the frequencies of the acoustic signals AC1, AC2 are up to around 3 kHz; in higher frequency bands, the acoustic signal AC2 will also become a sound leakage component.

Figure 13:
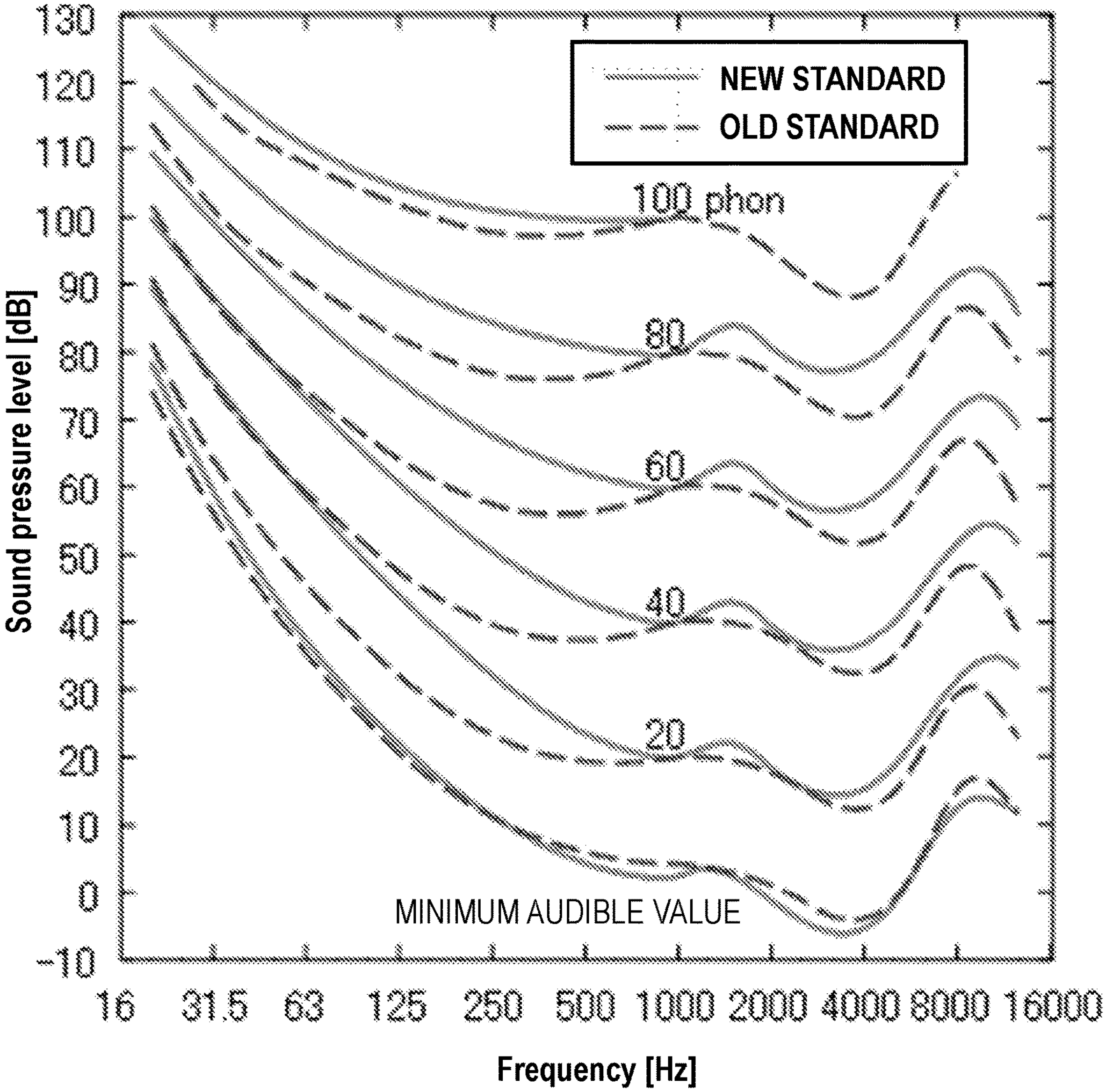
FIG. 13 is a graph illustrating equal loudness contours (ISO 226:2003 Acoustics—Normal equal-loudness-level contours).

In addition, the human ear is sensitive to 3 kHz to 6 kHz bands, in which bands we perceive even a small sound as a loud sound compared to in other bands. Such auditory characteristics of the human being are represented as equal loudness contours. An equal loudness contour is a curve connecting sound pressure levels at which sounds of different frequencies are auditorily perceived as the same loudness. FIG. 13 shows equal loudness contours. The horizontal axis of FIG. 13 represents the frequency [Hz] and the vertical axis represents the sound pressure level [dB]. As shown in FIG. 13, the equal loudness contours are at the minimums around 4 kHz, indicating that the human being has high auditory sensitivity at this frequency. Accordingly, it is desirable that the sound pressure level of the acoustic signal AC2 is decreased in 3 kHz to 6 kHz bands, to which the human being has high auditory sensitivity.

Figure 14A:
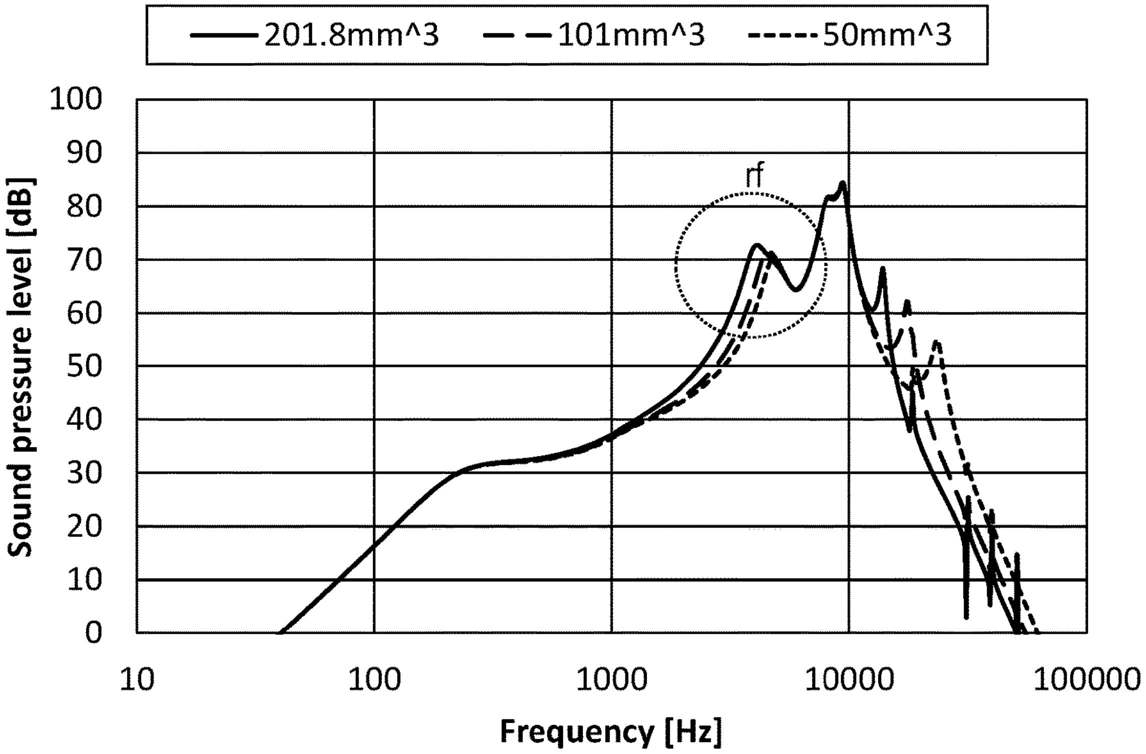
FIG. 14A is a graph for illustrating the relationship between the volume of an inner space of a housing and resonance frequency.

As mentioned above, the acoustic signal AC2 emitted from the driver unit 11 is emitted into the area AR, which is an inner space of the housing 12 (an enclosure), and is further emitted to the outside through the sound holes 123*a*. At the resonance frequency of the area AR, the sound pressure level of the acoustic signal AC2 is at the maximum. Thus, in order to suppress sound leakage on the higher side, it is desirable that this resonance frequency is above the bands to which the human being has high auditory sensitivity (for example, above 6 kHz). FIG. 14A illustrates the relationship between the volume of the area AR and the acoustic signal AC2 that is emitted from a sound hole 123*a* to the outside. As illustrated in FIG. 14A, it can be seen that a smaller volume of the area AR leads to a higher resonance frequency fr. Accordingly, the effect of sound leakage could be decreased by making the volume (capacity) of the area AR small and setting the resonance frequency of the area AR above the bands to which the human being has high auditory sensitivity (for example, above 6 kHz).

However, when the resonance frequency of the area AR is above the bands to which the human being has high auditory sensitivity, the sound pressure level also increases in bands around this resonance frequency and the sound pressure level in the bands to which the human being has high auditory sensitivity increases as well. Thus, the present embodiment adds a further arrangement for decreasing the higher side of the acoustic signal AC2 that is emitted from the sound holes 123*a* to the outside. This can reduce sound leakage in the bands to which the human being has high auditory sensitivity (for example, 3 kHz to 6 kHz bands).

An acoustic signal output device 20 in the present embodiment includes the driver unit 11, the housing 12 (the structure portion) accommodating the driver unit 11 inside, and the support portion 13 (the structure portion) to be positioned on the auricle of the user when attached. The housing 12 (the structure portion) is provided with one or more sound holes 121*a* (the first sound holes) to emit the acoustic signal AC1 (the first acoustic signal) to the outside, a hollow portion in which the acoustic signal AC2 (the second acoustic signal) is emitted into the area AR (an inner space), and one or more sound holes 123*a* (the second sound holes) to emit the acoustic signal AC2 (the second acoustic signal) emitted into the area AR (the inner space) of the hollow portion to the outside. Here, the design is made such that the resonance frequency of the hollow portion is equal to or higher than a predetermined frequency (for example, above the bands to which the human being has high auditory sensitivity, such as above 6 kHz), and that the acoustic signal AC2 (the second acoustic signal) in which frequency band components including the predetermined frequency (for example, band components to which the human being has high auditory sensitivity, such as 3 kHz to 6 kHz band components) have been suppressed is emitted from the sound holes 123*a* (the second sound holes) to the outside. This can reduce sound leakage in the bands to which the human being has high auditory sensitivity (for example, 3 kHz to 6 kHz bands). Examples of such a design are illustrated below.

Design Example 1

Figure 11A:
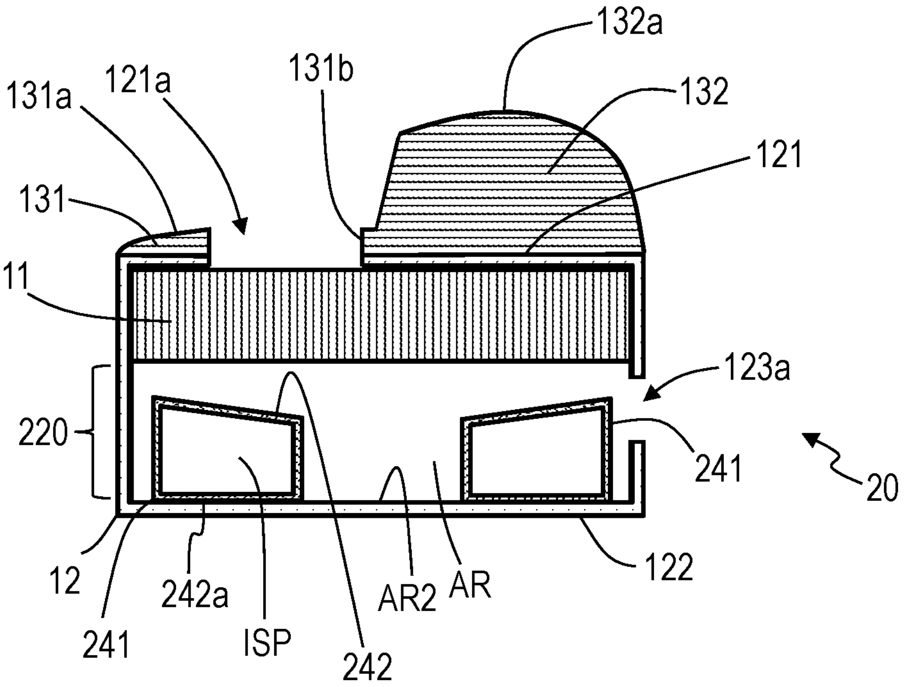
FIG. 11A is an end face view taken at 2A-2A in FIG. 2A.

As illustrated in FIG. 11A, the housing 12 (the structure portion) of the acoustic signal output device 20 may have an inner hollow portion 241 disposed in the area AR (the inner space) of its hollow portion 220. An inner space ISP of the inner hollow portion 241 is spatially separated from the area AR (the inner space) of the hollow portion 220, which is located outside the inner hollow portion 241. That is, the inner hollow portion 241 is a hollow member with a wall portion 242 on the outside, and its inner space ISP is spatially separated from the area AR by the wall portion 242. The inner hollow portion 241 can be of any shape as long as it has such an inner space ISP. There is also no limitation on the material for the wall portion 242. The wall portion 242 may be formed of a rigid body such as synthetic resin and metal, or may be formed of an elastic body such as rubber. The inner space ISP of the inner hollow portion 241 may be completely sealed or may not be completely sealed as long as it is spatially separated from the area AR. The inner space ISP may be filled with air or may be filled with other kind of gas, or further a substance such as an elastic body may be disposed in it. However, a substance disposed in the inner space ISP is preferably a softer substance than the wall portion 242. A bottom surface portion 242*a* of the wall portion 242 of the inner hollow portion 241 in this example is fixed to the area AR2 inside the hollow portion 220. However, this is an example and any area of the wall portion 242 of the inner hollow portion 241 may be fixed to any area inside the hollow portion 220. By thus positioning the inner hollow portion 241 in the area AR of the hollow portion 220 to create a double structure with the hollow portion 220 and the inner hollow portion 241, the volume of the area AR can be decreased and the resonance frequency of the hollow portion 220 can be made higher. Thus, by appropriately designing the volume of the inner hollow portion 241, it is also possible to set the resonance frequency of the hollow portion 220 above the bands to which the human being has high auditory sensitivity (for example, above 6 kHz).

The inner hollow portion 241 in particular has high degree of design freedom; the shape and size of the inner hollow portion 241 can be set so that the volume of the area AR is sufficiently small. For example, it is possible to design the inner hollow portion 241 such that the inner hollow portion 241 does not contact the driver unit 11 and is at a minimized distance from the driver unit 11, thereby making the resonance frequency of the hollow portion 220 sufficiently high. Moreover, air or the like in the inner space ISP of the inner hollow portion 241 serves as a dumper to reduce the vibration of the hollow portion 220. Thus, the higher-side frequency band components of the acoustic signal AC2 (the second acoustic signal) emitted from the sound holes 123*a* (the second sound hole) to the outside can be suppressed.

Design Example 2

Figure 11B:
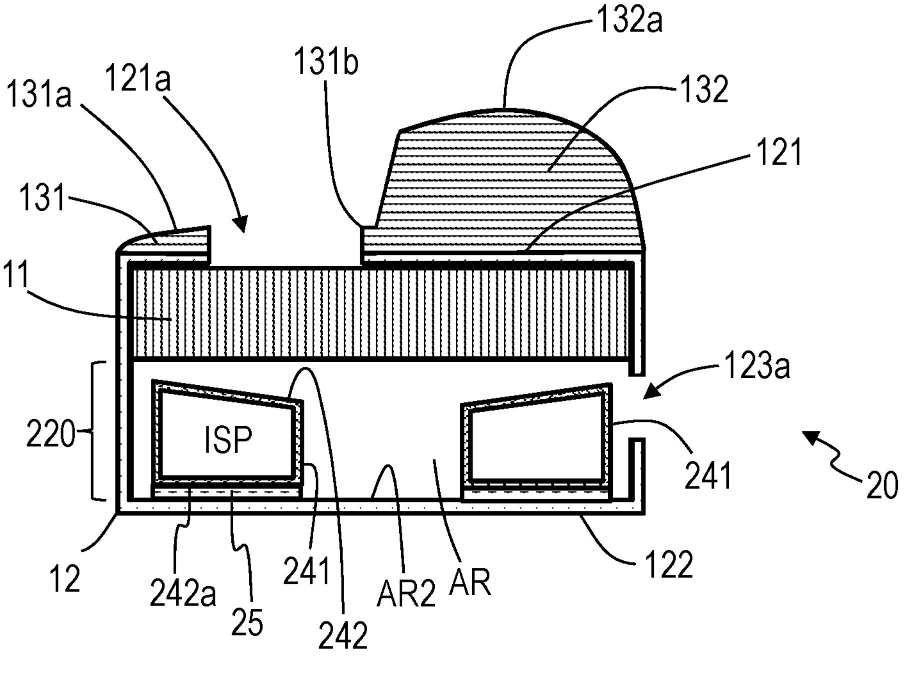
FIG. 11B is an end face view taken at 2A-2A in FIG. 2A.

As illustrated in FIG. 11B, a buffer material 25 may be disposed between the bottom surface portion 242*a* (the outer side) of the inner hollow portion 241 and the area AR2 (the inner side) of the hollow portion 220, and the bottom surface portion 242*a* (the outer side) of the inner hollow portion 241 may be fixed to the area AR2 (the inner side) of the hollow portion 220 via the buffer material 25. While in this example the buffer material 25 is disposed on the bottom surface portion 242*a* of the inner hollow portion 241, the buffer material 25 may be disposed between a different wall portion 242 of the inner hollow portion 241 and the inside of the hollow portion 220, and the different wall portion 242 of the inner hollow portion 241 may be fixed to the inside of the hollow portion 220 via the buffer material 25. The buffer material 25 is softer than the wall portion 122 of the housing 12 and the wall portion 242 of the inner hollow portion 241, which can further reduce the vibration of the hollow portion 220. This in turn can suppress higher-side frequency band components of the acoustic signal AC2 that is emitted from the sound holes 123*a* to the outside. Examples of the material for the buffer material 25 include paper, urethane, and rubber; for example, double-sided tape made of paper may be used as the buffer material 25. This is not a limitation on the present invention, however. If such a buffer material 25 is provided, a solid member with filled interior may be used instead of the inner hollow portion 241.

Design Example 3

Figure 12A:
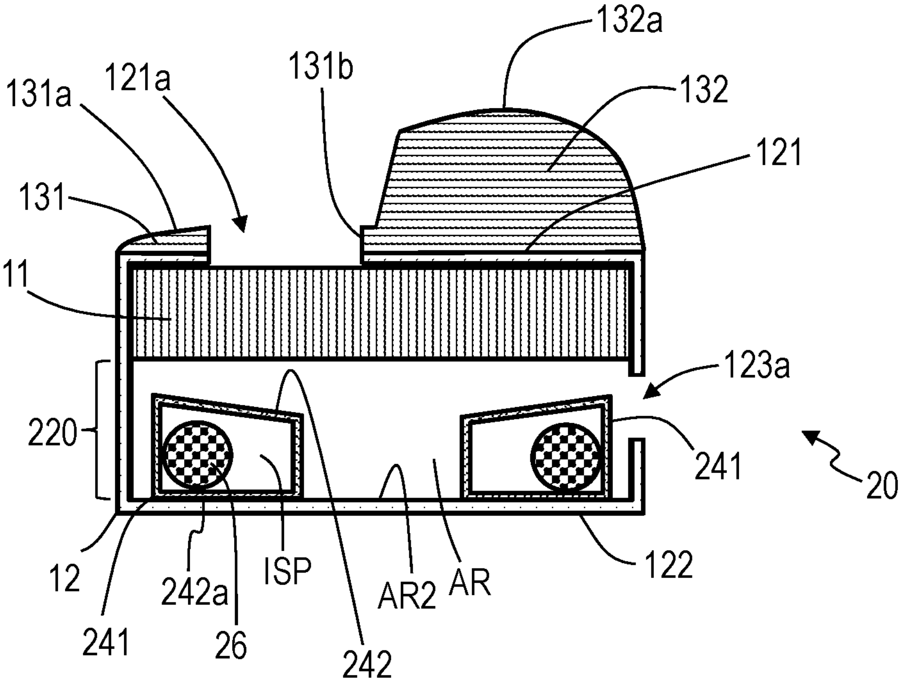
FIG. 12A is an end face view taken at 2A-2A in FIG. 2A.

As illustrated in FIG. 12A, at least a portion of an electronic member 26 for driving the driver unit 11 may be accommodated in the inner space ISP of the inner hollow portion 241. This allows the inner space ISP, serving as a dumper, to be also utilized as a space for placing the electronic member 26, making the housing 12 compact. Examples of the electronic member 26 include a wiring cable, an electronic component, and an electronic board. Considering its function as a dumper, the electronic member 26 is preferably made of a material softer than the wall portion 242, such as a wiring cable. Moreover, the buffer material 25 may be disposed between the bottom surface portion 242*a* (the outer side) of the inner hollow portion 241 and the area AR2 (the inner side) of the hollow portion 220, and the bottom surface portion 242*a* (the outer side) of the inner hollow portion 241 may be fixed to the area AR2 (the inner side) of the hollow portion 220 via the buffer material 25, as described in Design Example 2.

Design Example 4

Figure 12B:
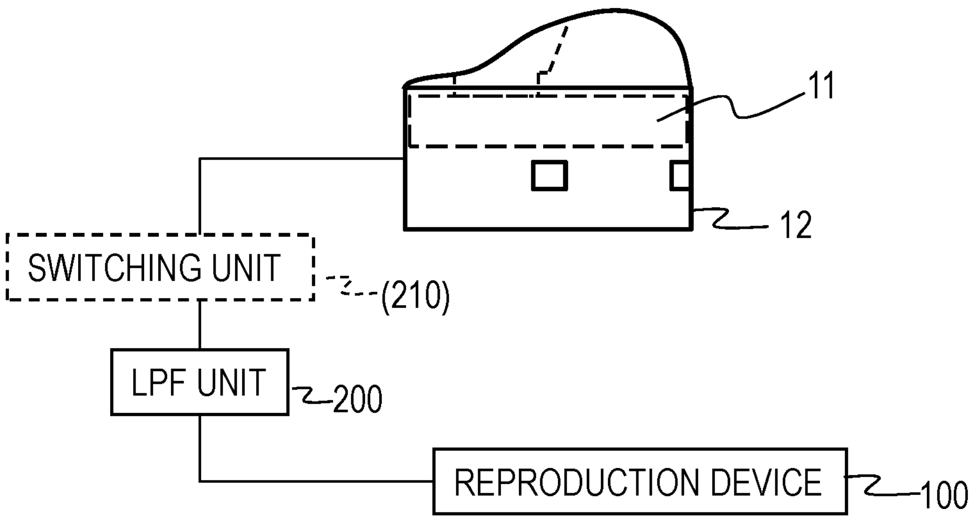
FIG. 12B is a conceptual view illustrating a driving system for an acoustic signal output device according to an embodiment.

In addition to the arrangements described in Design Examples 1 to 3, the driver unit 11 may further emit the acoustic signal AC2 (the second acoustic signal) in which frequency band components including the afore-mentioned predetermined frequency (for example, a band to which the human being has high auditory sensitivity, such as 6 kHz) (for example, band components to which the human being has high auditory sensitivity, such as 3 kHz to 6 kHz band components) have been suppressed to the area AR (the inner space) of the hollow portion 220. For example, as illustrated in FIG. 12B, a low-pass filter (LPF) unit 200 may be provided between the reproduction device 100, which outputs an output signal for driving the driver unit 11, and the driver unit 11. The low-pass filter is intended for suppression (attenuation or flattening) of frequency band components including the afore-mentioned predetermined frequency (for example, a band to which the human being has high auditory sensitivity). The cutoff frequency of the low-pass filter can be 3 kHz, for example. An output signal output by the reproduction device 100 is input to the LPF unit 200, and the LPF unit 200 outputs a low-pass output signal in which the higher side of the output signal has been attenuated. The low-pass output signal is input to the driver unit 11 and the driver unit 11 is driven based on the low-pass output signal. The driver unit 11 thus emits the acoustic signal AC2 (the second acoustic signal) in which frequency band components including the afore-mentioned predetermined frequency (for example, a band to which the human being has high auditory sensitivity, such as 6 kHz) (for example, band components to which the human being has high auditory sensitivity, such as 3 kHz to 6 kHz band components) have been suppressed to the area AR (the inner space) of the hollow portion 220. After being emitted to the area AR (the inner space) of the hollow portion 220, the acoustic signal AC2 (the second acoustic signal) is further emitted to the outside from the sound holes 123*a*. The LPF unit 200 may be implemented with an electronic component such as a coil and a capacitor, or may be implemented through digital processing. When the LPF unit 200 is implemented with electronic components such as a resistor and a capacitor, a power source for driving the LPF unit 200 is unnecessary. In this case, the acoustic signal output device 20 could be of wired type, requiring no power source. The LPF unit 200 may be provided outside of the housing 12 or may be provided in the housing 12 itself.

Design Example 5

As illustrated in FIG. 12B, a switching unit 210 may be further provided. The switching unit 210 switches whether the driver unit 11 emits the acoustic signal AC2 (the second acoustic signal) in which frequency band components including the afore-mentioned predetermined frequency (for example, a band to which the human being has high auditory sensitivity, such as 6 kHz) (for example, band components to which the human being has high auditory sensitivity, such as 3 kHz to 6 kHz band components) have been suppressed to the area AR (the inner space) of the hollow portion 220 or the driver unit 11 emits the acoustic signal AC2 (the second acoustic signal) without suppression of the frequency band components including the predetermined frequency to the area AR (the inner space) of the hollow portion 220. For example, the switching unit 210 switches whether to use the LPF unit 200 of Design Example 4 or not. When the LPF unit 200 is to be used as a result of switching, a low-pass output signal that has passed through the LPF unit 200 is input to the driver unit 11 and the driver unit 11 is driven based on the low-pass output signal, as described in Design Example 4. On the other hand, when the LPF unit 200 is not used as a result of switching, the output signal output by the reproduction device 100 is input to the driver unit 11 without modification and the driver unit 11 is driven based on the output signal. The user can operate such a switching unit 210 at his/her fingertips to suppress sound leakage on the higher side by emitting the acoustic signals AC1, AC2 in which the afore-mentioned frequency band components have been suppressed in an environment where the user needs to care about sound leakage and to make the acoustic signals AC1, AC2 be emitted without suppression of the afore-mentioned frequency band components in an environment where external noise is loud and it is not necessary to care about sound leakage. In the latter case, the user can hear music and sound even in the presence of loud noise because the afore-mentioned frequency band components (for example, band components to which the human being has high auditory sensitivity, such as 3 kHz to 6 kHz band components) are not suppressed. The switching unit 210 may be provided outside of the housing 12 or may be provided in the housing 12 itself.

Design Example 6

Instead of using the LPF unit 200 in Design Example 4, the higher side components (frequency band components including the afore-mentioned predetermined frequency) of the acoustic signal AC2 (the second acoustic signal) that is emitted from the driver unit 11 may be suppressed by means of the structure of the driver unit 11. For example, when the diaphragm of the driver unit 11 is of dynamic type with a cone paper, a stiffness sh of the neck of the cone paper may be designed such that a higher reproduction limit frequency fh of the cone paper is the upper limit (for example, 6 kHz or around) of the bands to which the human being has high auditory sensitivity (for example, 3 kHz to 6 kHz band components). The higher reproduction limit frequency fh and the stiffness sh satisfy the following relationship.

$$fh=(1/(2\pi))\times\sqrt{(sh/M)}$$

Here, M is the mass of the vibration system, including the cone paper. This means that the softer the material of the diaphragm of the driver unit 11 is, the lower the higher reproduction limit frequency fh can be. A combination of such a driver unit 11 and the LPF unit 200 of Design Example 4 is also possible.

Experiment Results

Figure 14B:
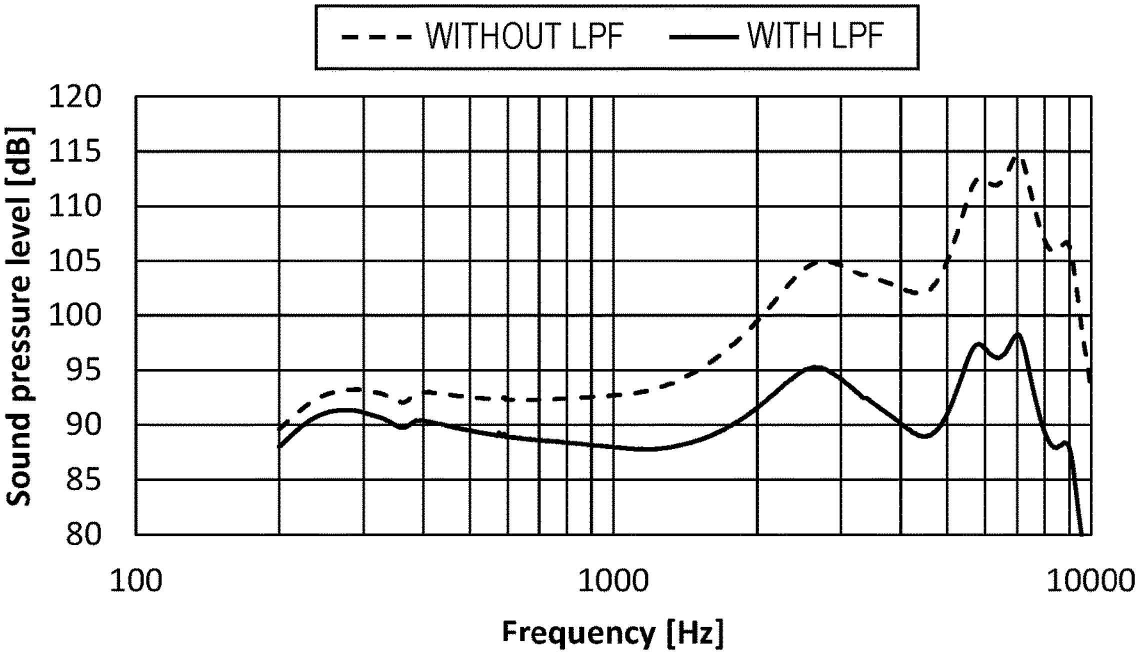
FIG. 14B is a graph for illustrating a sound pressure level with use of a low-pass filter (LPF) (with LPF) and a sound pressure level without using an LPF (without LPF).

FIG. 14B illustrates the sound pressure level with use of the LPF unit 200 (with LPF) and the sound pressure level without using the LPF unit 200 (without LPF). It can be seen that use of the LPF unit 200 can suppress the sound pressure levels in the bands to which the human being has high auditory sensitivity (for example, 3 kHz to 6 kHz band components) and reduce sound leakage, as illustrated in FIG. 14B.

Third Embodiment

For a third embodiment, types of attaching the acoustic signal output devices that have been described above are illustrated.

<Attachment Type 1>

Figure 15:
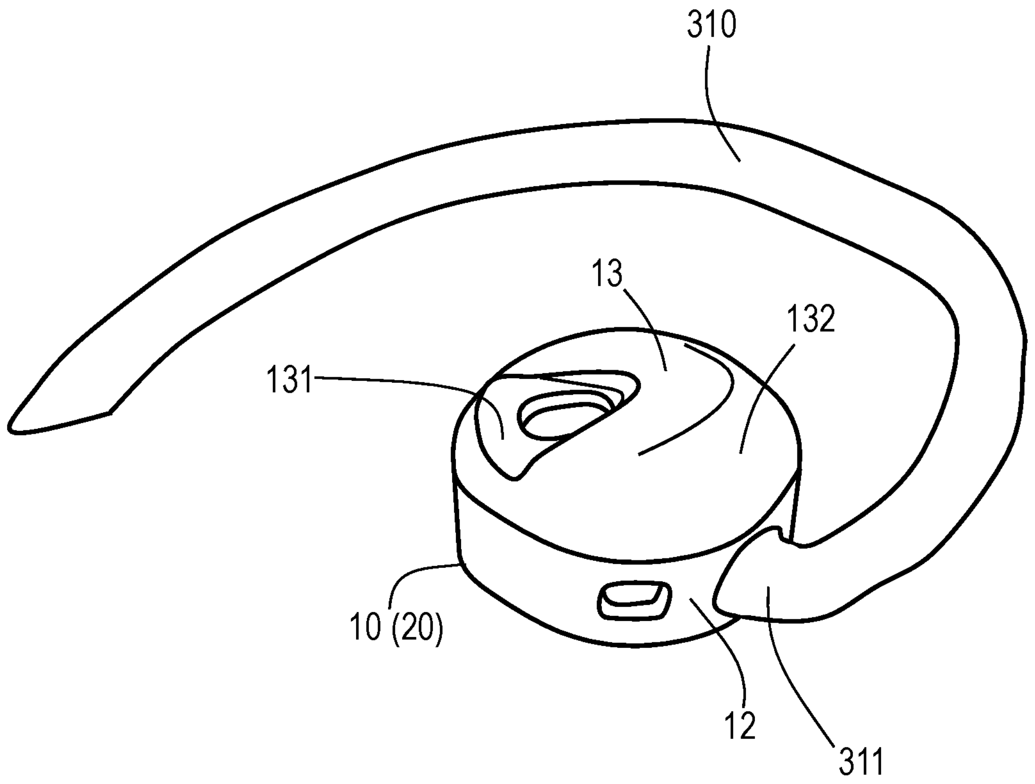
FIG. 15 is a diagram for illustrating an arrangement for attachment of an acoustic signal output device according to an embodiment to the auricle.

In the example of FIG. 15, one end 311 of an ear hooking portion 310 which is in a curved rod shape is fixed to the outer side of the housing 12. By placing the ear hooking portion 310 on the auricle, the user can wear the acoustic signal output device 10 (20) as shown in FIG. 5. In this example, one end 311 of the ear hooking portion 310 is fixed to the area 132 (the second area) side, rather than the area 131 (the first area) side. This causes the acoustic signal AC1 (the first acoustic signal) emitted to the area 131 side to be emitted to the ear canal 1011 without being obstructed by the ear hooking portion 310.

<Attachment Type 2>

Figure 16A:
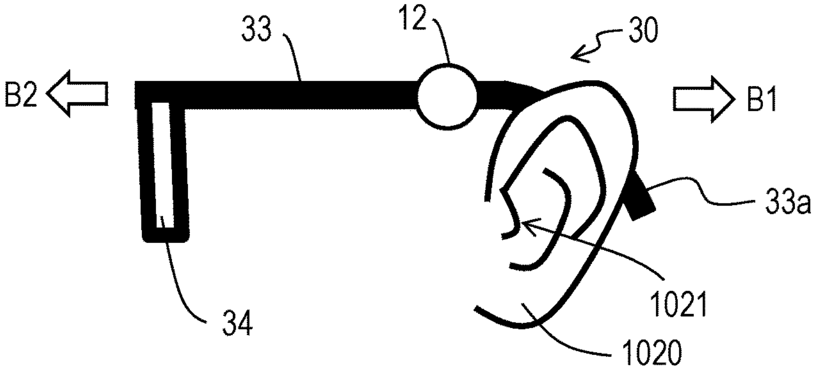
FIG. 16A is a front view of an acoustic signal output device according to an embodiment.
Figure 16B:
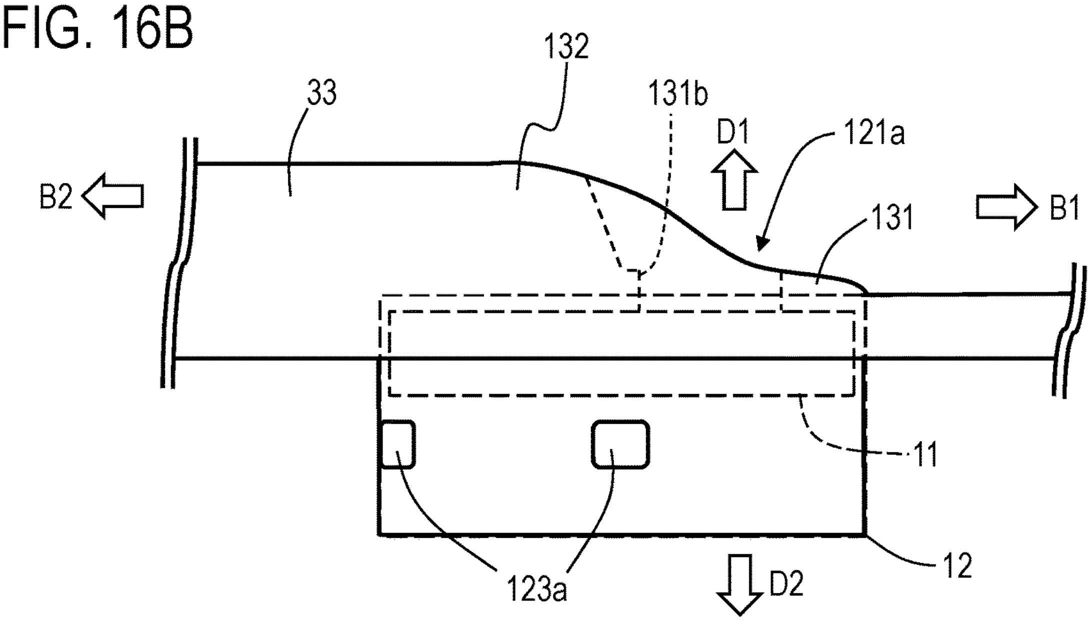
FIG. 16B is a transparent enlarged view of FIG. 16A.
Figure 16C:
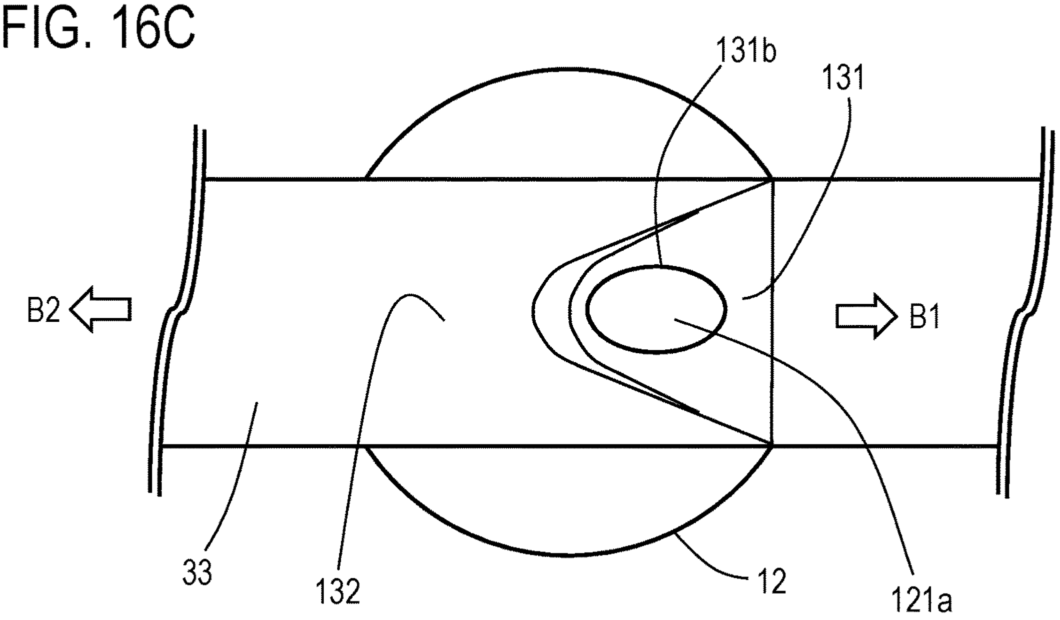
FIG. 16C is an enlarged back view of the acoustic signal output device according to the embodiment.

An acoustic signal output device 30 illustrated in FIGS. 16A to 16C has the support portion 13 of the acoustic signal output device 10 (20) described above incorporated in a temple 33 of a pair of glasses. In this example, the area 131 (the first area) of the support portion 13 is positioned on an ear hooking portion 33*a* side (B1-direction side) of the temple 33, which is to be placed on the auricle 1020, and the area 132 (the second area), protruding further than the area 131 (the first area), is positioned on a lens 34 side (the B2-direction side). The area 132 (the second area) protrudes to the inner side of the temple 33 (D1 direction) and is shaped so as to direct the acoustic signal AC1 (the first acoustic signal) emitted from the sound hole 121*a* (the first sound hole) to the area 131 (the first area) side (the B1-direction side) as mentioned earlier. When the user wears such glasses, the area 132 (the second area) of the support portion 13 is supported in contact with some portion of the user's head (body), and the area 131 (the first area) is positioned on the ear canal 1011 side without causing contact of the opened end 131*b* of the sound hole 121*a* (the first sound hole) and the area 131 (the first area) of the support portion 13 with at least a portion of the head (body). The acoustic signal AC1 emitted from the sound hole 121*a* is directed to the ear canal 1021 side (to the lower side of the auricle 1020), to be emitted.

<Attachment Type 3>

Figure 17:
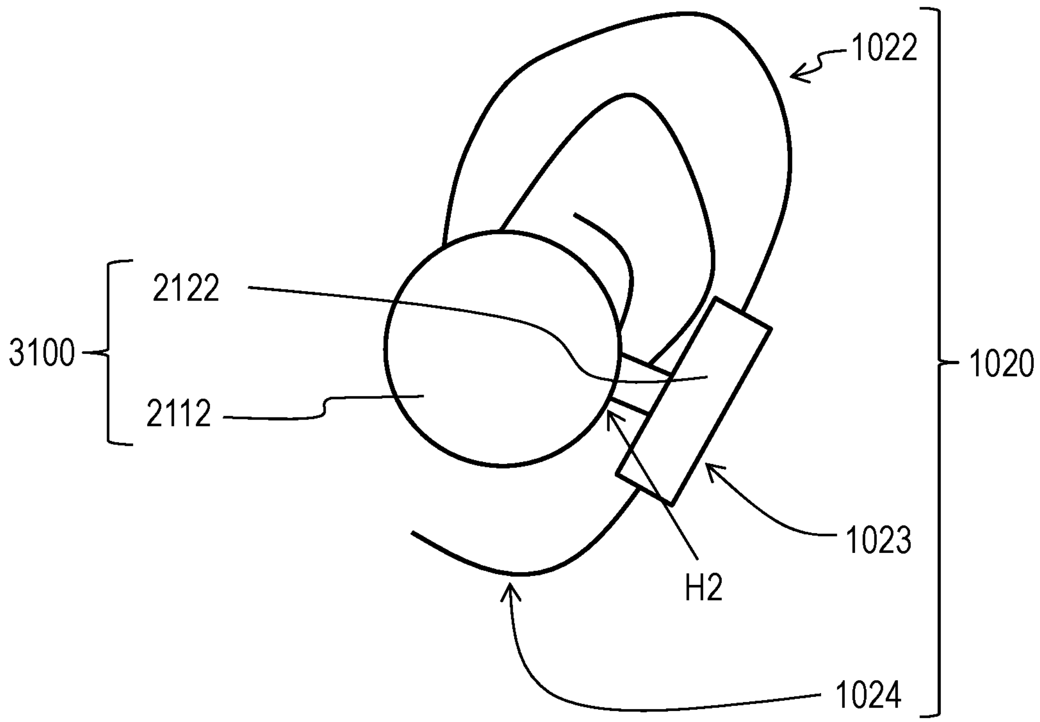
FIG. 17 is a front view for illustrating a modification of the acoustic signal output device according to the embodiment.

As illustrated in FIG. 17, an acoustic signal output device 3100 of attachment type 3 includes a structure portion 2112 including the housing and the support portion, and an attachment portion 2122 holding the structure portion 2112 and configured to be attached to a middle portion 1023 of the auricle 1020. The middle portion 1023 is a portion midway between an upper portion 1022 (the helix side) and a lower portion 1024 (the lobe side) of the auricle 1020. The structure portion 2112 is the housing 12 and the support portion 13 illustrated in the first embodiment, the modifications thereof, and the second embodiment.

<Attachment Type 4>

Figure 18A:
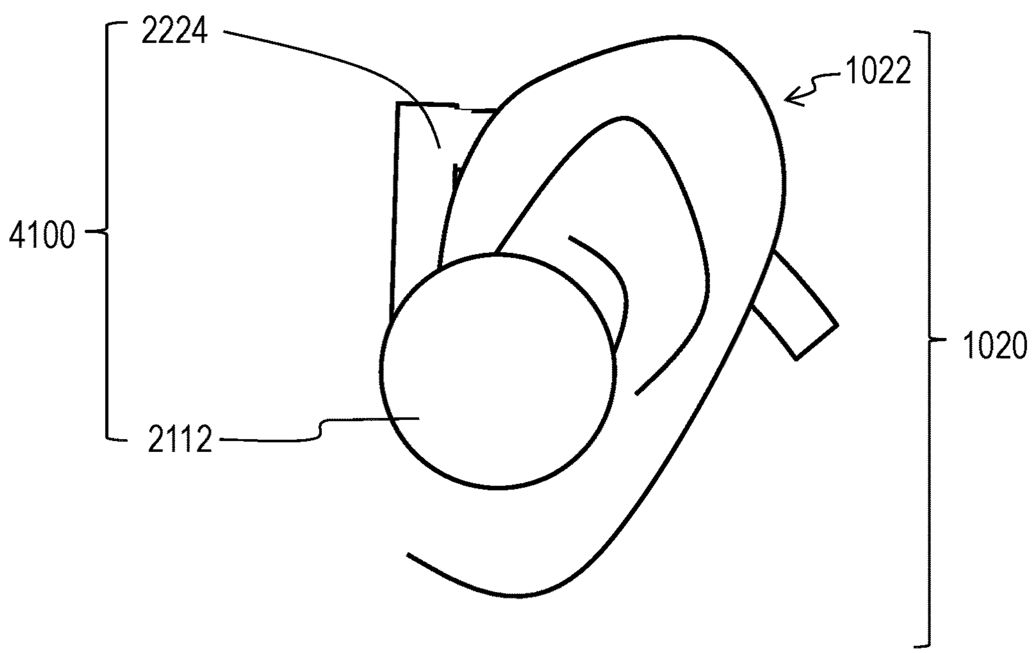
FIG. 18A is a front view for illustrating a modification of the acoustic signal output device according to the embodiment.

As illustrated in FIG. 18A, an acoustic signal output device 4100 of attachment type 4 includes the structure portion 2112 including the housing and the support portion, and an attachment portion 2224 holding the structure portion 2112 and configured to be attached to the upper portion 1022 of the auricle 1020, which is a portion of the auricle 1020.

<Attachment Type 5>

Figure 18B:
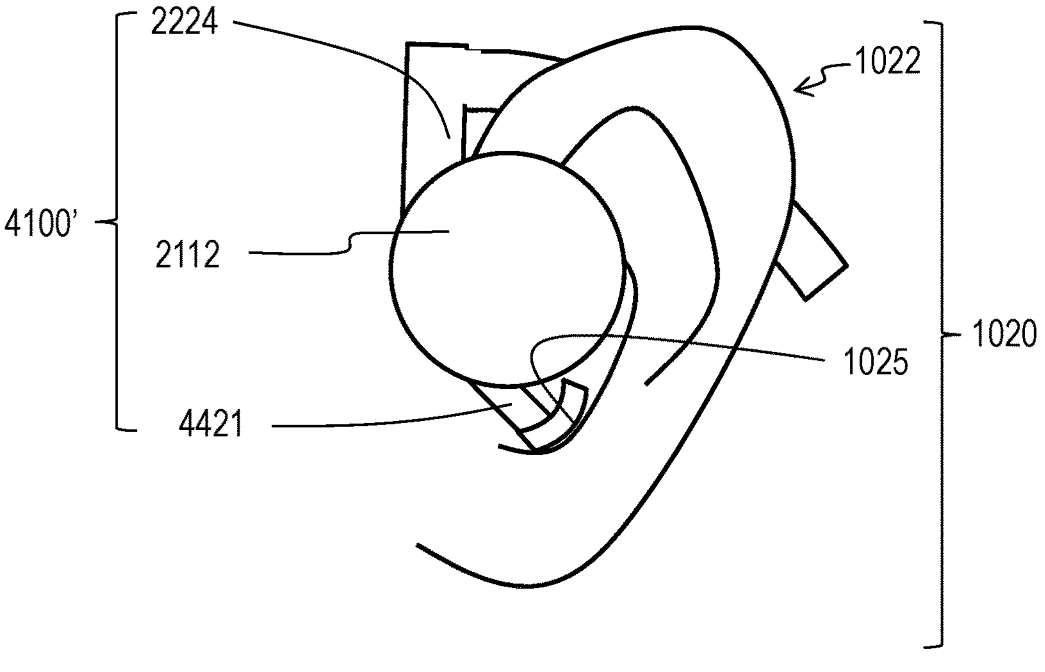
FIG. 18B is a front view for illustrating a modification of the acoustic signal output device according to the embodiment.

As illustrated in FIG. 18B, an acoustic signal output device 4100' of attachment type 5 includes the structure portion 2112 including the housing and the support portion, the attachment portion 2224 holding the structure portion 2112 and configured to be attached to the upper portion 1022 of the auricle 1020, which is a portion of the auricle 1020, and an attachment portion 4421 configured to make contact with a cavity of the concha 1025 of the auricle 1020.

<Attachment Type 6>

Figure 19:
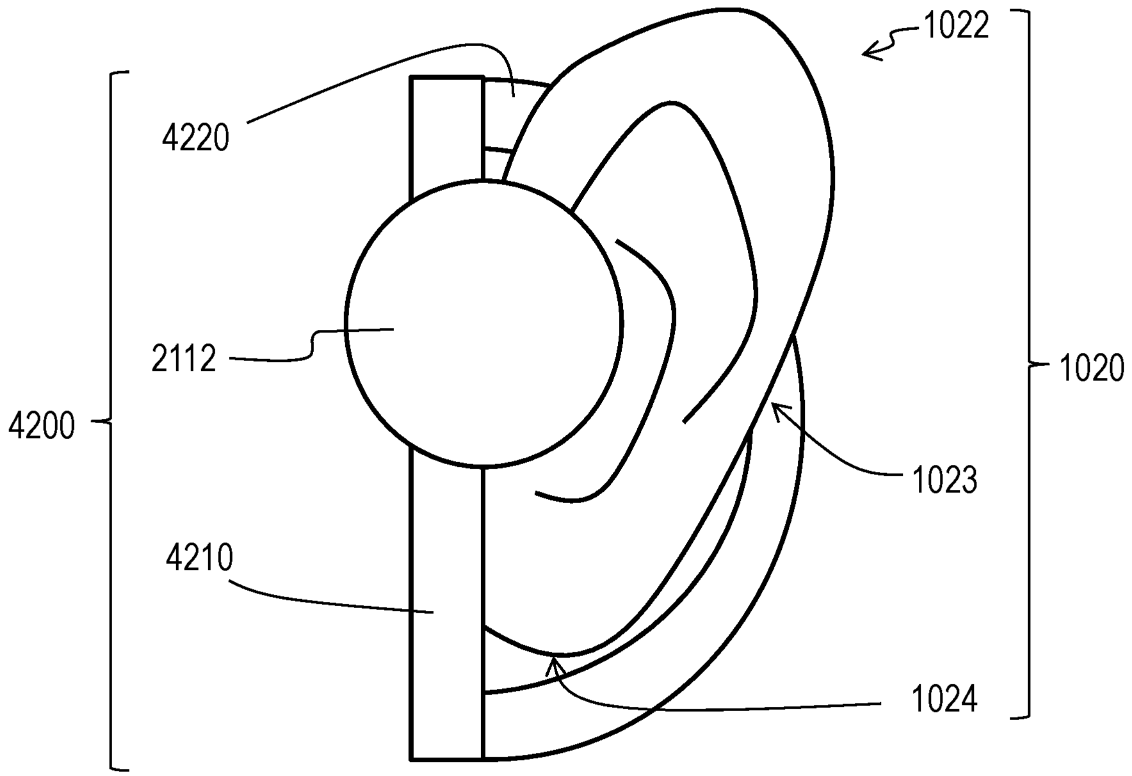
FIG. 19 is a front view for illustrating a modification of the acoustic signal output device according to the embodiment.
Figure 20A:
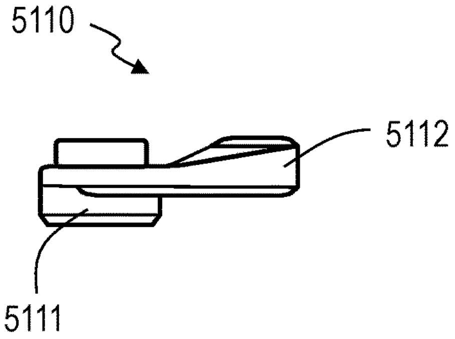
FIG. 20A is a plan view for illustrating a modification of the acoustic signal output device according to the embodiment.
Figure 20B:
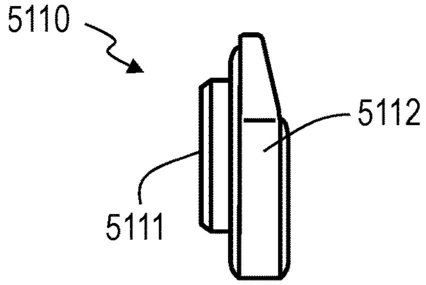
FIG. 20B is a right side view for illustrating the modification of the acoustic signal output device according to the embodiment.
Figure 20C:
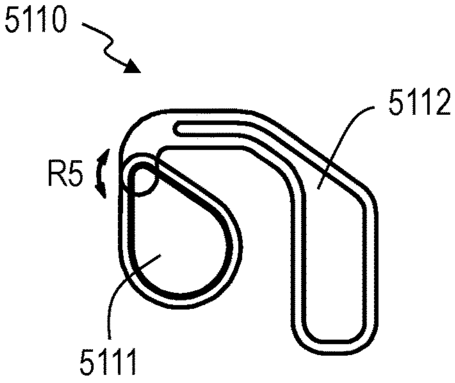
FIG. 20C is a front view for illustrating the modification of the acoustic signal output device according to the embodiment.
Figure 20D:
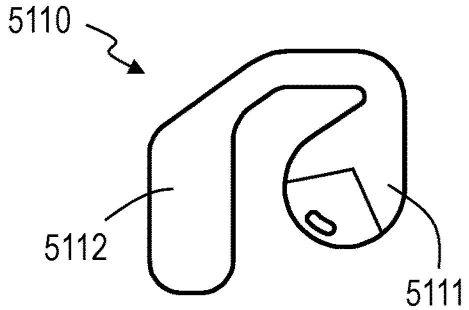
FIG. 20D is a back view for illustrating the modification of the acoustic signal output device according to the embodiment.
Figure 20E:
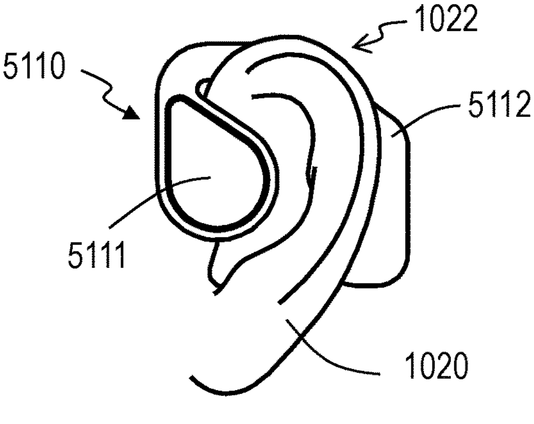
FIG. 20E is a front view for illustrating how the modification of the acoustic signal output device according to the embodiment is used.

An acoustic signal output device 4200 illustrated in FIG. 19 includes the structure portion 2112, a columnar attachment portion 4210 holding the structure portion 2112 and configured to be positioned on the root side of the auricle 1020 when attached, and an arc-shaped attachment portion 4220 held at the opposite ends of the attachment portion 4210 and to be attached to an area from the backside of the upper portion 1022 of the auricle 1020 to the lower portion 1024.

<Attachment Type 7>

An acoustic signal output device 5110 of attachment type 7 illustrated in FIGS. 20A to 20E includes a structure portion 5111 to emit acoustic signals, and an attachment portion 5112 that holds the structure portion 5111 and is of a type hooked on the backside of the upper portion 1022 of the auricle 1020 when attached. The structure portion 5111 is the housing 12 and the support portion 13 illustrated in the first embodiment, the modifications thereof, and the second embodiment. The attachment portion 5112 is a bent, rod-shaped member, at one end of which the structure portion 5111 is attached so as to be turn in R5 direction. The auricle 1020 is held between the structure portion 5111 and the attachment portion 5112, thereby fixing the acoustic signal output device 5110 to the auricle 1020. Also, as the structure portion 5111 is able to turn in the R5 direction relative to one end of the attachment portion 5112, the position of wearing and the locations of the sound holes can be adjusted in accordance with the size and shape of the individual's auricle 1020.

<Attachment type 8>

Figure 21A:
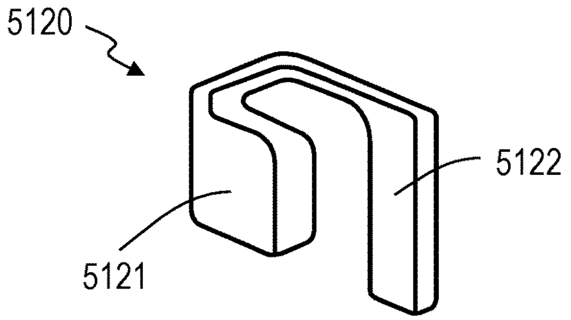
FIG. 21A is a perspective view for illustrating a modification of the acoustic signal output device according to the embodiment.
Figure 21B:
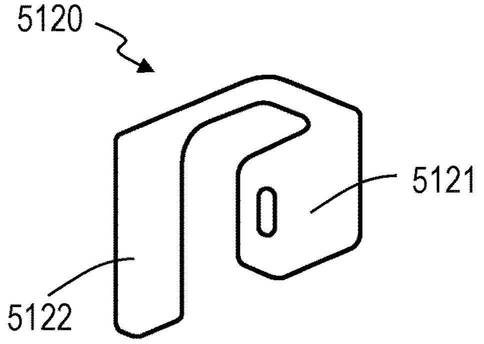
FIG. 21B is a perspective view for illustrating the modification of the acoustic signal output device according to the embodiment.
Figure 21C:
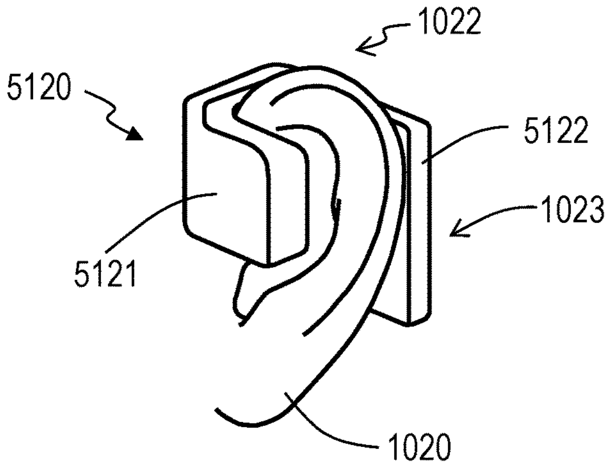
FIG. 21C is a perspective view for illustrating how the modification of the acoustic signal output device according to the embodiment is used.

An acoustic signal output device 5120 of attachment type 8 illustrated in FIGS. 21A to 21C includes a structure portion 5121 to emit acoustic signals, and an attachment portion 5122 that holds the structure portion 5121 and is of a type hooked on the backside of the upper portion 1022 of the auricle 1020 when attached. The structure portion 5121 is the housing 12 and the support portion 13 illustrated in the first embodiment, the modifications thereof, and the second embodiment. Unlike attachment type 7, the structure portion 5121 cannot turn relative to the attachment portion 5122. The auricle 1020 is held between the structure portion 5121 and the attachment portion 5122, thereby fixing the acoustic signal output device 5120 to the auricle 1020.

<Attachment Type 9>

Figure 22A:
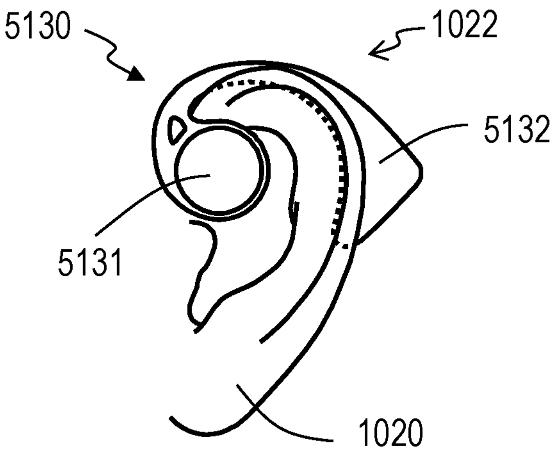
FIG. 22A is a front view for illustrating a modification of the acoustic signal output device according to the embodiment.
Figure 22B:
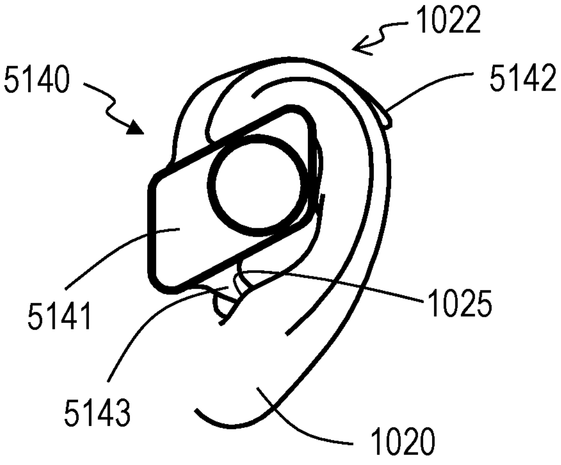
FIG. 22B is a back view for illustrating a modification of the acoustic signal output device according to the embodiment.

Acoustic signal output devices 5130, 5140 of attachment type 9 illustrated in FIGS. 22A and 22B respectively include structure portions 5131, 5141 and attachment portions 5132, 5142. The structure portion 5131, 5141 emits acoustic signals, and the attachment portion 5132, 5142 holds the structure portion 5131, 5141 and is of a type hooked on the backside of the upper portion 1022 of the auricle 1020 when attached. The structure portion 5131, 5141 is the housing 12 and the support portion 13 illustrated in the first embodiment, the modifications thereof, and the second embodiment. The acoustic signal output device 5140 illustrated in FIG. 22B is further provided with an attachment portion 5143 configured to make contact with the cavity of the concha 1025 of the auricle 1020 when attached. This allows for more stable attachment.

<Attachment Type 10>

Figure 23A:
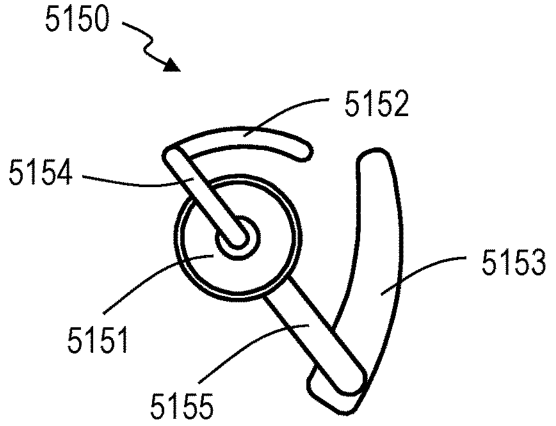
FIG. 23A is a front view for illustrating a modification of the acoustic signal output device according to the embodiment.
Figure 23B:
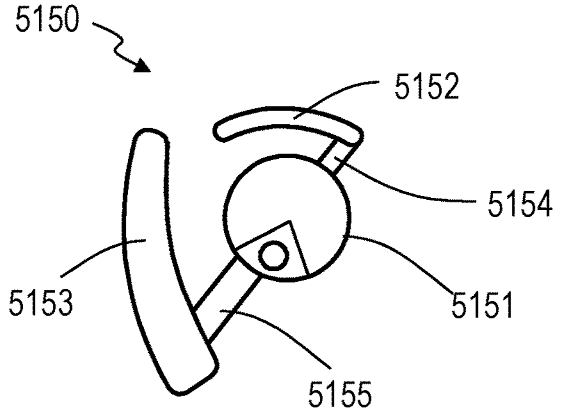
FIG. 23B is a back view for illustrating the modification of the acoustic signal output device according to the embodiment.
Figure 23C:
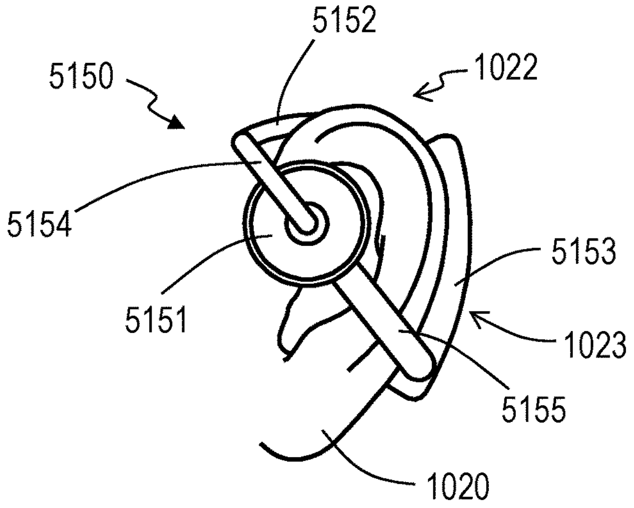
FIG. 23C is a front view for illustrating how the modification of the acoustic signal output device according to the embodiment is used.
Figure 24A:
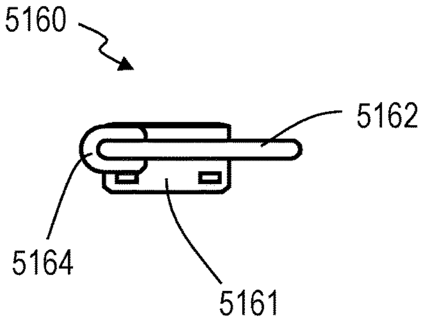
FIG. 24A is a plan view for illustrating a modification of the acoustic signal output device according to the embodiment.
Figure 24B:
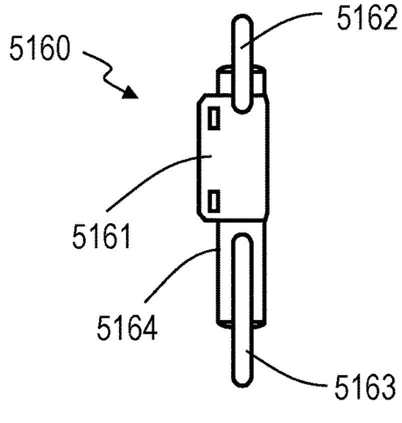
FIG. 24B is a right side view for illustrating the modification of the acoustic signal output device according to the embodiment.
Figure 24C:
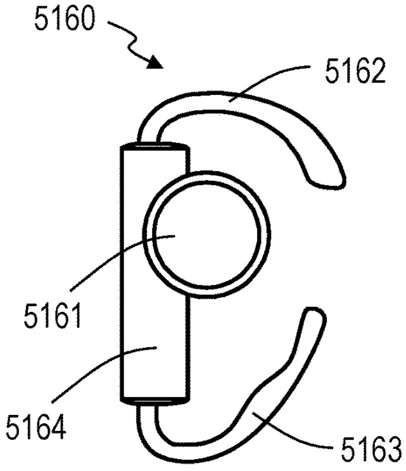
FIG. 24C is a front view for illustrating the modification of the acoustic signal output device according to the embodiment.
Figure 24D:
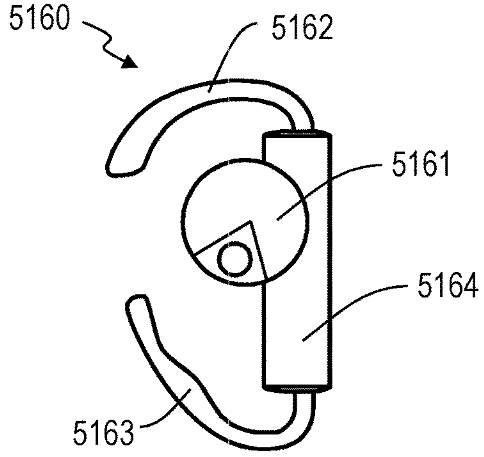
FIG. 24D is a back view for illustrating the modification of the acoustic signal output device according to the embodiment.
Figure 24E:
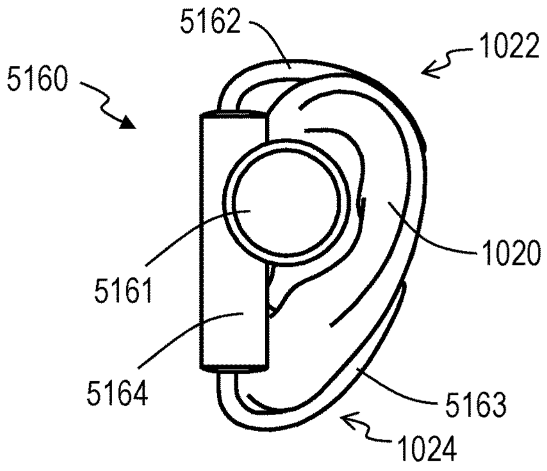
FIG. 24E is a front view for illustrating how the modification of the acoustic signal output device according to the embodiment is used.
Figure 25A:
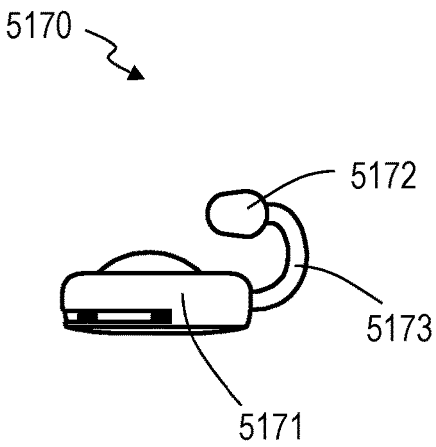
FIG. 25A is a plan view for illustrating a modification of the acoustic signal output device according to the embodiment.
Figure 25B:
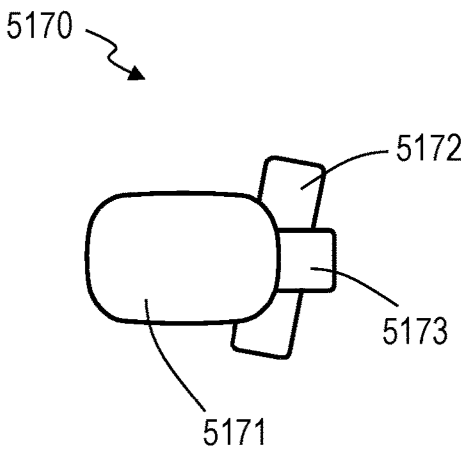
FIG. 25B is a front view for illustrating the modification of the acoustic signal output device according to the embodiment.
Figure 25C:
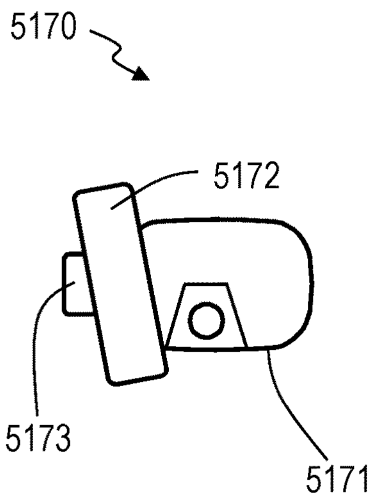
FIG. 25C is a back view for illustrating the modification of the acoustic signal output device according to the embodiment.
Figure 25D:
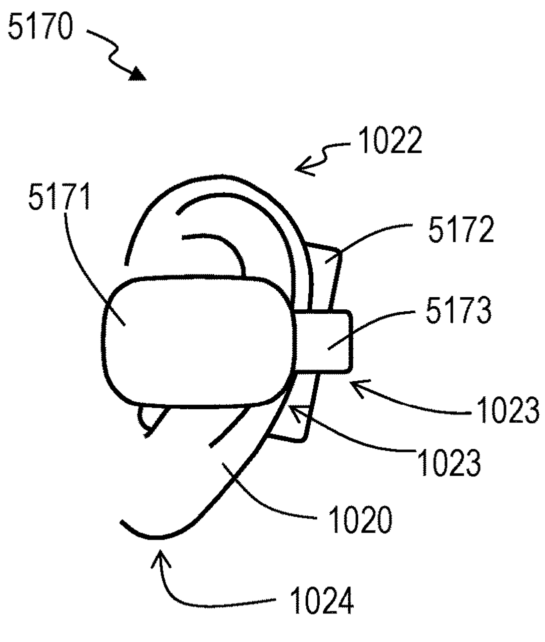
FIG. 25D is a front view for illustrating how the modification of the acoustic signal output device according to the embodiment is used.
Figure 26A:
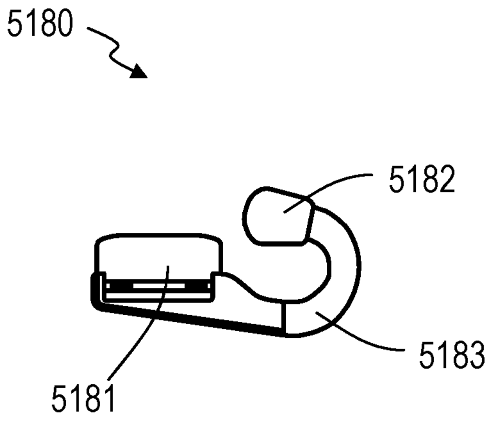
FIG. 26A is a plan view for illustrating a modification of the acoustic signal output device according to the embodiment.
Figure 26B:
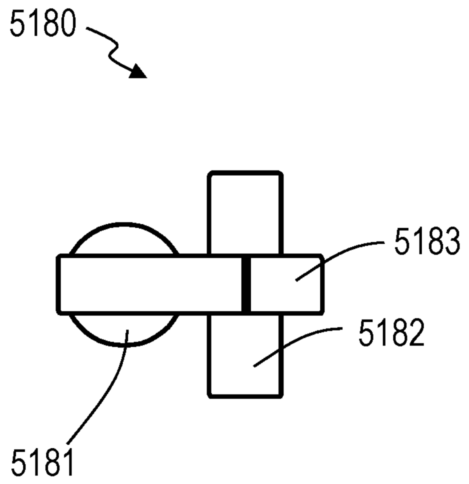
FIG. 26B is a front view for illustrating the modification of the acoustic signal output device according to the embodiment.
Figure 26C:
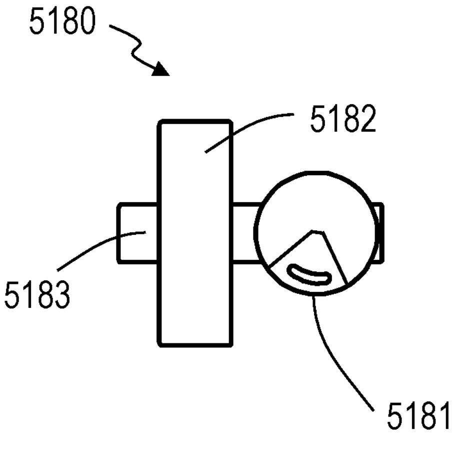
FIG. 26C is a back view for illustrating the modification of the acoustic signal output device according to the embodiment.
Figure 26D:
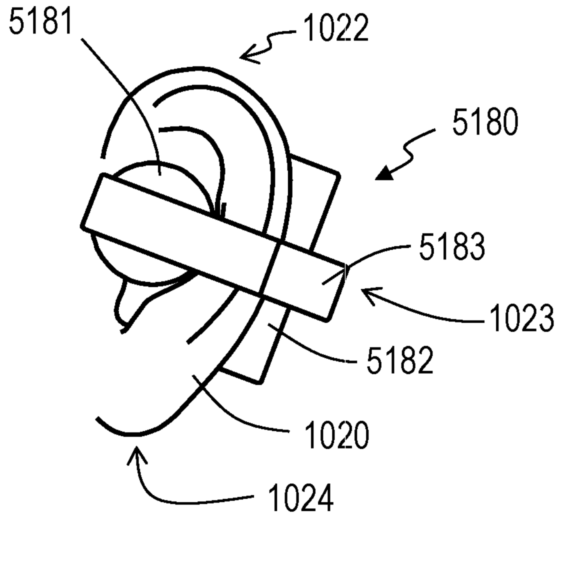
FIG. 26D is a front view for illustrating how the modification of the acoustic signal output device according to the embodiment is used.

An acoustic signal output device 5150 illustrated in FIGS. 23A, 23B, and 23C includes a structure portion 5151 to emit acoustic signals, a rod-shaped attachment portion 5152 that holds the structure portion 5151 and is of a type hooked on the backside of the upper portion 1022 of the auricle 1020 when attached, a columnar supporting portion 5154 holding the structure portion 5151 at one end and holding the attachment portion 5152 at the other end, a rod-shaped attachment portion 5153 of a type hooked on the backsides of the middle portion 1023 and the upper portion 1022 of the auricle 1020 from the side of the middle portion 1023 when attached, and a columnar supporting portion 5155 holding the structure portion 5151 at one end and holding the attachment portion 5153 at the other end. The structure portion 5151 is the housing 12 and the support portion 13 illustrated in the first embodiment, the modifications thereof, and the second embodiment. The auricle 1020 is held between the structure portion 5151 and the attachment portions 5152, 5153, thereby fixing the acoustic signal output device 5150 to the auricle 1020.

<Attachment Type 12>

An acoustic signal output device 5160 illustrated in FIGS. 24A to 24E includes a structure portion 5161 to emit acoustic signals, a columnar attachment portion 5164 holding the structure portion 5161 and configured to be positioned on the root side of the auricle 1020 when attached, a rod-shaped attachment portion 5162 that is held at one end of the attachment portion 5164 and is of a type hooked on the backside of the upper portion 1022 of the auricle 1020 when attached, and a rod-shaped attachment portion 5163 that is held at the other end of the attachment portion 5164 and is of a type hooked on the backside of the lower portion 1024 of the auricle 1020 when attached. The structure portion 5161 is the housing 12 and the support portion 13 illustrated in the first embodiment, the modifications thereof, and the second embodiment. The auricle 1020 is held between the structure portion 5161 and the attachment portion 5164, and the attachment portions 5162, 5163, thereby fixing the acoustic signal output device 5160 to the auricle 1020.

<Attachment Type 13>

Acoustic signal output devices 5170, 5180 illustrated in FIGS. 25A to 25D and FIGS. 26A to 26D respectively include structure portions 5171, 5181, columnar attachment portions 5172, 5182, and curved, band-shaped supporting portions 5173, 5183. The structure portion 5171, 5181 emits acoustic signals, the attachment portion 5172, 5182 is configured to be positioned on the backside of the middle portion 1023 of the auricle 1020 when attached, and the supporting portion 5173, 5183 holds the structure portion 5171, 5181 at one end and holds the attachment portion 5172, 5182 at the other end. The structure portion 5171, 5181 is the housing 12 and the support portion 13 illustrated in the first embodiment, the modifications thereof, and the second embodiment. The auricle 1020 is held between the structure portion 5171, 5181 and the attachment portion 5172, 5182, thereby fixing the acoustic signal output device 5170, 5180 to the auricle 1020.

<Attachment Type 14>

Figure 27A:
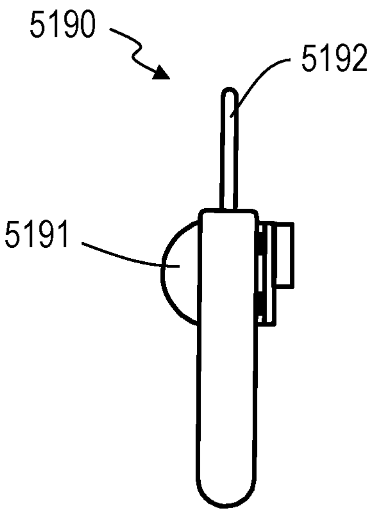
FIG. 27A is a left side view for illustrating a modification of the acoustic signal output device according to the embodiment.
Figure 27B:
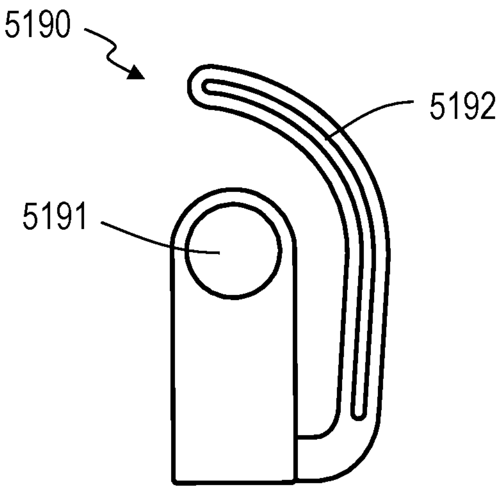
FIG. 27B is a front view for illustrating the modification of the acoustic signal output device according to the embodiment.
Figure 27C:
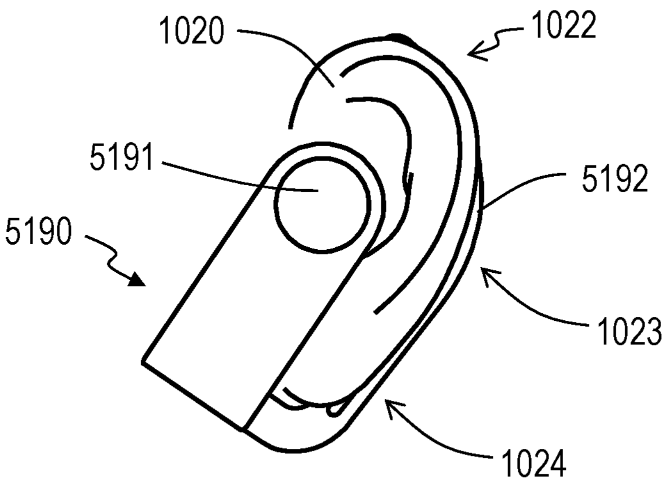
FIG. 27C is a front view for illustrating how the modification of the acoustic signal output device according to the embodiment is used.
Figure 28A:
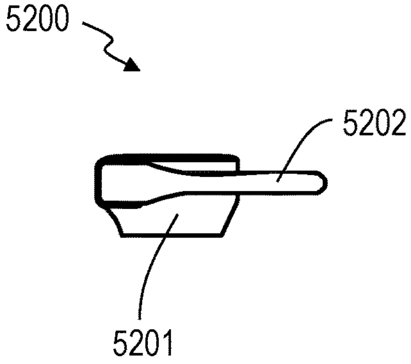
FIG. 28A is a plan view for illustrating a modification of the acoustic signal output device according to the embodiment.
Figure 28B:
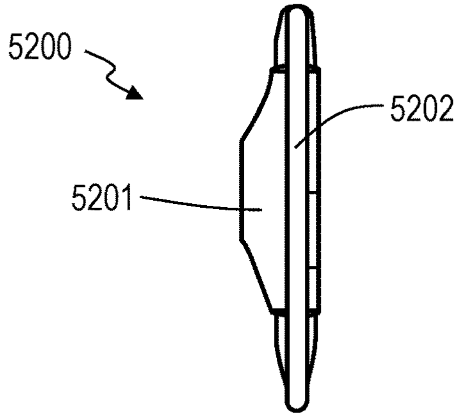
FIG. 28B is a right side view for illustrating the modification of the acoustic signal output device according to the embodiment.
Figure 28C:
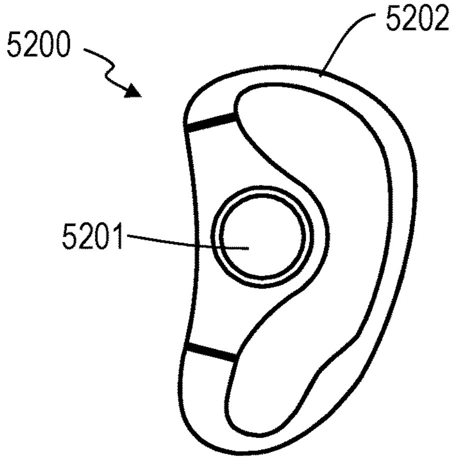
FIG. 28C is a front view for illustrating the modification of the acoustic signal output device according to the embodiment.
Figure 28D:
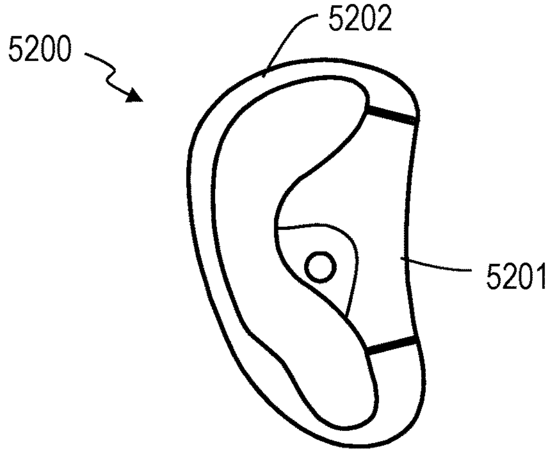
FIG. 28D is a back view for illustrating the modification of the acoustic signal output device according to the embodiment.
Figure 28E:
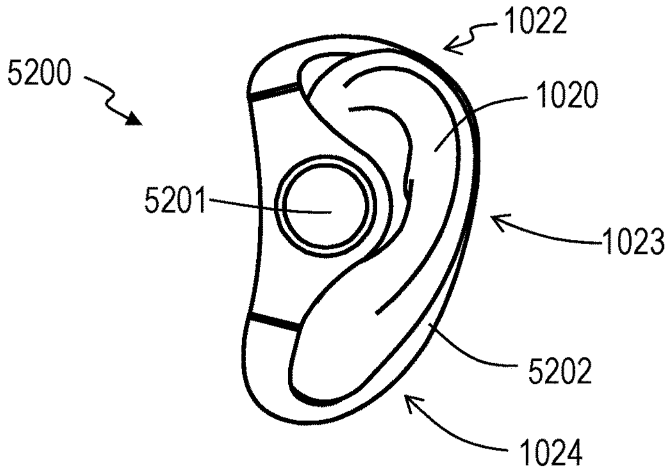
FIG. 28E is a front view for illustrating how the modification of the acoustic signal output device according to the embodiment is used.

An acoustic signal output device 5190 illustrated in FIGS. 27A to 27C includes a structure portion 5191 to emit acoustic signals, and a rod-shaped attachment portion 5192 holding the structure portion 5191 and configured to be positioned on the backside of the auricle 1020 when attached. The structure portion 5191 is the housing 12 and the support portion 13 illustrated in the first embodiment, the modifications thereof, and the second embodiment. The attachment portion 5192 holds the structure portion 5191 at one end on the side that is positioned on the side of the lower portion 1024 of the auricle 1020 when attached. The auricle 1020 is held between the structure portion 5191 and the attachment portion 5192, thereby fixing the acoustic signal output device 5190 to the auricle 1020.

<Attachment Type 15>

An acoustic signal output device 5200 illustrated in FIGS. 28A to 28E includes a structure portion 5201 to emit acoustic signals, and an annular attachment portion 5202 holding the structure portion 5201. The structure portion 5201 is the housing 12 and the support portion 13 illustrated in the first embodiment, the modifications thereof, and the second embodiment. At the time of attachment, the auricle 1020 is inserted into the annular attachment portion 5202, and the attachment portion 5202 is positioned on the backsides of the upper portion 1022, the middle portion 1023, and the lower portion 1024 of the auricle 1020. In doing so, the auricle 1020 is held between the structure portion 5201 and the attachment portion 5202, thereby fixing the acoustic signal output device 5200 to the auricle 1020.

<Attachment Type 16>

Figure 29A:
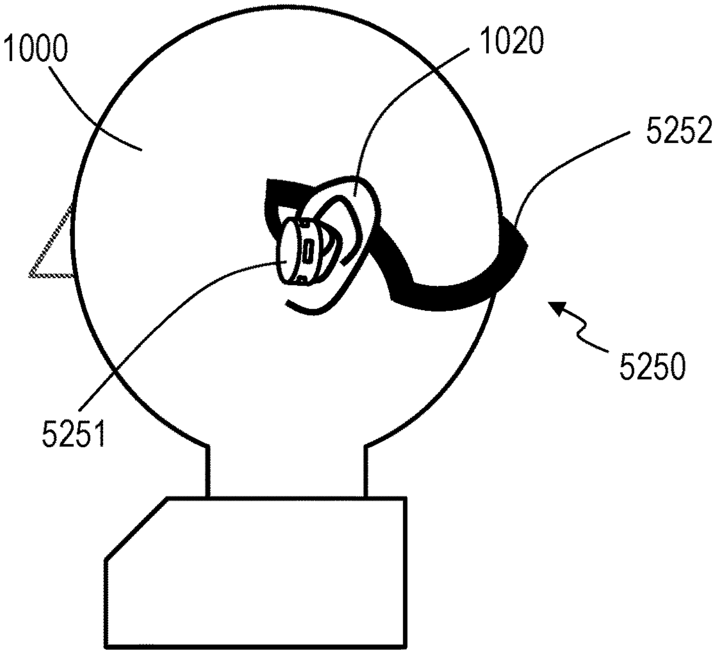
FIG. 29A is a conceptual view for illustrating a modification of the acoustic signal output device according to the embodiment.

Like an acoustic signal output device 5250 illustrated in FIG. 29A, a structure portion 5251 may be fixed to a rod-shaped attachment portion 5252, which is curved in such a shape that it can be attached to the back of the user 1000's head and the auricle 1020. The structure portion 5251 is the housing 12 and the support portion 13 illustrated in the first embodiment, the modifications thereof, and the second embodiment. The attachment portion 5252 is attached to the back of the user 1000's head and the auricle 1020, with the housing 12 and the support portion 13 positioned as described above.

<Attachment Type 17>

Figure 29B:
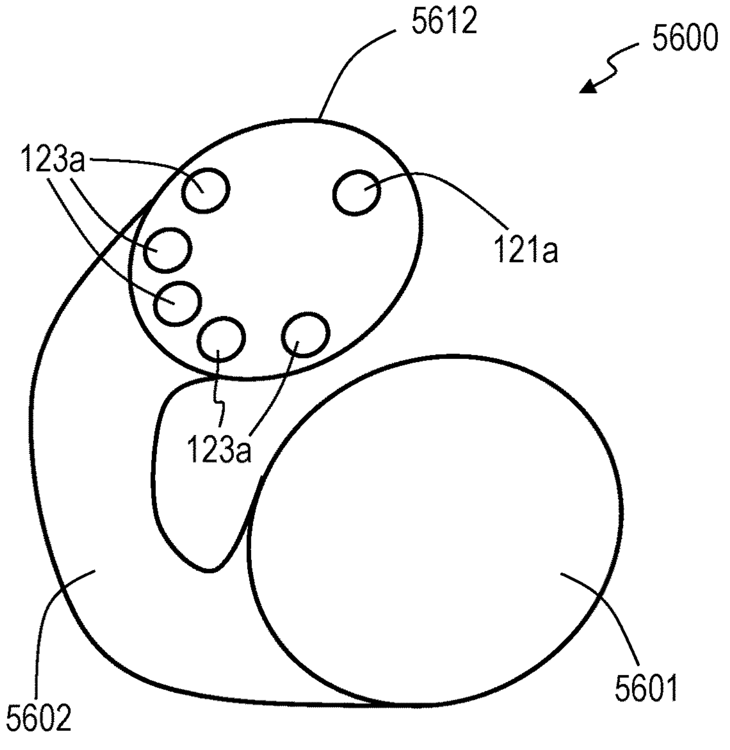
FIG. 29B is a perspective view for illustrating a modification of the acoustic signal output device according to the embodiment.

An acoustic signal output device 5600 illustrated in FIG. 29B includes the driver unit 11 (not shown) described above, a substantially spherical housing 5612 (the structure portion) accommodating the driver unit 11 inside, a substantially spherical attachment portion 5601 to be positioned on the auricle when attached, and a curved portion 5602, which is an elastic body connecting the housing 5612 with the attachment portion 5601. The housing 5612 is provided with the sound hole 121*a* (the first sound hole) to emit (direct) the acoustic signal AC1 (the first acoustic signal) emitted from the driver unit 11 to the outside, and the sound holes 123*a* (the second sound holes) to emit (direct) the acoustic signal AC2 (the second acoustic signal) emitted from the driver unit 11 to the outside. Here, the design may be made such that in a space at a greater distance from the sound hole 121*a*, the acoustic signal AC2 at a higher sound pressure level will be emitted from a sound hole 123*a* to the outside. When the acoustic signal output device 5600 is worn, the housing 5612 is positioned on the front side (the ear canal side) of the auricle with the sound hole 121*a* facing the ear canal side, while the attachment portion 5601 is positioned on the back side of the auricle (the side where the ear canal is not present), such that the auricle is held between the housing 5612 and the attachment portion 5601.

Fourth Embodiment

For the present embodiment, an acoustic signal output device that is designed to be in part worn in the ear canal but does not completely block the ear canal is illustrated.

Example 4-1

Figure 30A:
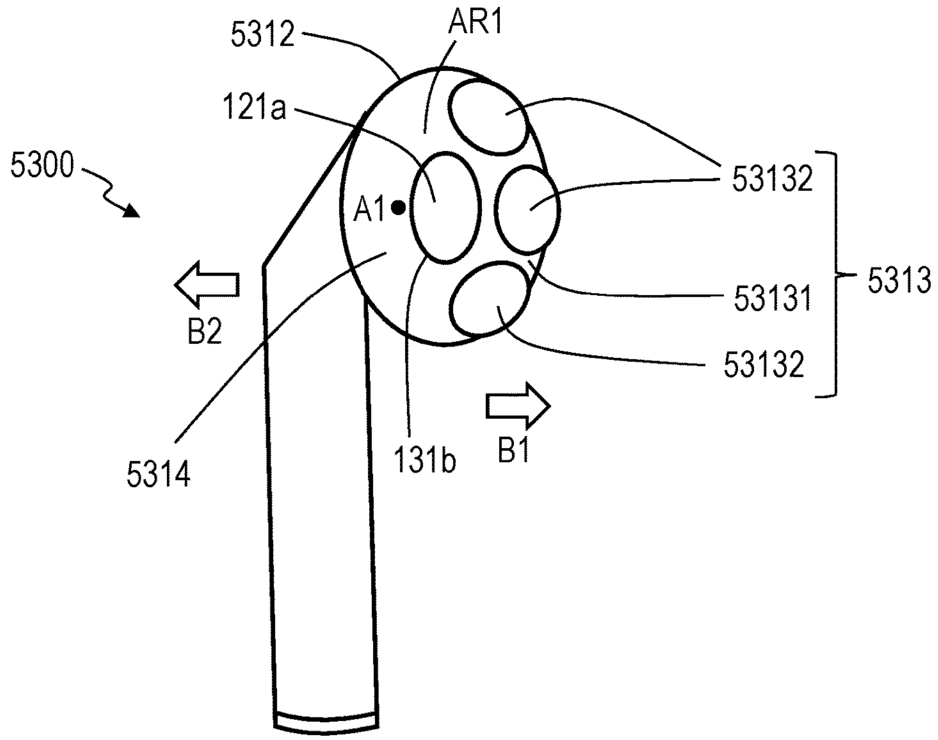
FIG. 30A is a front view for illustrating a modification of the acoustic signal output device according to the embodiment.
Figure 30B:
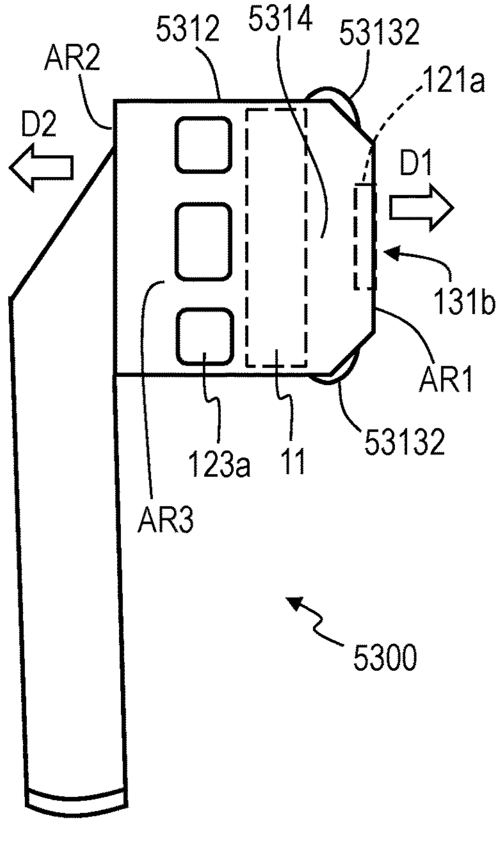
FIG. 30B is a left side view for illustrating the modification of the acoustic signal output device according to the embodiment.
Figure 30C:
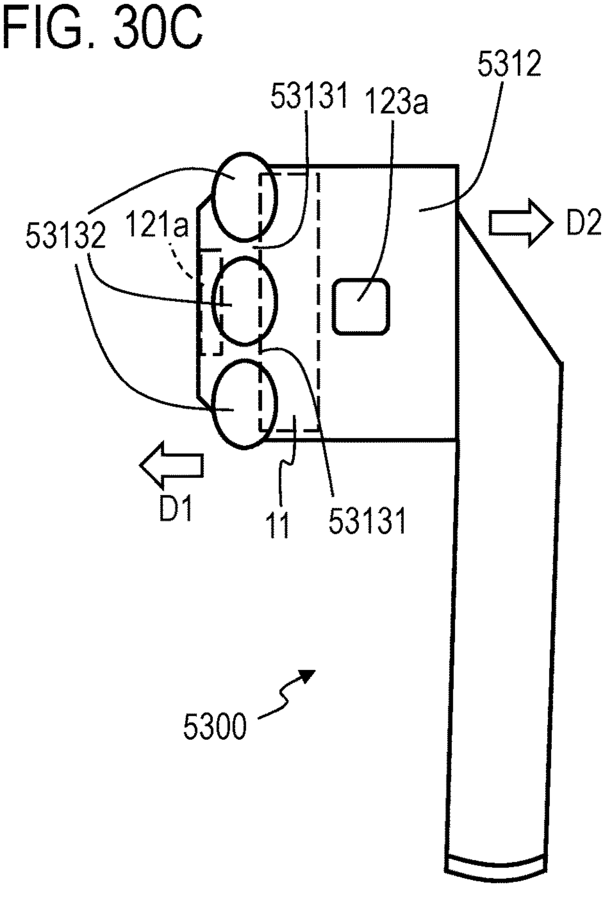
FIG. 30C is a right side view for illustrating the modification of the acoustic signal output device according to the embodiment.

As illustrated in FIGS. 30A to 30C, an acoustic signal output device 5300 in this example includes the driver unit 11 described above, a housing 5312 (the structure portion) accommodating the driver unit 11 inside, and a support portion 5313 (the structure portion) to be positioned on the user's ear canal when attached.

<Housing 5312>

The housing 5312 is a hollow member with wall portions on the outside and accommodates the driver unit 11 inside. For example, the driver unit 11 is fixed at an end on the D1-direction side inside the housing 5312. This is not a limitation on the present invention, however. There is no limitation on the shape of the housing 5312, either.

<Sound Holes 121*a*, 123*a*>

The wall portion of the housing 5312 is provided with the sound hole 121*a* (the first sound hole) to emit (direct) the acoustic signal AC1 (the first acoustic signal) emitted from the driver unit 11 to the outside, and the sound holes 123*a*

(the second sound holes) to emit (direct) the acoustic signal AC2 (the second acoustic signal) emitted from the driver unit 11 to the outside.

The sound hole 121*a* (the first sound hole) in this example is provided in the area AR1 (the first area) of the wall portion, which is positioned on one side of the driver unit 11 (the D1-direction side, or the side to which the acoustic signal AC1 is emitted). The sound hole 121*a* in this example is positioned at an eccentric location offset in the B1 direction (the first direction) from the axis A1 (the central axis of the structure portion) and is open, facing in the D1 direction. The axis A1 is an axis extending in the D1 direction through a central area of the housing 5312, and the B1 direction is a specific radial direction about the axis A1. In this example, an example where the shape of the edge of the opened end of the sound hole 121*a* is oval (the opened end is oval) is shown for the sake of simplicity. However, this does not limit the present invention. For example, the edge of the sound hole 121*a* may be in a different shape such as a circle, a rectangle, or a triangle. Furthermore, the end of the sound hole 121*a* may be meshed. In other words, the end of the sound hole 121*a* may be formed of multiple holes. Also in this example, one sound hole 121*a* is provided in the area AR1 (the first area) of the wall portion of the housing 5312 for the sake of simplicity. However, this does not limit the present invention. For example, two or more sound holes 121*a* may be provided in the area AR1 (the first area) of the wall portion of the housing 5312.

The sound holes 123*a* (the second sound holes) in this example are provided in the area AR3 of the wall portion 123, which is adjacent to the area between the area AR1 of the wall portion of the housing 5312 and the area AR2 of the wall portion positioned on the D2-direction side of the driver unit 11 (the other side, or the side to which the acoustic signal AC2 is emitted). The sound holes 123*a* (the second sound holes) in this example are positioned offset to the B2-direction (the second direction) side. The B2 direction (the second direction) is a direction that contains the opposite direction component of the B1 direction (the first direction). Specific examples of such an arrangement were illustrated in the embodiments and their modifications described earlier. In addition, the design is made such that in a space at a greater distance from the sound hole 121*a*, the acoustic signal AC2 at a higher sound pressure level will be emitted from a sound hole 123*a* to the outside. Specific examples of such an arrangement were also illustrated in the embodiments and their modifications described earlier.

<Support Portion 5313>

The support portion 5313 is a convex portion provided on an external surface of the wall portion of the housing 5312 on the D1-direction side.

At least part of the outer surface area of the support portion 5313 is convex. The outer surface area of the support portion 5313 is an area on the outer surface side that surrounds the opened end 131*b* of the sound hole 121*a* (the first sound hole). The outer surface area of the support portion 5313 includes an area 53131 (the first area) and an area 53132 (the second area) protruding further than the area 53131 (the first area). Here, the outer surface area of the support portion 5313 may be shaped so as to direct the acoustic signal AC1 (the first acoustic signal) emitted from the sound hole 121*a* (the first sound hole) to the area 53131 (the first area) side. The support portion 5313 including the area 53131 and the area 53132 in this example is provided on the B1-direction side, whereas the support portion 5313 is not provided in an area 5314 on the B2-direction side, which contains the opposite direction component of the B1 direction.

<When being Attached>

A difference from the first embodiment is that a tip portion of the housing 5312 on the support portion 5313 side is inserted into the user's ear canal when the acoustic signal output device 5300 is worn. When the tip portion of the housing 5312 is inserted into the ear canal, the area 5314 on the B2-direction side, in which the support portion 5313 is not provided, comes into contact with the inside of the ear canal. The area 53132 (the second area) of the support portion 5313 also makes contact with the inside of the ear canal. Meanwhile, the area 53131 (the first area) of the support portion 5313 does not make contact with the inside of the ear canal. Consequently, a gap is created between the area 53131 and the inside of the ear canal, and thus the ear canal is not completely blocked. This provides an advantage of facilitating the user's hearing of external sound. On the other hand, part of the acoustic signal AC1 emitted from the opened end 131*b* of the sound hole 121*a* is emitted to the outside through the gap between the area 53131 and the inside of the ear canal. The acoustic signal AC1 thus emitted to the outside will be perceived as sound leakage; however, this acoustic signal AC1 will be canceled by the acoustic signal AC2 emitted from the sound holes 123*a*, thus suppressing sound leakage, as discussed in the first embodiment. Additionally, as the sound holes 123*a* in this example are positioned offset to the B2-direction side, it is difficult for the acoustic signal AC2 emitted from the sound holes 123*a* to enter the inside of the ear canal through the gap between the area 53131 and the inside of the ear canal. Thus, the acoustic signal AC1 is not canceled much in the ear canal, allowing the user to hear the acoustic signal AC1 with sufficient sound quality. A battery case for housing and recharging the acoustic signal output device 5300 may be prepared. In this case, the battery case may be designed in conformance with the shape of the convex portion provided in the support portion 5313. For example, the battery case may be designed such that only an area with which the convex portion makes contact when the acoustic signal output device 5300 is placed in the battery case is deeper than the areas which are contacted by the other areas of the support portion 5313. When the convex portion is made of a material that can be changed in shape, the battery case may be designed to be smaller by a certain amount than the size including the convex portion, for example, so that the acoustic signal output device 5300 is secured in the battery case by the convex portion when the acoustic signal output device 5300 is placed in the battery case.

Example 4-2

In Example 4-1, the support portion 5313 is provided on the B1-direction side on the external surface of the wall portion of the housing 5312 on the D1-direction side, while the support portion 5313 is not provided in the area 5314 on the B2-direction side, which contains the opposite direction component of the B1 direction (FIG. 30A). However, a protruding area that surrounds the opened end 131*b* of the sound hole 121*a* may be provided in the area 5314. This protruding area that surrounds the opened end 131*b* is an annular convex area surrounding the opened end 131*b* on the B2-direction side, for example. Preferably, when the acoustic signal output device 5300 is worn, a most part or all of the annular convex area surrounding the opened end 131*b* on the B2-direction side makes contact with the inside of the ear canal, such that the acoustic signal AC1 emitted from the opened end 131*b* of the sound hole 121*a* does not leak to the B2-direction side as much as possible.

Example 4-3

Figure 31A:
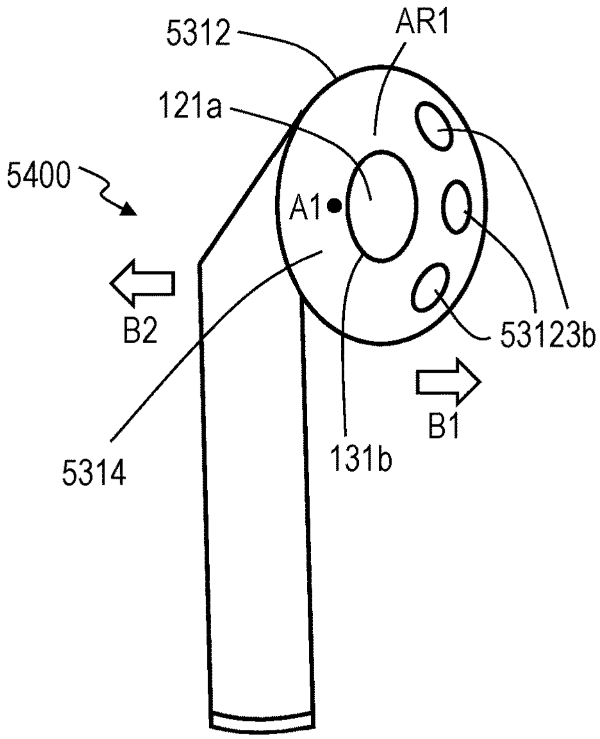
FIG. 31A is a front view for illustrating a modification of the acoustic signal output device according to the embodiment.
Figure 31B:
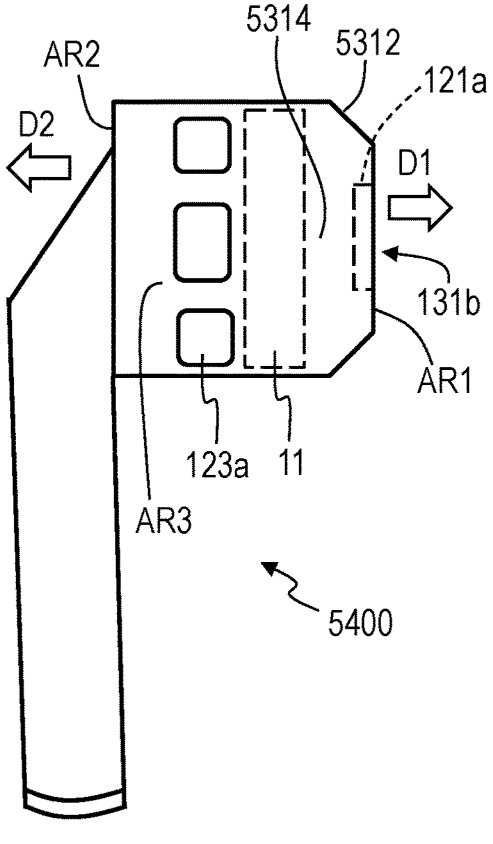
FIG. 31B is a left side view for illustrating the modification of the acoustic signal output device according to the embodiment.
Figure 31C:
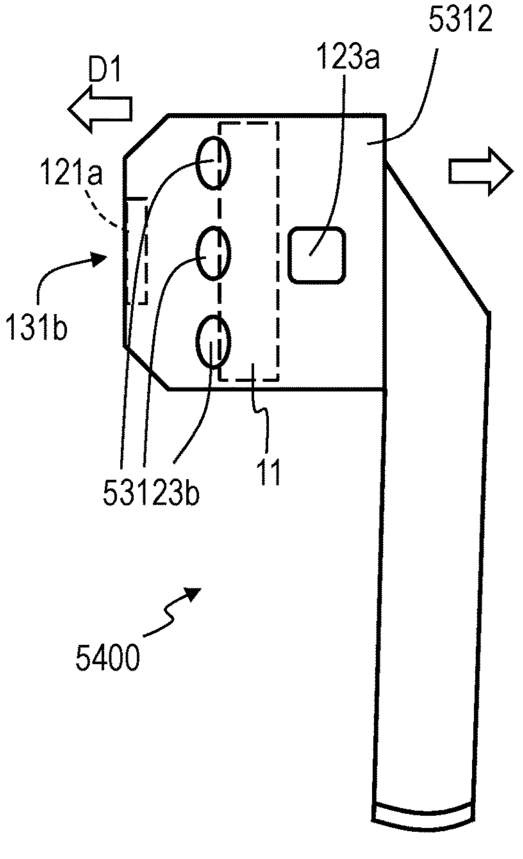
FIG. 31C is a right side view for illustrating the modification of the acoustic signal output device according to the embodiment.

Instead of providing the support portion 5313 of Example 4-1, a sound hole 53123*b* (for example, a through-hole) may be provided in the external surface of the wall portion of the housing 5312 on the D1-direction side, like an acoustic signal output device 5400 illustrated in FIGS. 31A to 31C. The sound hole 53123*b* both introduces external sound into the ear canal and emits the acoustic signal AC1 emitted to the inside of the housing 5312 to the outside. The sound hole 53123*b* in this example is provided on the B1-direction side, and the sound hole 53123*b* is not provided in the area 5314 on the B2-direction side, which contains the opposite direction component of the B1 direction.

When the tip portion of the housing 5312 is inserted into the ear canal as the user puts on the acoustic signal output device 5400, the tip portion of the housing 5312 makes contact with the inside of the ear canal. Also, the sound hole 53123*b* is positioned outside of the ear canal and thus the ear canal is not completely blocked. This provides an advantage of facilitating the user's hearing of external sound. On the other hand, part of the acoustic signal AC1 emitted from the opened end 131*b* of the sound hole 121*a* is emitted to the outside from the sound hole 53123*b*. The acoustic signal AC1 thus emitted to the outside will be perceived as sound leakage; however, this acoustic signal AC1 will be canceled by the acoustic signal AC2 emitted from the sound holes 123*a*, thus suppressing sound leakage, as discussed in the first embodiment. Additionally, as the sound holes 123*a* in this example are positioned offset to the B2-direction side, it is difficult for the acoustic signal AC2 emitted from the sound holes 123*a* to enter the inside of the ear canal through the sound hole 53123*b*. Thus, the acoustic signal AC1 is not canceled much in the ear canal, allowing the user to hear the acoustic signal AC1 with sufficient sound quality.

Example 4-4

Figure 32A:
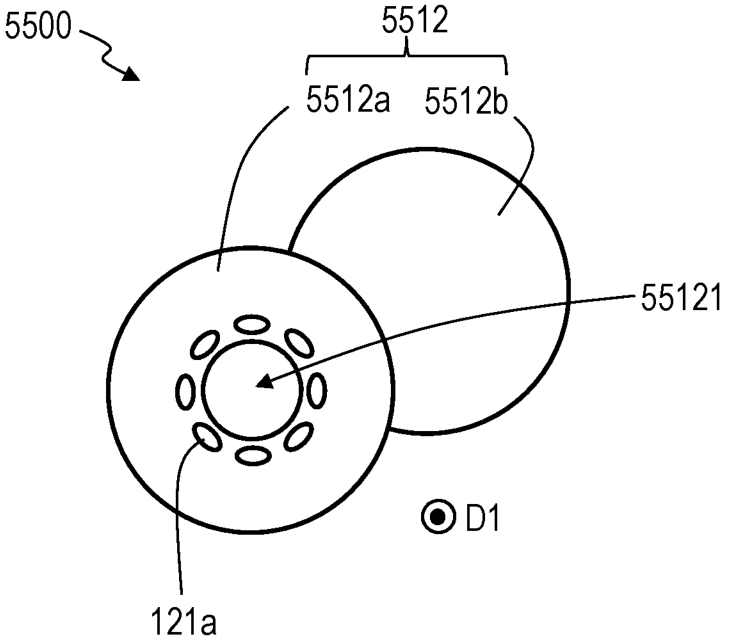
FIG. 32A is a front view for illustrating a modification of the acoustic signal output device according to the embodiment.
Figure 32B:
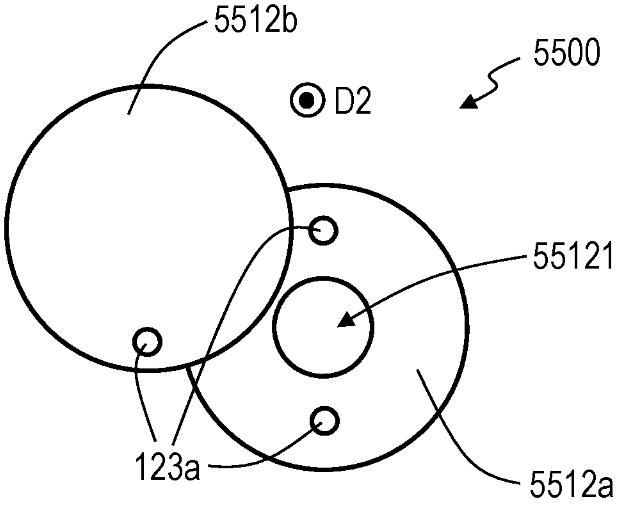
FIG. 32B is a back view for illustrating the modification of the acoustic signal output device according to the embodiment.

As illustrated in FIGS. 32A and 32B, an acoustic signal output device 5500 in this example includes the driver unit 11 described above, and a housing 5512 (the structure portion) accommodating the driver unit 11 inside. The housing 5512 has an insertion portion 5512*a* to be inserted into the ear canal when attached and an external placement portion 5512*b* to be positioned in some part of the auricle. The insertion portion 5512*a* is provided with a through-hole 55121 formed through the insertion portion 5512*a*. This allows the ear canal to be open to the outside through the through-hole 55121, rather than being completely blocked, when the insertion portion 5512*a* is inserted into the ear canal. Although the outer contour of the insertion portion 5512*a* in FIGS. 32A and 32B is a toroidal shape with the through-hole 55121, the outer contour of the insertion portion 5512*a* may be some other shape with the through-hole 55121 (such as a shape of a square column or a triangle pole with the through-hole 55121). On one side of the insertion portion 5512*a* (the side on which the insertion portion 5512*a* is inserted into the ear canal when attached: the D1-direction side), one or more sound holes 121*a* (the first sound holes) are provided. On the other side (the D2-direction side) of the insertion portion 5512*a*, one or more sound holes 123*a* (the second sound holes) are provided. As mentioned above, a sound hole 121*a* emits the acoustic signal AC1 emitted from the driver unit 11 to the outside, and a sound hole 123*a* emits the acoustic signal AC2 emitted from the driver unit 11 to the outside. In addition, the design may be made such that in a space at a greater distance from the sound hole 121*a*, the acoustic signal AC2 at a higher sound pressure level will be emitted from a sound hole 123*a* to the outside. Specific examples of such an arrangement were illustrated in the embodiments and their modifications described earlier.

When the acoustic signal output device 5500 is worn, the insertion portion 5512*a* of the housing 5512 is inserted into the ear canal, and the external placement portion 5512*b* is positioned in some part of the auricle. Due to the presence of the through-hole 55121 in the insertion portion 5512*a*, the ear canal is not completely blocked. This provides an advantage of facilitating the user's hearing of external sound. On the other hand, part of the acoustic signal AC1 emitted from the opened end 131*b* of the sound hole 121*a* is emitted to the outside via the through-hole 55121. The acoustic signal AC1 thus emitted to the outside will be perceived as sound leakage; however, this acoustic signal AC1 will be canceled by the acoustic signal AC2 emitted from the sound holes 123*a*, thus suppressing sound leakage, as discussed in the first embodiment.

Example 4-5

One of Examples 4-1 to 4-4 may be combined with Design Examples 1 to 6 from the second embodiment. Specifically, in any of Examples 4-1 to 4-4, the design may be made such that the resonance frequency of the hollow portion of the housing 5312, 5512 is equal to or higher than a predetermined frequency (for example, above the bands to which the human being has high auditory sensitivity, such as above 6 kHz), and that the acoustic signal AC2 (the second acoustic signal) in which frequency band components including the predetermined frequency (for example, band components to which the human being has high auditory sensitivity, such as 3 kHz to 6 kHz band components) have been suppressed is emitted from the sound holes 123*a* (the second sound holes) to the outside.

Example 4-6

Figure 33:
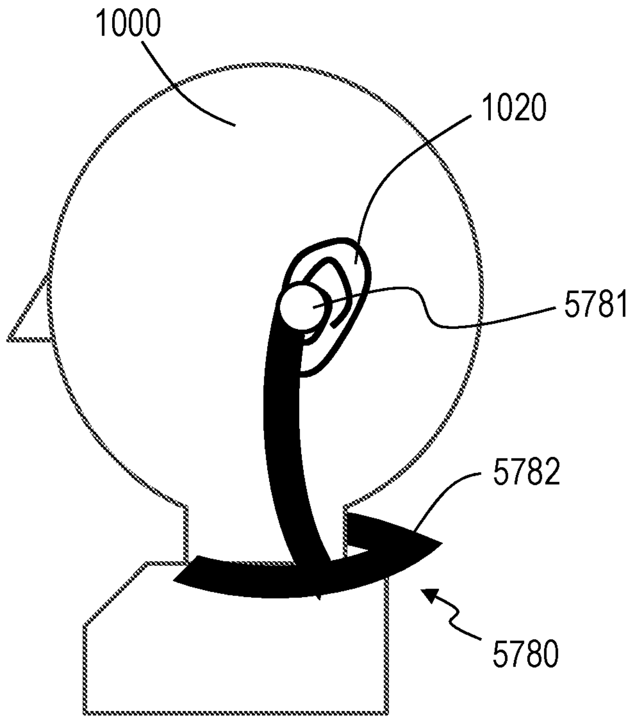
FIG. 33 is a conceptual view for illustrating a modification of the acoustic signal output device according to the embodiment.
Figure 34A:
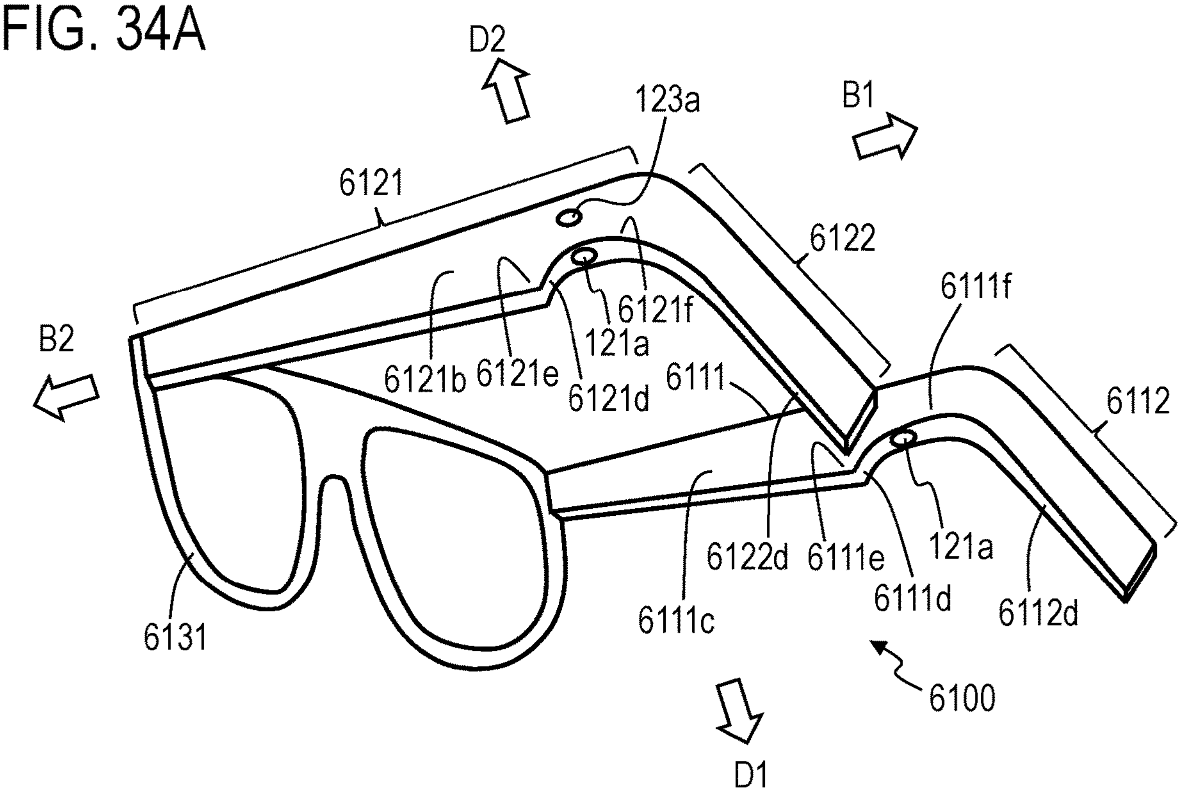
FIGS. 34A and 34B are perspective views for illustrating a modification of the acoustic signal output device according to the embodiment.
Figure 34B:
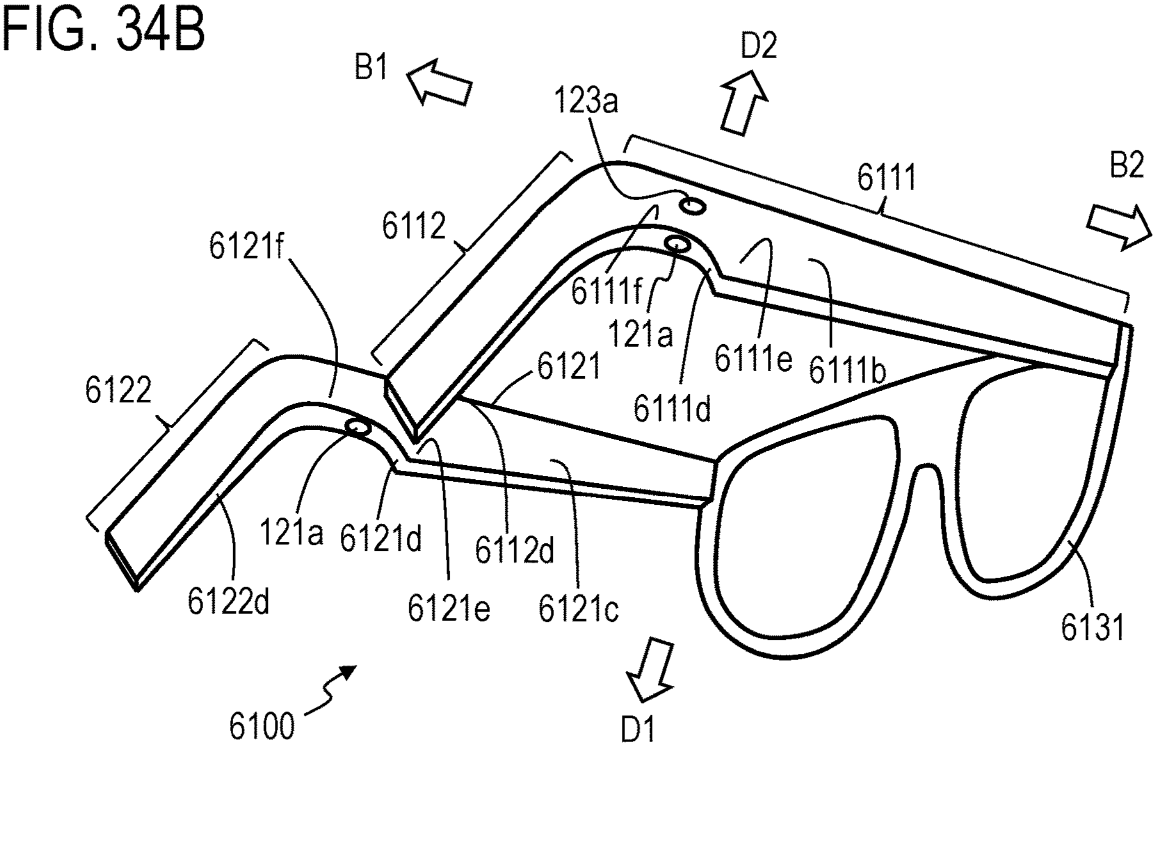
Figure 35:
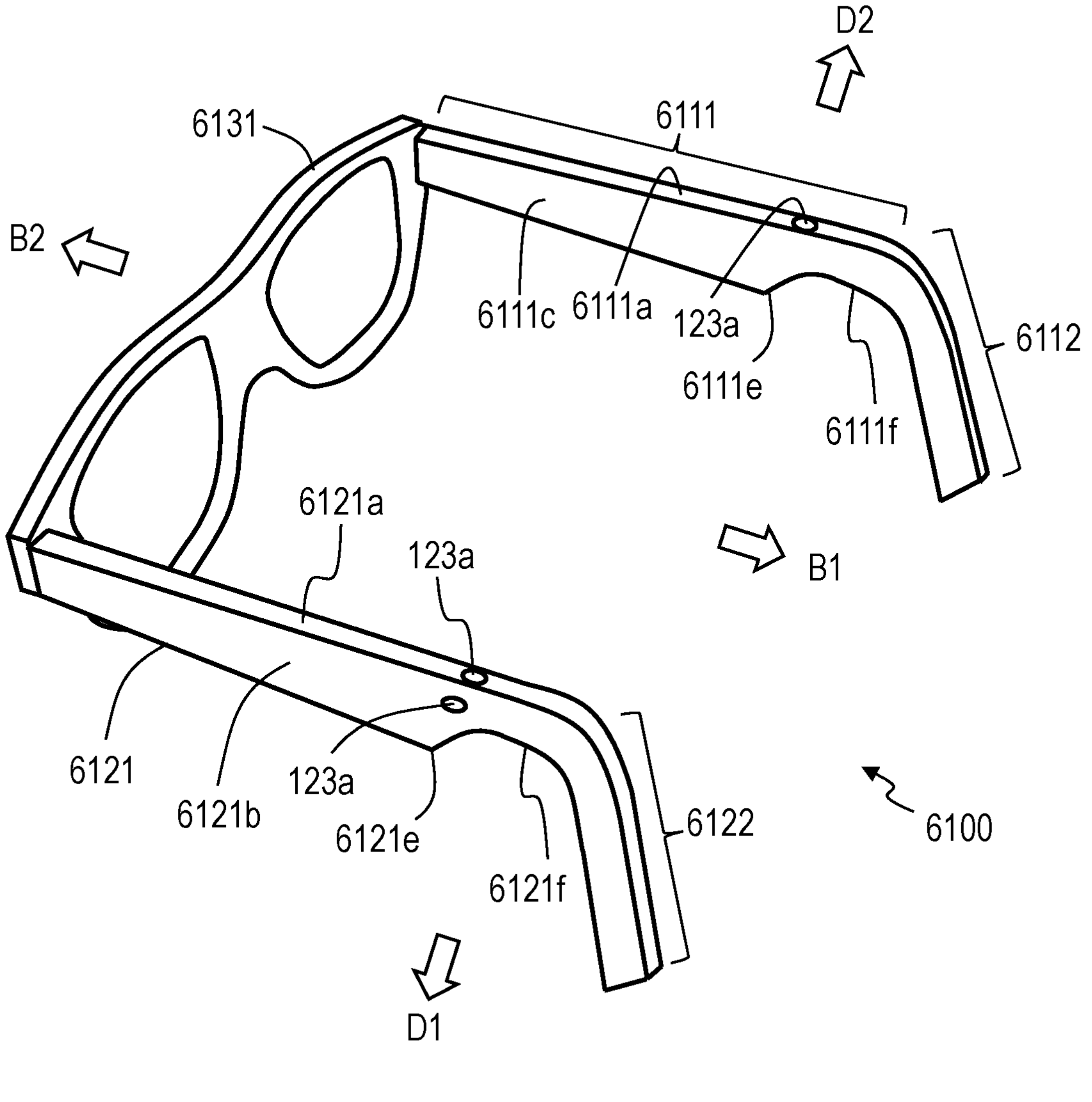
FIG. 35 is a perspective view for illustrating the modification of the acoustic signal output device according to the embodiment.

Like an acoustic signal output device 5780 illustrated in FIG. 33, a structure portion 5781 may be fixed to a rod-shaped attachment portion 5782, which is curved in a shape such that it can be attached to the user 1000's shoulder or neck. The structure portion 5781 can be any of the acoustic signal output devices 5300, 5400, 5500 of Examples 4-1 to 4-5, for example.

Fifth Embodiment

The preceding embodiments illustrated acoustic signal output devices having housings (the structure portions) of substantially cylindrical shapes with two end faces. However, the housings of the acoustic signal output devices may be differently shaped. The present embodiment illustrates an acoustic signal output device integrated with a pair of glasses, with the components of the glasses serving as the housing (the structure portion).

FIGS. 34A to 36 illustrate an acoustic signal output device 6100 integrated with a pair of glasses. The acoustic signal output device 6100 in this embodiment is in the form of spectacles and includes temples 6111, 6121, temple tips 6112, 6122, and a front frame 6131. The temples 6111, 6121 are affixed to the opposite edges of the front frame 6131 at one end, and are connected to one ends of the temple tips 6112, 6122 at the other end. The temples 6111, 6121 (the structure portions) have hollow interiors, in each of which the driver unit 11 is accommodated. That is, the temples 6111, 6121 (the structure portions) also serve as housings. As discussed above, the driver unit 11 emits the acoustic signal AC1 from the surface 111 on one side and emits the acoustic signal AC2 from the surface 112 on the other side. The acoustic signal AC1 is a signal for the user 1000 to hear sound. For example, the acoustic signal AC2 is the opposite phase signal of the acoustic signal AC1 or an approximate signal of the opposite phase signal and is a signal for suppressing sound leakage to the surroundings.

The temples 6111, 6121 are each provided with the sound hole 121*a* (the first sound hole) to emit, to the outside, the acoustic signal AC1 which has been emitted to the inside of the temple 6111, 6121 from the surface 111 of the driver unit 11 on one side. In the present embodiment, one sound hole 121*a* is provided in each of lower surfaces 6111*d*, 6121*d* of the temples 6111, 6121. The lower surfaces 6111*d*, 6121*d* of the temples 6111, 6121 are continuous with lower surfaces 6112*d*, 6122*d* of the temple tips 6112, 6122, respectively. The lower surfaces 6111*d*, 6121*d* of the temples 6111, 6121 are surfaces that lie on the lower side when the user 1000 wears the acoustic signal output device 6100. The lower surfaces 6112*d*, 6122*d* of the temple tips 6112, 6122 are surfaces that are supported on the auricles of the user 1000's ears (for example, surfaces that make contact with the auricles) when the user 1000 wears the acoustic signal output device 6100.

Figure 36:
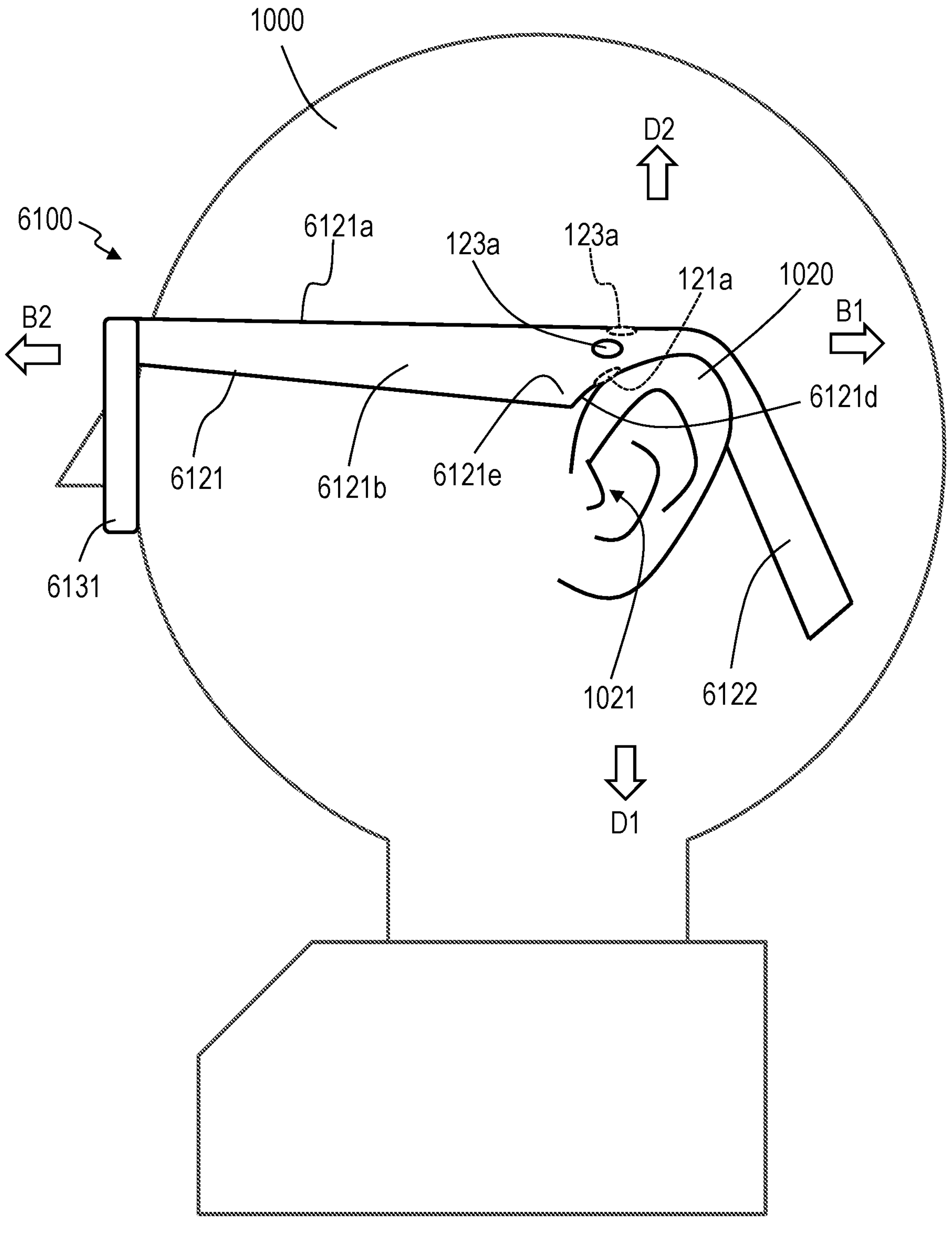
FIG. 36 illustrates how the modification of the acoustic signal output device according to the embodiment is worn.

Each of the temples 6111, 6121 are further provided with the sound holes 123*a* (the second sound holes) to emit, to the outside, the acoustic signal AC2 which has been emitted to the inside of the temple 6111, 6121 from the surface 112 of the driver unit 11 on the other side. In the present embodiment, multiple sound holes 123*a* are provided in each of the temples 6111, 6121. For example, one sound hole 123*a* is provided on each of a side surface 6111*b* and an upper surface 6111*a* of the temple 6111. That is to say, in this example, the temple 6111 has two sound holes 123*a*. Likewise, one sound hole 123*a* is provided on each of a side surface 6121*b* and an upper surface 6121*a* of the temple 6121, for example. That is to say, in this example, the temple 6121 has two sound holes 123*a*. The upper surfaces 6111*a*, 6121*a* of the temples 6111, 6121 are surfaces that lie on the upper side when the user 1000 wears the acoustic signal output device 6100. That is, the upper surfaces 6111*a*, 6121*a* are surfaces that lie opposite the lower surfaces 6111*d*, 6121*d*, respectively. The lower surfaces 6112*d*, 6122*d* of the temple tips 6112, 6122 are surfaces that are supported on the auricles of the user 1000's ears (for example, surfaces that make contact with the auricles) when the user 1000 wears the acoustic signal output device 6100. The side surface 6111*b* of the temple 6111 and the side surface 6121*b* of the temple 6121 are surfaces that face outward when the user 1000 wears the acoustic signal output device 6100 (FIG. 36). That is, with the user 1000 wearing the acoustic signal output device 6100, a side surface 6111*c* of the temple 6111 and a side surface 6121*c* of the temple 6121 face inward (the user 1000 side), while the side surface 6111*b* opposite the side surface 6111*c* and the side surface 6121*b* opposite the side surface 6121*c* face away from the user 1000.

In the present embodiment, the acoustic signal output device 6100 is configured so that when the user 1000 wears the acoustic signal output device 6100 (FIG. 36), for example, out of the sound holes 123*a* provided in the temple 6121, the sound pressure of the acoustic signal AC2 that is emitted from a sound hole 123*a* closer to the ear canal 1021 of one ear (for example, the left ear) of the user 1000 (a sound hole 123*a* at a distance of dis1 from the ear canal 1021; for example, the sound hole 123*a* provided in the side surface 6121*b*) is lower than the sound pressure of the acoustic signal AC2 that is emitted from a sound hole 123*a* farther from the ear canal 1021 of that ear of the user 1000 (a sound hole 123*a* at a distance of dis2 from the ear canal 1021, where dis2>dis1; for example, the sound hole 123*a* provided in the upper surface 6121*a*). For example, the acoustic signal output device 6100 is configured so that, out of the sound holes 123*a* provided in the temple 6121, the sound pressure of the acoustic signal AC2 that is emitted from the sound hole 123*a* closest to the ear canal 1021 of one ear of the user 1000 is lower than the sound pressures of the acoustic signals AC2 that are emitted from the other sound holes 123*a* provided in the temple 6121. Likewise, the acoustic signal output device 6100 is configured so that when the user 1000 wears the acoustic signal output device 6100, for example, out of the sound holes 123*a* provided in the temple 6111, the sound pressure of the acoustic signal AC2 that is emitted from a sound hole 123*a* closer to the ear canal of the other ear (for example, the right ear) of the user 1000 is lower than the sound pressure of the acoustic signal AC2 that is emitted from a sound hole 123*a* farther from the ear canal of the other ear of the user 1000. For example, the acoustic signal output device 6100 is configured so that, out of the sound holes 123*a* provided in the temple 6111, the sound pressure of the acoustic signal AC2 that is emitted from the sound hole 123*a* closest to the ear canal of the other ear of the user 1000 is lower than the sound pressures of the acoustic signals AC2 that are emitted from the other sound holes 123*a* provided in the temple 6111. The sound pressure of the acoustic signal AC2 that is emitted from the sound holes 123*a* may be adjusted with the opening areas, shapes, depths, and the like of the sound holes 123*a*, may be adjusted with sound absorption material attached to the sound holes 123*a*, may be adjusted with the paths or distances from the driver unit 11 to the sound holes 123*a*, may be adjusted by emitting acoustic signals AC2 that are generated by multiple driver units 11 with different outputs from the multiple sound holes 123*a*, or may be otherwise adjusted. Thus, it can be prevented that part of the acoustic signal AC1 is canceled in the ear canal by the acoustic signal AC2 that is emitted from a sound hole 123*a* closer to the ear canal and the quality of sound being heard by the user 1000 decreases. At the same time, due to provision of multiple sound holes 123*a* on each of the temples 6111, 6121, sound leakage from the acoustic signal AC1 can be sufficiently suppressed by the acoustic signal AC2 emitted from the sound holes 123*a*.

In the present embodiment, the distance between the upper surface 6111*a* and the lower surface 6111*d* in an area 6111*e* of the temple 6111 on the temple tip 6112 side is greater than the distance between the upper surface 6111*a* and the lower surface 6111*d* in an area 6111*f* that is closer to the temple tip 6112 than the area 6111*e* is. That is, the temple 6111 is tapered from the area 6111*e* to the area 6111*f*, for example. Furthermore, the sound hole 121*a* in the present embodiment is positioned between the area 6111*e* and the area 6111*f* of the lower surface 6111*d*. That is, the area 6111*e* (the second area) protrudes further in the direction of the lower surface 6111*d* (the D1 direction) than the area 6111*f* (the first area) and is shaped so as to direct the acoustic signal AC1 (the first acoustic signal) emitted from the sound hole 121*a* (the first sound hole) to the area 6111*f* (the first area) side (the B1-direction side). Likewise, in the present embodiment, the distance between the upper surface 6121*a* and the lower surface 6121*d* in an area 6121*e* of the temple 6121 on the temple tip 6122 side is greater than the distance between the upper surface 6121*a* and the lower surface 6121*d* in an area 6121*f* that is closer to the temple tip 6122 than the area 6121*e* is. That is, the temple 6121 is tapered from the area 6121*e* to the area 6121*f*, for example. Furthermore, the sound hole 121*a* in the present embodiment is positioned between the area 6121*e* and the area 6121*f* of the lower surface 6121*d*. That is, the area 6121*e* (the second area) protrudes further in the direction of the lower surface 6121*d* (the D1 direction) than the area 6121*f* (the first area) and is shaped so as to direct the acoustic signal AC1 (the first acoustic signal) emitted from the sound hole 121*a* (the first sound hole) to the area 6121*f* (the first area) side (the B1-direction side). Thus, when the user 1000 wears the acoustic signal output device 6100, the acoustic signal AC1 emitted from each sound hole 121*a* is directed to the ear canal side.

First Modification of the Fifth Embodiment

In the fifth embodiment, the acoustic signal output device 6100 was described as being configured so that, when the user 1000 wears the acoustic signal output device 6100, out of the sound holes 123*a* provided in each temple 6111, 6121, the sound pressure of the acoustic signal AC2 that is emitted from a sound hole 123*a* closer to the ear canal of the user 1000 is lower than the sound pressure of the acoustic signal AC2 that is emitted from a sound hole 123*a* farther from the ear canal of the user 1000. However, the acoustic signal output device 6100 may also be configured so that, when the user 1000 wears the acoustic signal output device 6100, out of the sound holes 123*a* provided in each temple 6111, 6121, the sound pressure of the acoustic signal AC2 that is emitted from a sound hole 123*a* oriented in a direction closer to the axis direction of the ear canal of the user 1000 is lower than the sound pressure of the acoustic signal AC2 that is emitted from a sound hole 123*a* oriented in a direction farther from the axis direction of the ear canal. A sound hole that is oriented in a certain direction can be a sound hole being open in that direction, a sound hole in the axis direction of that direction, or a sound hole with an open surface perpendicular to that direction, for example. Thus, it can be prevented that part of the acoustic signal AC1 is canceled in the ear canal by the acoustic signal AC2 that is emitted from a sound hole 123*a* oriented in a direction close to the axis direction of the ear canal and the quality of sound being heard by the user 1000 decreases. At the same time, due to provision of multiple sound holes 123*a* on each of the temples 6111, 6121, sound leakage from the acoustic signal AC1 can be sufficiently suppressed by the acoustic signal AC2 emitted from the sound holes 123*a*.

Figure 37A:
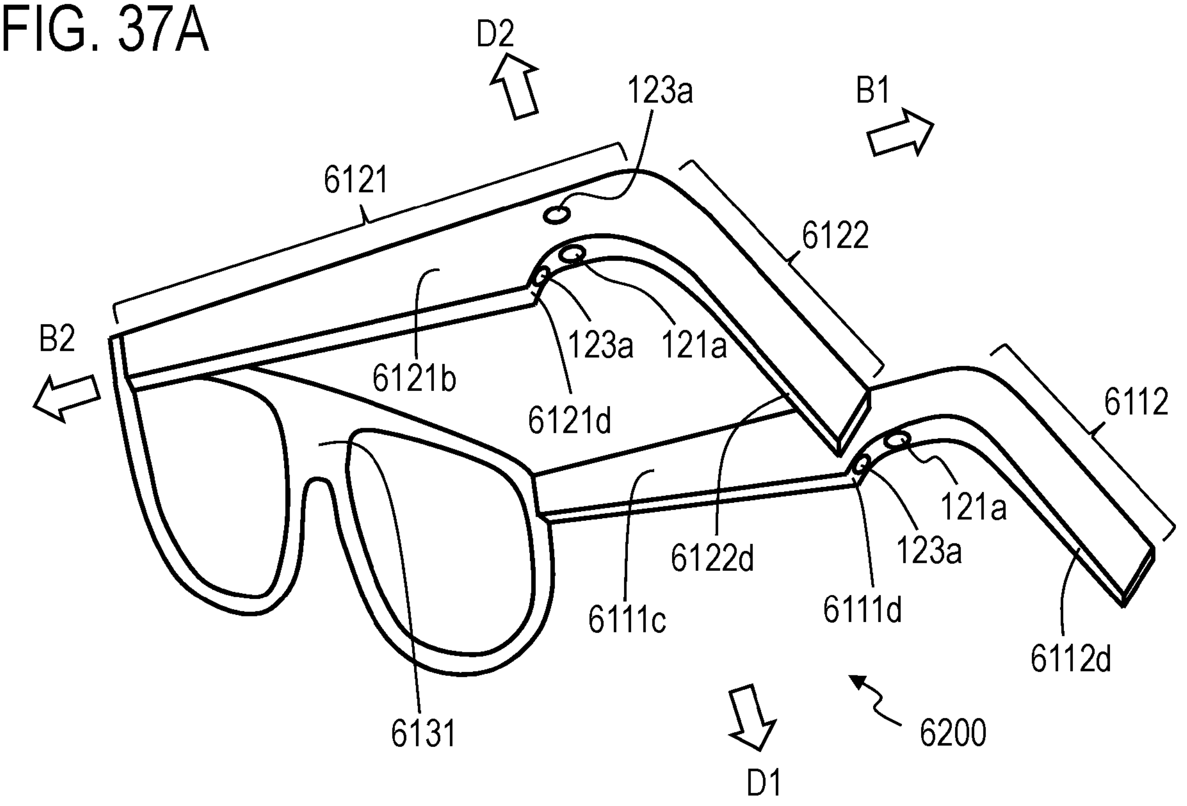
FIGS. 37A and 37B are perspective views for illustrating modifications of the acoustic signal output device according to the embodiment.
Figure 38:
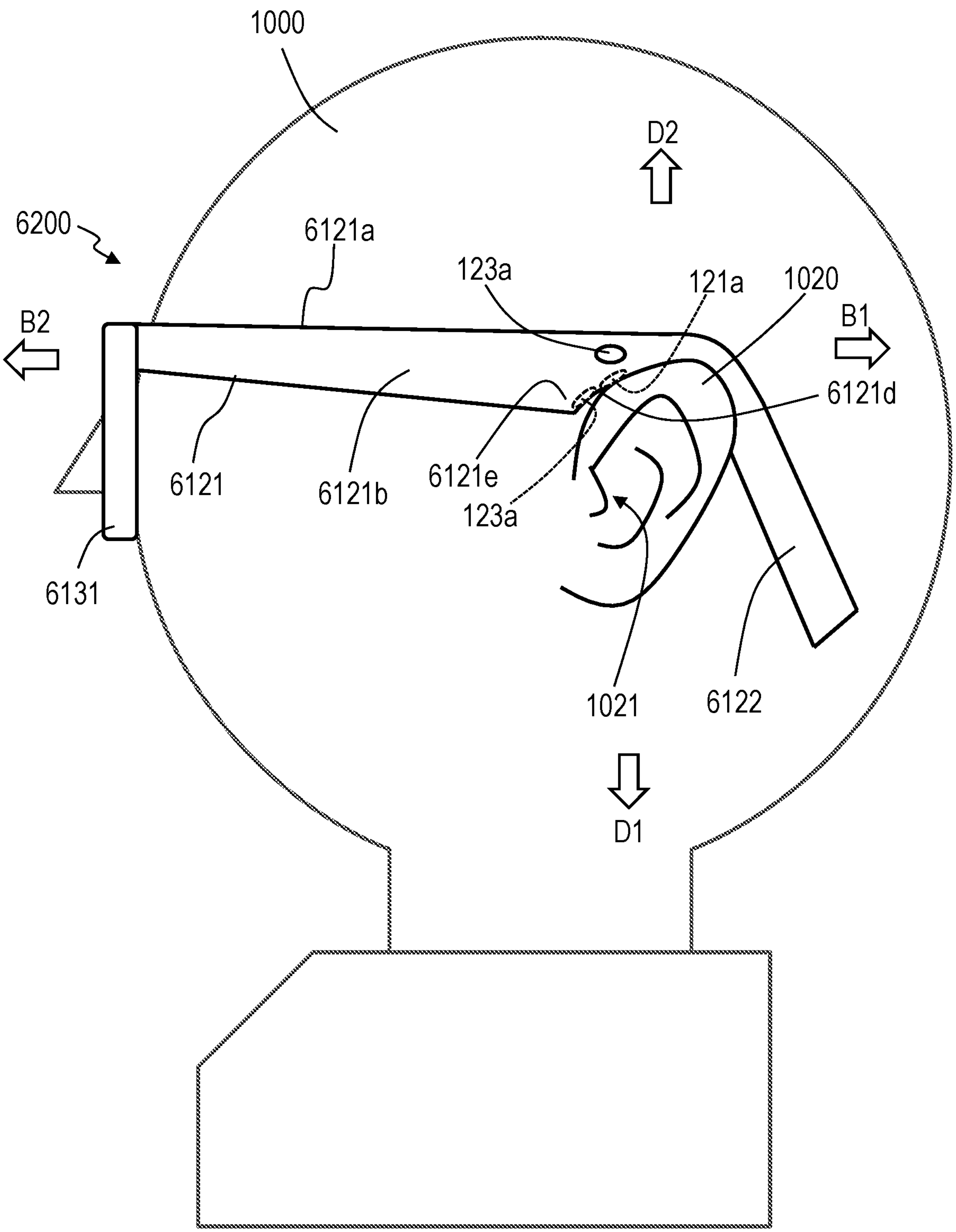
FIG. 38 illustrates how the modification of the acoustic signal output device according to the embodiment is worn.

For example, like an acoustic signal output device 6200 illustrated in FIGS. 37A and 38, one sound hole 121*a* and also one sound hole 123*a* may be provided in each of the lower surfaces 6111*d*, 6121*d* of the temples 6111, 6121, and one sound hole 123*a* may be provided in each of the side surfaces 6111*b*, 6121*b*. In this example, the acoustic signal output device 6200 is configured so that when the user 1000 wears the acoustic signal output device 6200 (FIG. 38), out of the sound holes 123*a* provided in the temple 6121, the sound pressure of the acoustic signal AC2 that is emitted from a sound hole 123*a* oriented in a direction closer to the axis direction of the ear canal 1021 of one ear (for example, the left ear) of the user 1000 (a sound hole 123*a* that is oriented in a direction forming an angle of θ1 with the axis direction of the ear canal 1021; for example, the sound hole 123*a* provided in the lower surface 6111*d*) is lower than the sound pressure of the acoustic signal AC2 that is emitted from a sound hole 123*a* oriented in a direction farther from the axis direction of the ear canal 1021 (a sound hole 123*a* that is oriented in a direction forming an angle of θ2 with the axis direction of the ear canal 1021, where θ2>θ1; for example, the sound hole 123*a* provided in the side surface 6121*b*). For example, the acoustic signal output device 6200 is configured so that when the user 1000 wears the acoustic signal output device 6200 (FIG. 38), out of the sound holes 123*a* provided in the temple 6121, the sound pressure of the acoustic signal AC2 that is emitted from the sound hole 123*a* oriented in a direction closest to the axis direction of the ear canal 1021 is lower than the sound pressures of the acoustic signals AC2 that are emitted from the other sound holes 123*a*. The distances between the ear canal 1021 and the sound holes 123*a* provided in the temple 6121 may be the same as each other or may not be the same. Likewise, in this example, the acoustic signal output device 6200 is configured so that when the user 1000 wears the acoustic signal output device 6200, out of the sound holes 123*a* provided in the temple 6111, the sound pressure of the acoustic signal AC2 that is emitted from a sound hole 123*a* oriented in a direction closer to the axis direction of the ear canal of the other ear (for example, the right ear) of the user 1000 is lower than the sound pressure of the acoustic signal AC2 that is emitted from a sound hole 123*a* oriented in a direction farther from the axis direction of the ear canal. For example, the acoustic signal output device 6200 is configured so that when the user 1000 wears the acoustic signal output device 6200, out of the sound holes 123*a* provided in the temple 6111, the sound pressure of the acoustic signal AC2 that is emitted from the sound hole 123*a* oriented in a direction closest to the axis direction of the ear canal is lower than the sound pressures of the acoustic signals AC2 that are emitted from the other sound holes 123*a*. The distances between the ear canal and the sound holes 123*a* provided in the temple 6111 may be the same as each other or may not be the same. The other features are the same as in the fifth embodiment.

Second Modification of the Fifth Embodiment

Figure 37B:
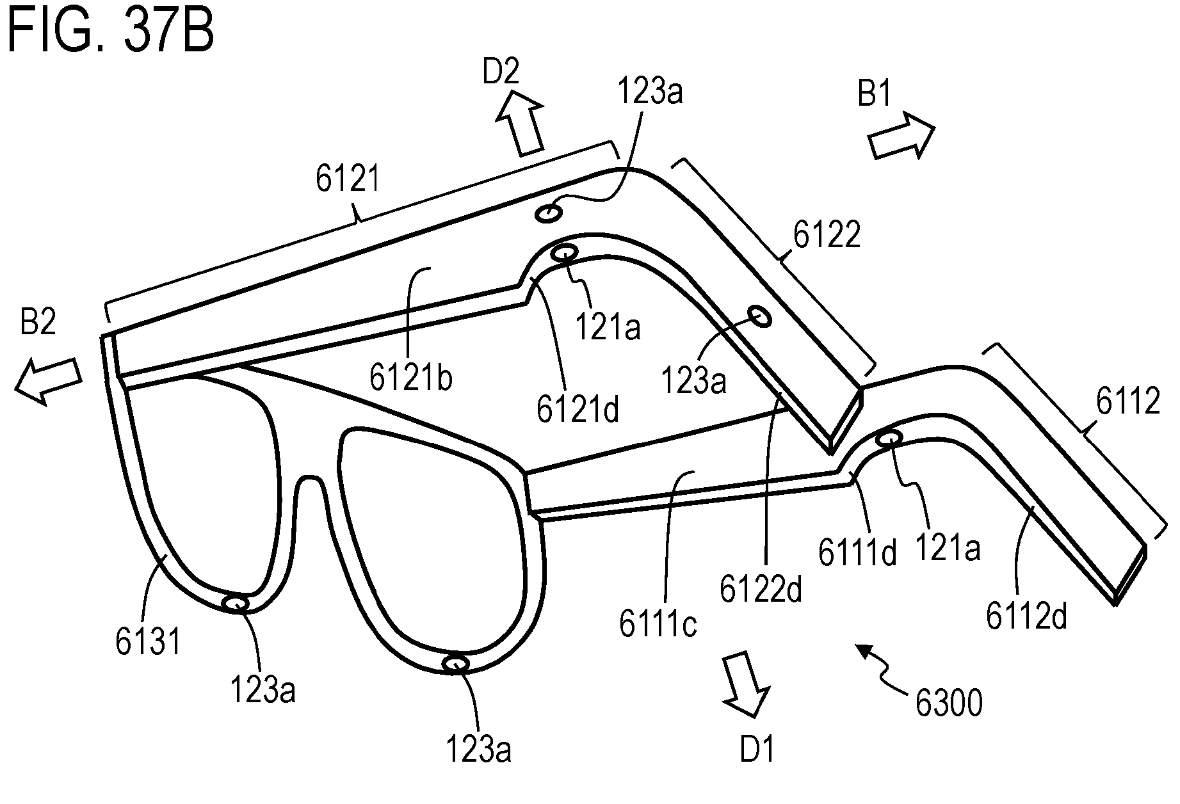

The numbers of the sound holes 121*a* (the first sound holes) and the sound holes 123*a* (the second sound holes) and their locations and orientations are not limited to those in the fifth embodiment and the first modification thereof. For example, like an acoustic signal output device 6300 illustrated in FIG. 37B, at least one of the sound holes 121*a*, 123*a* may be positioned in the temple tip 6112, 6122 or may be positioned in other surfaces of the temple 6111, 6121. At least one of the sound holes 121*a*, 123*a* may be disposed in an area close to the front frame 6131 of the temple 6111, 6121, may be disposed in an area close to the temple tip 6112, 6122, or may be disposed in the front frame 6131. In any case, at least one of the temples 6111, 6121, the temple tips 6112, 6122, and the front frame 6131 is formed as a hollow body and the driver unit 11 is accommodated in it so that the acoustic signal AC1 is emitted from the sound hole 121*a* and the acoustic signal AC2 is emitted from the sound holes 123*a*. It is also desirable that no sound hole 123*a* is provided in the area that sits closest to the ear canal of the user 1000 when the user 1000 wears the acoustic signal output device. For example, of the sound holes 121*a*, 123*a* provided in the acoustic signal output device, the sound hole that is located closest to the ear canal when the user 1000 wears the acoustic signal output device is preferably a sound hole 121*a*, not a sound hole 123*a*. It is also preferable that, of the sound holes 121*a*, 123*a* provided in the acoustic signal output device, the sound hole that is oriented in a direction closest to the axis direction of the ear canal when the user 1000 wears the acoustic signal output device is a sound hole 121*a*, not a sound hole 123*a*. In any case, it is preferable that, of the sound holes 123*a* provided in the acoustic signal output device, the sound pressure of the acoustic signal AC2 that is emitted from the sound hole 123*a* that is located closest to the ear canal when the user 1000 wears the acoustic signal output device is smaller than the sound pressures of the acoustic signals AC2 emitted from the other sound holes 123*a*. Alternatively, it is preferable that, of the sound holes 123*a* provided in the acoustic signal output device, the sound pressure of the acoustic signal AC2 that is emitted from the sound hole 123*a* that is oriented in a direction closest to the axis direction of the ear canal when the user 1000 wears the acoustic signal output device is smaller than the sound pressures of the acoustic signals AC2 emitted from the other sound holes 123*a*.

Sixth Embodiment

The opening areas of sound holes 123*a* (the second sound holes) may be variable. For the present embodiment, an arrangement for changing the opening areas of sound holes 123*a* in the acoustic signal output device integrated with a pair of glasses described in the fifth embodiment and its modifications is illustrated. However, the opening areas and/or the opening shapes of sound holes 123*a* may be variable in the first to third embodiments and their modifications.

Figure 39A:
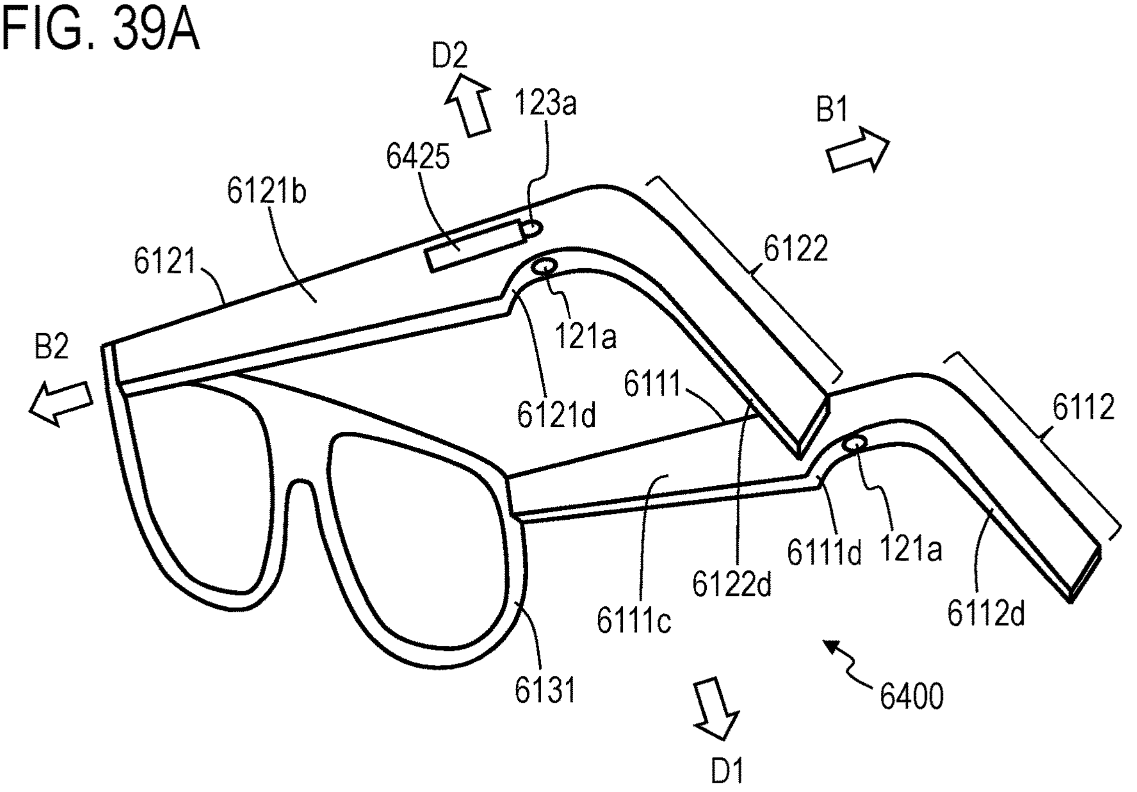
FIGS. 39A and 39B are perspective views for illustrating a modification of the acoustic signal output device according to the embodiment.
Figure 39B:
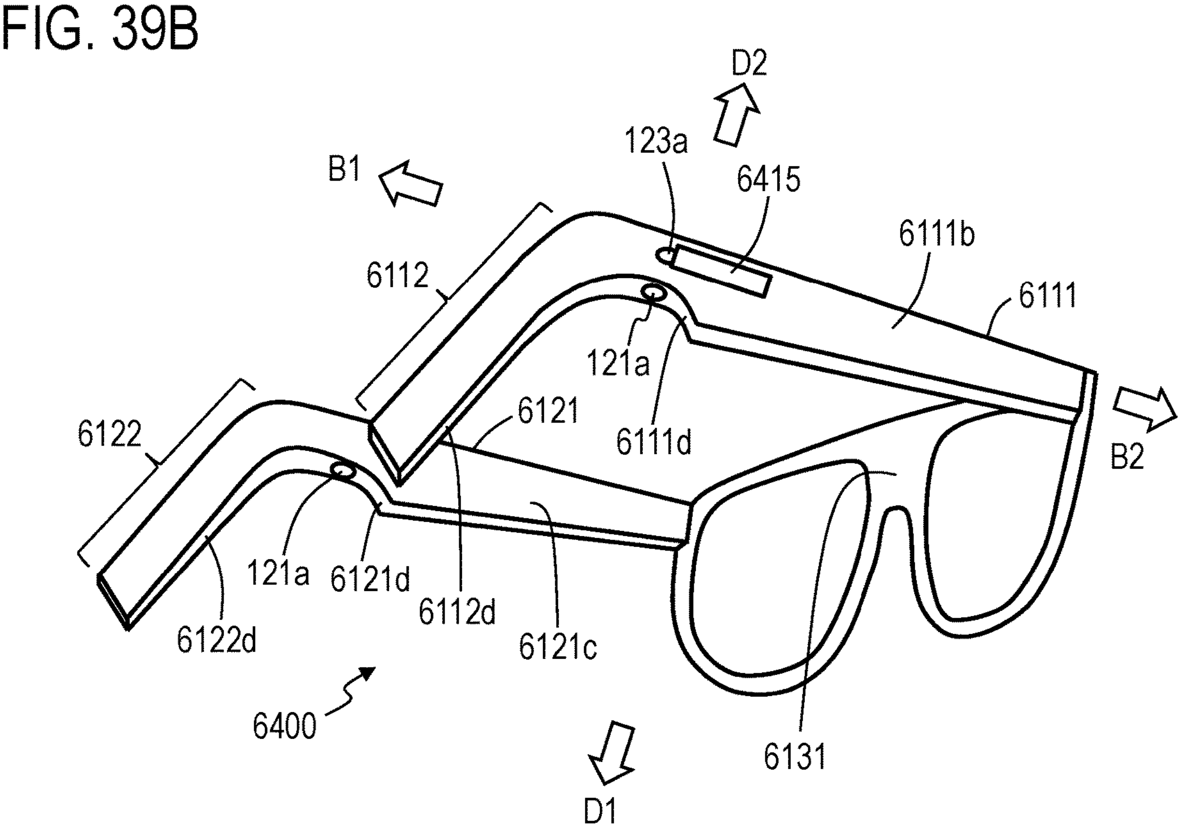

As illustrated in FIGS. 39A and 39B, an acoustic signal output device 6400 in the present embodiment includes the temples 6111, 6121, the temple tips 6112, 6122, and the front frame 6131. The temples 6111, 6121 are affixed to the opposite edges of the front frame 6131 at one end, and are connected to one ends of the temple tips 6112, 6122 at the other end. The temples 6111, 6121 (the structure portions) have hollow interiors, in each of which the driver unit 11 is accommodated.

As with the fifth embodiment, the temples 6111, 6121 are each provided with the sound hole 121*a* (the first sound hole) to emit, to the outside, the acoustic signal AC1 which has been emitted to the inside of the temple 6111, 6121 from the surface 111 of the driver unit 11 on one side.

The temples 6111, 6121 are each provided with the sound hole 123*a* (the second sound hole) to emit, to the outside, the acoustic signal AC2 which has been emitted to the inside of the temple 6111, 6121 from the surface 112 of the driver unit 11 on the other side. In the present embodiment, one sound hole 123*a* is provided in each of the side surfaces 6111*b*, 6121*b* of the temples 6111, 6121. However, this is an example and multiple sound holes 123*a* may be provided in each of the temples 6111, 6121 as illustrated in the fifth embodiment and its modifications.

Figure 40A:
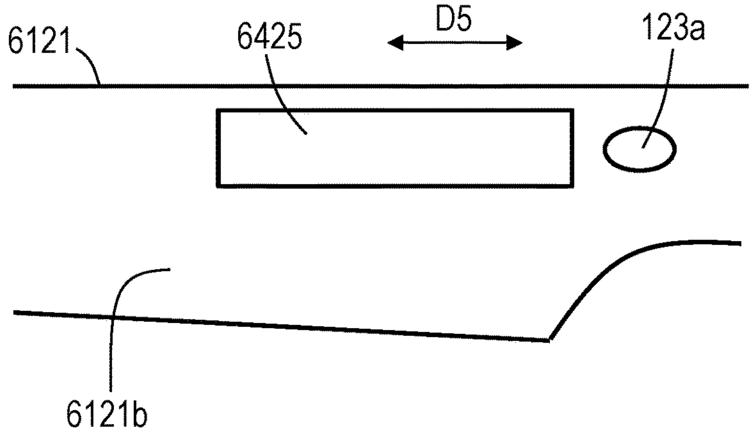
FIGS. 40A to 40C are partial enlarged views for illustrating the modification of the acoustic signal output device according to the embodiment.
Figure 40B:
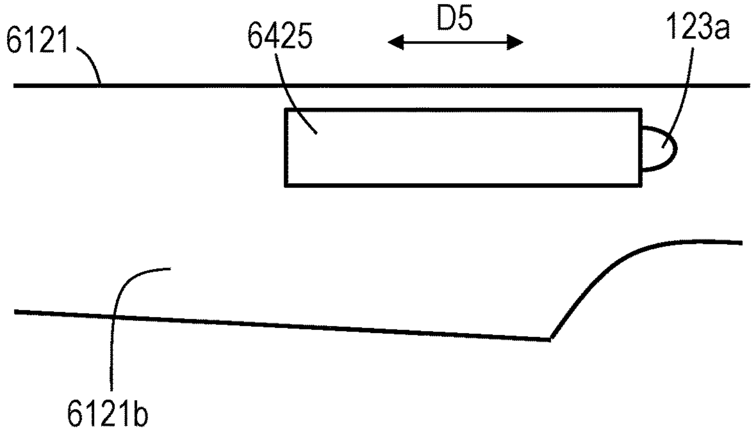
Figure 40C:
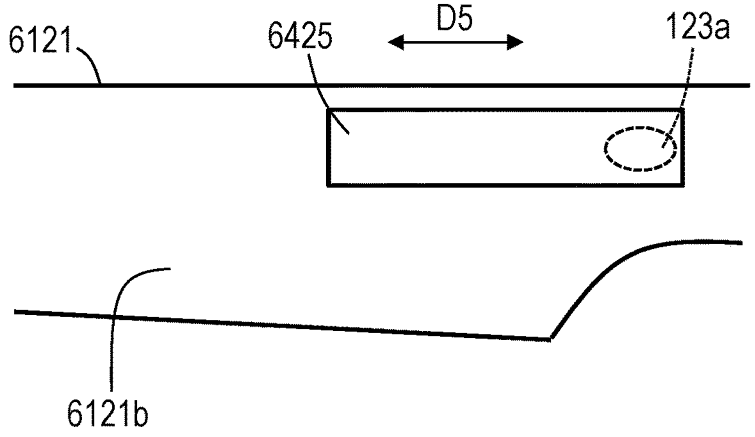

As illustrated in FIGS. 39A to 40, the temples 6111, 6121 have movable portions 6415, 6425, respectively, for changing the opening area of at least one sound hole 123*a*. The movable portions 6415, 6425 may have any mechanical configuration that can change the opening area of the sound hole 123*a*. As an example, an arrangement that changes the opening areas of the sound holes 123*a* by sliding the movable portions 6415, 6425 is illustrated here. As illustrated in FIGS. 40A to 40C, each of the movable portions 6415, 6425 is movable in D5 direction with respect to the temple 6111, 6121, and can change the opening area of the sound hole 123*a* in accordance with the positional relationship between the movable portion 6415, 6425 and the sound hole 123*a*. That is, when the movable portion 6415, 6425 is not covering the sound hole 123*a* as illustrated in FIG. 40A, the opening area of the sound hole 123*a* can be maximized. By covering a portion of the sound hole 123*a* with the movable portion 6415, 6425 as illustrated in FIG. 40B, the opening area of the sound hole 123*a* can be decreased. Furthermore, the sound hole 123*a* may be closeable by fully covering the sound hole 123*a* with the movable portion 6415, 6425 as shown in FIG. 40C. With the opening area of at least one sound hole 123*a* being variable in this manner, the sound pressure of the acoustic signal AC2 that is emitted from the sound hole 123*a* can be varied and the degree of cancellation of the acoustic signal AC1 emitted from the sound hole 121*a* can be controlled. In environments where it is not necessary to suppress sound leakage from the acoustic signal AC1, all of the sound holes 123*a* may be closed.

The movable portion 6415, 6425 may be configured to be manually moved by the user 1000 or may be configured to be moved with power from a motor or the like. The relative position of the movable portion 6415, 6425 to the sound hole 123*a* may be continuously variable or may be discretely variable. In the case of discretely varying the relative position of the movable portion 6415, 6425 to the sound hole 123*a*, the design may be made such that the opening area and opening shape of the sound hole 123*a* can be set among multiple predefined sizes and shapes. This can provide a sound leakage suppression effect that is optimized in advance for the environment of interest.

The direction of movement of the movable portion 6415, 6425 may be any direction. For example, the movable portion 6415, 6425 may move in the D5 direction (the horizontal direction in FIG. 40A and other drawings), in a direction orthogonal to the D5 direction (the vertical direction in FIG. 40A and other drawings), or in a direction as a combination of them (for example, an oblique direction in FIG. 40A and other drawings). The movable portion 6415, 6425 may move not only in a one-dimensional direction (for example, the D5 direction in FIGS. 40A to 40C) but also in two-dimensional directions (for example, the D5 direction and the direction orthogonal to it) along a plane containing the opening of the sound hole 123*a* (such as the side surface 6121*b*). This increases the degree of freedom in the opening shape and opening location of the sound hole 123*a*. As a result, the level of sound leakage or the direction of sound leakage from the acoustic signal AC1 can be finely controlled with the acoustic signal AC2 emitted from this sound hole 123*a*. Further, multiple movable portions 6415, 6425 that can move in different directions from each other relative to one sound hole 123*a* may be provided, such that the sound hole 123*a* can be covered with these movable portions 6415, 6425. This can further increase the degree of freedom in the opening shape and opening location of the sound hole 123*a*, thus allowing the level of sound leakage or the direction of sound leakage from the acoustic signal AC1 to be more finely controlled.

Multiple sound holes 123*a* may be provided in each of the temples 6111, 6121 and movable portions 6415, 6425 for changing the opening areas of those sound holes 123*a* may be provided. One or more sound holes 123*a* may be provided in the temple tips 6112, 6122 and/or the front frame 6131, and the movable portions 6415, 6425 for changing the opening areas of those sound holes 123*a* may be provided. The directivity of the acoustic signal AC2 emitted from at least one sound hole 123*a* may be variable by changing the opening area and/or opening shape of that sound hole 123*a*. For example, the opening area and/or opening shape of any of multiple sound holes 123*a* that are open in different directions (for example, the sound holes 123*a* provided in the upper surfaces 6111*a*, 6121*a* and the sound holes 123*a* provided in the side surface 6111*b*, 6121*b*) may be changed to vary the directivity of the acoustic signal AC2 emitted from these sound holes 123*a*. That is, the opening direction of the sound hole 123*a* may be varied via the movable portion 6415, 6425.

Movable portions for changing the opening areas and/or opening shapes of sound holes 123*a* may be also provided in the first to the third embodiments and their modifications as mentioned above. Furthermore, instead of slidable movable portions, movable portions shaped like shutter apertures may be provided or movable portions in other forms may be provided.

Other Modifications

The present invention is not limited to the embodiments described above. For example, although the housing 12 and the support portion 13 are separate components in the embodiments, the housing 12 and the support portion 13 may be structured as an integrated component.

In the first embodiment, the sound holes 123*a* may not be provided in the housing 12. In such a case, when the housing 12 and the support portion 13 (the structure portion) is attached to the auricle 1010 of the user 1000, the area 132 (the second area) of the support portion 13 is still supported in contact with some portion of the auricle 1010 (body), while the area 131 (the first area) of the support portion 13 is positioned on the ear canal 1011 side without causing contact of the opened end 131*b* of the sound hole 121*a* (the first sound hole) and the area 131 (the first area) with at least part of the auricle 1010 (body). Stability during wearing is high because the area 132 then serves as a support in contact with the auricle 1010. Further, since the opened end 131*b* of the sound hole 121*a* on the B2-direction side is surrounded by the area 132, the acoustic signal AC1 emitted from the sound hole 121*a* can be kept from leaking to the B2-direction side (sound leakage). In the second embodiment, the support portion 13 may also not be provided.

In the embodiments described above, the driver unit 11 is accommodated inside the housing 12. However, the driver unit 11 may be positioned outside the housing 12 and the acoustic signals AC1, AC2 emitted from the driver unit 11 may be introduced into the housing 12 through waveguides.

APPENDIX

What has been discussed above is summarized below.

[Item 11]

An acoustic signal output device including:

- a structure portion provided with one or more first sound holes to emit a first acoustic signal to outside and one or more second sound holes to emit a second acoustic signal to the outside, in which
- the first sound holes are each positioned at an eccentric location offset in a first direction from a central axis of the structure portion,
- a sound pressure level of the second acoustic signal that is emitted from the second sound holes into a first space is lower than a sound pressure level of the second acoustic signal that is emitted from the second sound holes into a second space,
- the first space is a space positioned on a first direction side relative to the first sound holes,
- the second space is a space positioned on a second direction side relative to the first sound holes, and the second direction contains an opposite direction component of the first direction, and
- the acoustic signal output device is designed such that
  - in a case where the first acoustic signal is emitted from the first sound holes and the second acoustic signal is emitted from the second sound holes, an attenuation factor of the first acoustic signal at a second point with respect to a first point is equal to or lower than a predefined value that is smaller than an attenuation factor associated with air conduction of an acoustic signal at the second point with respect to the first point, wherein the first point is a predefined point that is reached by the first acoustic signal, and the second point is farther from the acoustic signal output device than the first point is, or that
  - an amount of attenuation of the first acoustic signal at the second point with respect to the first point is equal to or higher than a predefined value that is greater than an amount of attenuation associated with air conduction of an acoustic signal at the second point with respect to the first point.

[Item 12]

The acoustic signal output device according to Item 11, in which

- a total area of opened ends of the second sound holes that face the first space is smaller than a total area of opened ends of the second sound holes that face the second space.

[Item 13]

The acoustic signal output device according to Item 11 or 12, in which the structure portion is provided with a plurality of the second sound holes, and

- a sound pressure level of the second acoustic signal that is emitted from an opened end facing the first space among opened ends of the second sound holes is lower than a sound pressure level of the second acoustic signal that is emitted from an opened end facing the second space among the opened ends of the second sound holes.

[Item 14]

The acoustic signal output device according to Item 11, in which

- at least a portion of an outer surface area surrounding opened ends of the first sound holes is convex-shaped, and
- the outer surface area includes a first area and a second area protruding further than the first area, the outer surface area being shaped so as to direct the first acoustic signal emitted from the first sound holes to a first area side.

[Item 15]

The acoustic signal output device according to Item 14, in which

- the opened ends of the first sound holes face a space surrounded by the second area, and
- the first area side of the space surrounded by the second area is open outwardly from an outer periphery of the space surrounded by the second area.

[Item 16]

The acoustic signal output device according to Item 14 or 15, in which

- the first area is positioned on the first direction side of the second area.

[Item 17]

The acoustic signal output device according to Item 14 or 15, in which the acoustic signal output device is configured such that when the structure portion is attached to a user's body, the second area is supported in contact with some portion of the body, and the first area is positioned on ear canal side without causing contact of the opened ends of the first sound holes and the first area with at least part of the body.

[Item 21]

An acoustic signal output device including:

a structure portion that is provided with one or more first sound holes to emit a first acoustic signal to the outside, and in which at least a portion of an outer surface area surrounding opened ends of the first sound holes is convex-shaped, in which the outer surface area includes a first area and a second area protruding further than the first area, the outer surface area being shaped so as to direct the first acoustic signal emitted from the first sound holes to the first area side.

[Item 22]

The acoustic signal output device according to Item 21, in which the opened ends of the first sound holes face a space surrounded by the second area, and the first area side of the space surrounded by the second area is open outwardly from an outer periphery of the space surrounded by the second area.

[Item 23]

The acoustic signal output device according to Item 21, in which the acoustic signal output device is configured such that when the structure portion is attached to a user's body, the second area is supported in contact with some portion of the body, and the first area is positioned on ear canal side without causing contact of the opened ends of the first sound holes and at least part of the first area with the body.

[Item 24]

The acoustic signal output device according to any one of Items 21 to 23, in which the structure portion is further provided with one or more second sound holes to emit a second acoustic signal to the outside, opened ends of the second sound holes face a space outside a space surrounded by the second area, and the acoustic signal output device is designed such that in a case where the first acoustic signal is emitted from the first sound holes and the second acoustic signal is emitted from the second sound holes, an attenuation factor of the first acoustic signal at a second point with respect to a first point is equal to or lower than a predefined value that is smaller than an attenuation factor associated with air conduction of an acoustic signal at the second point with respect to the first point, wherein the first point is a predefined point that is reached by the first acoustic signal, and the second point is farther from the acoustic signal output device than the first point is, or that an amount of attenuation of the first acoustic signal at the second point with respect to the first point is equal to or higher than a predefined value that is greater than an amount of attenuation associated with air conduction of an acoustic signal at the second point with respect to the first point.

[Item 25]

An acoustic signal output device including:

a structure portion provided with one or more first sound holes to emit a first acoustic signal to outside, and including an outer surface area that surrounds opened ends of the first sound holes, in which the acoustic signal output device is shaped such that when the structure portion is attached to a user's body, a portion of the outer surface area is supported in contact with some portion of the body, and the first acoustic signal emitted from the first sound holes is directed to ear canal side without causing contact of at least part of the opened ends of the first sound holes with the body.

[Item 26]

The acoustic signal output device according to Item 25, in which the acoustic signal output device is designed such that when the structure portion is attached to the body, a sound pressure level of the first acoustic signal that is emitted from the structure portion to the ear canal side is higher than a sound pressure level of the first acoustic signal that is emitted from the structure portion in directions other than the ear canal side.

[Item 27]

The acoustic signal output device according to Item 25 or 26, in which the structure portion is further provided one or more second sound holes to emit a second acoustic signal to the outside, the acoustic signal output device is designed such that in a case where the first acoustic signal is emitted from the first sound holes and the second acoustic signal is emitted from the second sound holes, an attenuation factor of the first acoustic signal at a second point with respect to a first point is equal to or lower than a predefined value that is smaller than an attenuation factor associated with air conduction of an acoustic signal at the second point with respect to the first point, wherein the first point is a predefined point that is reached by the first acoustic signal, and the second point is farther from the acoustic signal output device than the first point is, or that an amount of attenuation of the first acoustic signal at the second point with respect to the first point is equal to or higher than a predefined value that is greater than an amount of attenuation associated with air conduction of an acoustic signal at the second point with respect to the first point.

[Item 31]

An acoustic signal output device including:

a structure portion provided with one or more first sound holes to emit a first acoustic signal to outside, a hollow portion in which a second acoustic signal is emitted into an inner space thereof, and one or more second sound holes to emit, to the outside, the second acoustic signal that has been emitted into the inner space of the hollow portion, in which the acoustic signal output device is designed such that a resonance frequency of the hollow portion is equal to or higher than a predetermined frequency and such that the second acoustic signal in which frequency band components including the predetermined frequency have been suppressed is emitted from the second sound holes to the outside.

[Item 32]

The acoustic signal output device according to Item 31, in which the structure portion includes an inner hollow portion positioned in the inner space of the hollow portion, and an inner space of the inner hollow portion is spatially separated from an inner space of the hollow portion located outside the inner hollow portion.

[Item 33]

The acoustic signal output device according to Item 32, further including:

an electronic member for driving a driver unit, the driver unit emitting at least one of the first acoustic signal and the second acoustic signal, in which at least a portion of the electronic member is accommodated in the inner space of the inner hollow portion.

[Item 34]

The acoustic signal output device according to Item 32, further including:

a buffer material disposed between an outer side of the inner hollow portion and an inner side of hollow portion, in which the outer side of the inner hollow portion is fixed to the inner side of the hollow portion via the buffer material.

[Item 35]

The acoustic signal output device according to Item 31, further including:

a driver unit that emits the second acoustic signal in which frequency band components including the predetermined frequency have been suppressed into the inner space of the hollow portion.

[Item 36]

The acoustic signal output device according to Item 35, further including:

a switching unit that switches whether the driver unit emits the second acoustic signal in which the frequency band components including the predetermined frequency have been suppressed to the inner space of the hollow portion, or the driver unit emits the second acoustic signal without suppression of the frequency band components including the predetermined frequency to the inner space of the hollow portion.

[Item 37]

The acoustic signal output device according to Item 31, in which the acoustic signal output device is designed such that in a case where the first acoustic signal is emitted from the first sound holes and the second acoustic signal is emitted from the second sound holes, an attenuation factor of the first acoustic signal at a second point with respect to a first point is equal to or lower than a predefined value that is smaller than an attenuation factor associated with air conduction of an acoustic signal at the second point with respect to the first point, wherein the first point is a predefined point that is reached by the first acoustic signal, and the second point is farther from the acoustic signal output device than the first point is, or that an amount of attenuation of the first acoustic signal at the second point with respect to the first point is equal to or higher than a predefined value that is greater than an amount of attenuation associated with air conduction of an acoustic signal at the second point with respect to the first point.

DESCRIPTION OF REFERENCE NUMERALS

10, 20, 30, 3100, 4100, 4200, 5110, 5120, 5130, 5140, 5150, 5160, 5170, 5190, 5200-5600, 6100-6300 acoustic signal output device

5111, 5121, 5131, 5151, 5171, 5191, 5201, 5781 structure portion

121*a*, 123*a* sound hole

11 driver unit

210 switching unit

220 hollow portion

241 inner hollow portion

1000 user

1010, 1020 auricle

1011, 1021 ear canal

What is claimed is:

1. An acoustic signal output device comprising:

a structure portion provided with one or more first sound holes to emit a first acoustic signal to outside and one or more second sound holes to emit a second acoustic signal to the outside, wherein the first sound holes are each positioned at an eccentric location offset in a first direction from a central axis of the structure portion, a sound pressure level of the second acoustic signal that is emitted from the second sound holes into a first space is lower than a sound pressure level of the second acoustic signal that is emitted from the second sound holes into a second space, the first space is a space positioned on a first direction side relative to the first sound holes, the second space is a space positioned on a second direction side relative to the first sound holes, and the second direction contains an opposite direction component of the first direction, and the acoustic signal output device is designed such that in a case where the first acoustic signal is emitted from the first sound holes and the second acoustic signal is emitted from the second sound holes, an attenuation factor of the first acoustic signal at a second point with respect to a first point is equal to or lower than a predefined value that is smaller than an attenuation factor associated with air conduction of an acoustic signal at the second point with respect to the first point, wherein the first point is a predefined point that is reached by the first acoustic signal, and the second point is farther from the acoustic signal output device than the first point is, or that an amount of attenuation of the first acoustic signal at the second point with respect to the first point is equal to or higher than a predefined value that is greater than an amount of attenuation associated with air conduction of an acoustic signal at the second point with respect to the first point.

2. The acoustic signal output device according to claim 1, wherein a total area of opened ends of the second sound holes that face the first space is smaller than a total area of opened ends of the second sound holes that face the second space.

3. The acoustic signal output device according to claim 1, wherein the structure portion is provided with a plurality of the second sound holes, and a sound pressure level of the second acoustic signal that is emitted from an opened end facing the first space among opened ends of the second sound holes is lower than a sound pressure level of the second acoustic signal that is emitted from an opened end facing the second space among the opened ends of the second sound holes.

4. The acoustic signal output device according to claim 1, wherein at least a portion of an outer surface area surrounding opened ends of the first sound holes is convex-shaped, and the outer surface area includes a first area and a second area protruding further than the first area, the outer surface area being shaped so as to direct the first acoustic signal emitted from the first sound holes to a first area side.

5. The acoustic signal output device according to claim 4, wherein the opened ends of the first sound holes face a space surrounded by the second area, and the first area side of the space surrounded by the second area is open outwardly from an outer periphery of the space surrounded by the second area.

6. The acoustic signal output device according to claim 4, wherein the first area is positioned on the first direction side of the second area.

7. The acoustic signal output device according to claim 4, wherein the acoustic signal output device is configured such that when the structure portion is attached to a user's body, the second area is supported in contact with some portion of the body, and the first area is positioned on ear canal side without causing contact of the opened ends of the first sound holes and the first area with at least part of the body.

* * * * *